United States Patent
Yang

(10) Patent No.: US 9,200,850 B2
(45) Date of Patent: Dec. 1, 2015

(54) CLOSED-LOOP TEMPERATURE EQUALIZATION DEVICE HAVING A HEAT RELEASING SYSTEM STRUCTURED BY MULTIPLE FLOWPATHS

(76) Inventor: Tai-Her Yang, Dzan-Hwa (TW)

( * ) Notice: Subject to any disclaimer, the term of this patent is extended or adjusted under 35 U.S.C. 154(b) by 944 days.

(21) Appl. No.: 13/209,579

(22) Filed: Aug. 15, 2011

(65) Prior Publication Data

US 2013/0025832 A1 Jan. 31, 2013

Related U.S. Application Data

(63) Continuation-in-part of application No. 13/189,819, filed on Jul. 25, 2011, now abandoned, and a continuation-in-part of application No. 13/195,230, filed on Aug. 1, 2011, now abandoned, and a continuation-in-part of application No. 13/195,242, filed on Aug. 1, 2011, now abandoned.

(51) Int. Cl.

| | |
|---|---|
| *F25B 29/00* | (2006.01) |
| *F28D 15/00* | (2006.01) |
| *F28F 1/42* | (2006.01) |
| *F28D 20/00* | (2006.01) |
| *F28F 1/02* | (2006.01) |
| *F28F 1/10* | (2006.01) |
| *F28F 1/16* | (2006.01) |

(Continued)

(52) U.S. Cl.
CPC ............ *F28D 15/00* (2013.01); *F28D 20/0052* (2013.01); *F28F 1/02* (2013.01); *F28F 1/022* (2013.01); *F28F 1/10* (2013.01); *F28F 1/42* (2013.01); *F24J 3/08* (2013.01); *F28D 2020/0078* (2013.01); *F28D 2021/0035* (2013.01); *F28D 2021/0077* (2013.01); *F28F 1/16* (2013.01); *F28F 1/22* (2013.01); *F28F 2265/00* (2013.01); *F28F 2270/00* (2013.01); *Y02E 10/10* (2013.01); *Y02E 60/142* (2013.01)

(58) Field of Classification Search
CPC ................ F28D 15/00; F28D 20/0052; F28D 2020/0078; F28D 2021/0035; F28D 2021/0077; F28F 1/42; F28F 1/02; F28F 1/022; F28F 1/10; F28F 1/16; F28F 1/22; F28F 2270/00; F28F 2265/00; F24J 3/08; Y02E 60/142; Y02E 10/10
USPC ............ 165/10, 11.1, 45, 96, 104.11, 104.21, 165/104.26
See application file for complete search history.

(56) References Cited

U.S. PATENT DOCUMENTS 3,648,767 A * 3/1972 Balch .............................. 165/45
3,768,547 A * 10/1973 Best ................................ 165/45

(Continued)

FOREIGN PATENT DOCUMENTS

JP 2005283014 A * 10/2005 ............. F28D 21/00

*Primary Examiner* — Ljiljana Ciric
(74) *Attorney, Agent, or Firm* — Bacon & Thomas, PLLC

(57) ABSTRACT

A closed-loop heat equalization system includes a heat gaining device installed within a natural thermal energy storage body, and a heat releasing device having multiple flowpaths, the heat gaining and releasing devices being connected by pipeline structures to form a closed-loop flowpath for a heat exchange fluid. An outwardly expanded arc-shaped structure may be included at one or more turning locations in the pipeline structures. The pipeline structures may include an operation port and sealing plug at a top corner of the closed-loop flowpath, and an auxiliary heating/cooling device or fluid pump controlled by a sensing device and an electric energy control unit.

17 Claims, 29 Drawing Sheets

(51) Int. Cl.
  *F28F 1/22* (2006.01)
  *F28D 21/00* (2006.01)
  *F24J 3/08* (2006.01)

(56) References Cited

U.S. PATENT DOCUMENTS

| | | | | |
|---|---|---|---|---|
| 3,788,389 A * | 1/1974 | Waters | | 165/45 |
| 3,823,769 A * | 7/1974 | Anderson et al. | | 165/104.21 |
| 3,828,845 A * | 8/1974 | Waters | | 165/45 |
| 3,840,068 A * | 10/1974 | Waters | | 165/45 |
| 3,857,244 A * | 12/1974 | Faucette | | 165/45 |
| 3,898,851 A * | 8/1975 | Wyant | | 165/45 |
| 3,935,900 A * | 2/1976 | Waters | | 165/45 |
| 3,948,313 A * | 4/1976 | Best | | 165/45 |
| 3,990,502 A * | 11/1976 | Best | | 165/45 |
| 4,036,285 A * | 7/1977 | Best | | 165/45 |
| 4,040,480 A * | 8/1977 | Richards | | 165/104.26 |
| 4,042,012 A * | 8/1977 | Perry et al. | | 165/45 |
| 4,050,509 A * | 9/1977 | Bienert et al. | | 165/45 |
| 4,091,863 A * | 5/1978 | Schroder | | 165/104.11 |
| 4,099,556 A * | 7/1978 | Roberts, Jr. | | 165/104.26 |
| 4,142,576 A * | 3/1979 | Perry et al. | | 165/45 |
| 4,162,394 A * | 7/1979 | Faccini | | 165/45 |
| 4,194,856 A * | 3/1980 | Jahns | | 165/45 |
| 4,240,268 A * | 12/1980 | Yuan | | 165/10 |
| 4,258,780 A * | 3/1981 | Suo | | 165/45 |
| 4,269,539 A * | 5/1981 | Hopke | | 165/45 |
| 4,271,681 A * | 6/1981 | Schertz | | 165/104.26 |
| 4,279,294 A * | 7/1981 | Fitzpatrick et al. | | 165/45 |
| 4,339,929 A * | 7/1982 | Fitzpatrick et al. | | 165/45 |
| 4,346,569 A * | 8/1982 | Yuan | | 165/10 |
| 4,355,522 A * | 10/1982 | Gorski et al. | | 165/104.21 |
| 4,375,157 A * | 3/1983 | Boesen | | 165/45 |
| 4,408,657 A * | 10/1983 | Pugh | | 165/45 |
| 4,412,426 A * | 11/1983 | Yuan | | 165/45 |
| 4,444,249 A * | 4/1984 | Cady | | 165/45 |
| 4,448,237 A * | 5/1984 | Riley | | 165/45 |
| 4,505,326 A * | 3/1985 | Hazen | | 165/45 |
| 4,566,527 A * | 1/1986 | Pell et al. | | 165/45 |
| 4,577,679 A * | 3/1986 | Hibshman | | 165/45 |
| 4,644,750 A * | 2/1987 | Lockett et al. | | 165/104.26 |
| 4,693,301 A * | 9/1987 | Baehrle et al. | | 165/45 |
| 4,793,146 A * | 12/1988 | Ryokai | | 165/45 |
| 4,798,239 A * | 1/1989 | Persohn et al. | | 165/45 |
| 4,836,275 A * | 6/1989 | Sakaya et al. | | 165/46 |
| 4,930,572 A * | 6/1990 | Doshier | | 165/45 |
| 4,995,450 A * | 2/1991 | Geppelt et al. | | 165/104.21 |
| 5,029,633 A * | 7/1991 | Mann | | 165/45 |
| 5,054,297 A * | 10/1991 | Furuhama | | 62/260 |
| 5,069,199 A * | 12/1991 | Messner | | 126/400 |
| 5,477,703 A * | 12/1995 | Hanchar et al. | | 62/260 |
| 5,803,161 A * | 9/1998 | Wahle et al. | | 165/104.21 |
| 6,129,141 A * | 10/2000 | Yang | | 165/45 |
| 6,769,487 B2 * | 8/2004 | Hache | | 166/302 |
| 6,802,360 B1 * | 10/2004 | Schmitt | | 165/45 |
| 7,004,231 B2 * | 2/2006 | Yang | | 165/11.1 |
| 7,370,488 B2 * | 5/2008 | Kidwell et al. | | 62/260 |
| 7,373,785 B2 * | 5/2008 | Kidwell et al. | | 62/260 |
| 7,377,122 B2 * | 5/2008 | Kidwell et al. | | 62/260 |
| 8,100,172 B2 * | 1/2012 | Yang | | 165/244 |
| 8,448,876 B2 * | 5/2013 | Yang | | 236/1 C |
| 8,757,504 B2 * | 6/2014 | Yang | | 236/1 C |
| 2004/0194909 A1 * | 10/2004 | Yang | | 165/11.1 |
| 2007/0271940 A1 * | 11/2007 | Yang | | 62/260 |
| 2009/0277602 A1 * | 11/2009 | Yang | | 165/45 |
| 2012/0090810 A1 * | 4/2012 | Yang | | 165/45 |
| 2012/0097361 A1 * | 4/2012 | Yang | | 165/45 |
| 2012/0111530 A1 * | 5/2012 | Yang | | 165/45 |

* cited by examiner

CLOSED-LOOP TEMPERATURE EQUALIZATION DEVICE HAVING A HEAT RELEASING SYSTEM STRUCTURED BY MULTIPLE FLOWPATHS

CROSS-REFERENCE TO RELATED APPLICATION

This application is a Continuation-In-Part of application Ser. No. 13/195,230, filed on Aug. 1, 2011, which is a Continuation-In-Part of application Ser. No. 13/189,819, filed on Jul. 25, 2011.

BACKGROUND OF THE INVENTION (a) Field of the Invention

The present invention utilizes the thermal energy of a natural heat storage body (100) to transmit thermal energy to a heat exchange fluid (104) as it passes through a heat gaining device (101) installed at the bottom of a closed-loop temperature equalization system, the system also having a heat releasing device (201) structured by multiple flowpaths. The heat exchange fluid (104) circulates in the system as a result of a cold descending/hot ascending effect of the temperature equalized heat exchange fluid (104) and, optionally, with the assistance of pumping performed by an auxiliary fluid pump. The heat exchange fluid (104) in the heat gaining device (101) is enabled to flow through the heat releasing device (201) having multiple flowpaths, pipeline structures (301) and (401), and the heat gaining device (101) to form the closed-loop circulation. The heat releasing device (201) performs the heat releasing operation in an omni-directional manner or in a preset direction to a solid, liquid or gaseous temperature differentiation body (103) that receives the released heat, or to a temperature differentiation body (103) structured by the internal or external space of a building. In addition, the closed-loop temperature equalization system may include one or more than one of the structural features: 1) an operation port (111) and a sealing plug (110) may be installed at the upper end of the top corner of the closed-loop flowpath, and connected with a fluid inlet/outlet port (2011) formed at a higher location of the multiple-flowpath heat releasing device (201) and the pipeline structure (401), for filling in or sucking out the heat exchange fluid (104) and serving as an interface for observation and maintenance; 2) an outwardly-expanded arc-shaped flowpath structure may be formed at one or more than one turning locations of the closed-type circulation flowpath configured by series-connecting the heat gaining device (101), the pipeline structure (301), the heat releasing device (201) and the pipeline structure (401), for temporarily storing a part of the heat exchange fluid (104) and moderating the flow speed of the heat exchange fluid (104) to reduce flow damping of the heat exchange fluid (104) in the closed-type circulation flowpath; 3) an auxiliary heating/cooling device (115) may be installed in the flowpath; 4) an auxiliary fluid pump (107) may be installed in the flowpath; 5) a heat exchange fluid temperature sensing device (TS201) may be installed in the flowpath; 6) an environment temperature sensing device (TS202) in the flowpath; and 7) an electric energy control unit (ECU200) may be installed in the flowpath.

(b) Description of the Prior Art

When a heat exchange fluid performs thermal energy transmission in a conventional closed-loop flowpath, if a temperature equalization device with a single-flowpath structure is adopted, the flowpath area is relatively larger and therefore the structural strength is weaker, and it is harder to transmit thermal energy from the heat exchange fluid spaced further away from the inner layer of the heat releasing surface to the exterior through the heat releasing surface. As a result, the interior of the temperature equalization device may form return flows or turbulent flows due to the uneven temperature differentiation between heat releasing surface and the solid or liquid or gaseous temperature differentiation body to which heat is released, or between the heat releasing surface and a temperature differentiation body formed by external space, and thus flow resistance may increase, which prevents the fluid from being able to smoothly flow. Moreover, conventional passively-operated closed-loop temperature equalization systems with a heat exchange fluid serving as a carrier for transmitting thermal energy to an external temperature differentiation body lack interfaces for observation and maintenance and active type auxiliary devices to monitor and/or assist fluid flow.

SUMMARY OF THE INVENTION

The present invention is related to a closed-loop temperature equalization system having a heat releasing device structured by multiple flowpaths installed in a natural solid or liquid heat storage body (100) having greater and more stable heat storage capacity, such as a stratum, ground, lake, pool, river, desert, iceberg and ocean. The natural heat storage body (100) transmits thermal energy to a heat exchange fluid (104) that passes through a heat gaining device (101) installed at the bottom of the closed-loop temperature equalization system and through the heat releasing device structured by multiple flowpaths. Circulation is driven by a cold descending/hot ascending effect of the heat exchange fluid (104), optionally with the assistance of pumping performed by an auxiliary fluid pump, the heat exchange fluid (104) in the heat gaining device (101) thereby being enabled to flow through the pipeline structure (301), the heat releasing device (201), and the pipeline structure (401), and then flow back to the heat gaining device (101) to complete the closed-loop circulation. The heat releasing device (201) releases heat to a solid, liquid or gaseous temperature differentiation body (103) or to a temperature differentiation body (103) structured by the internal or external space of a building. Additional features of the temperature equalization system may include one or more of the following: 1) an operation port (111) and a sealing plug (110) may be installed at the upper end of the top corner of the closed-loop flowpath connected with a fluid inlet/outlet port (2011) formed at intersection between a higher location of the multiple-flowpath heat releasing device (201) and the pipeline structure (401), for filling in or sucking out the heat exchange fluid (104) and serving as an interface for observation and maintenance; 2) an outwardly-expanded arc-shaped flowpath structure is formed at one or more than one turning locations of the closed-type circulation flowpath configured by series-connecting the heat gaining device (101), the pipeline structure (301), the heat releasing device (201) and the pipeline structure (401), for temporarily storing a part of the heat exchange fluid (104) and moderating the flow speed of the heat exchange fluid (104) to reduce flow damping of the heat exchange fluid (104) in the closed-type circulation flowpath; 3) an auxiliary heating/cooling device (115) may be installed in the closed-loop flowpath; 4) an auxiliary fluid pump (107) may be installed in the closed-loop flowpath; 5) a heat exchange fluid temperature sensing device (TS201) may be installed in the closed-loop flowpath; 6) an environment temperature sensing device (TS202) may be installed in the temperature equalization system; and 7) an electric energy control unit (ECU200) may be installed in the temperature equalization system.

DESCRIPTION OF MAIN COMPONENT SYMBOLS

Figure 1:
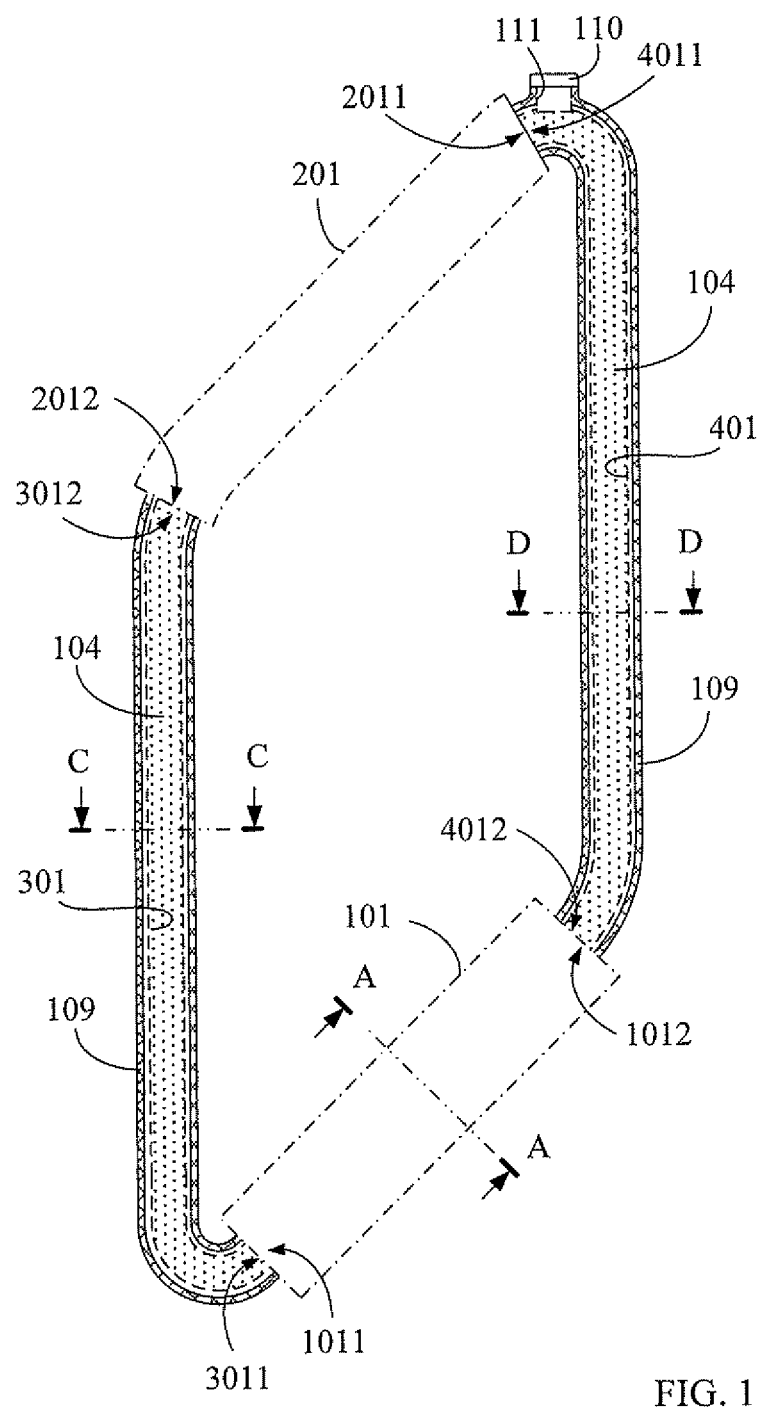
FIG. 1 is a cross-sectional side view showing a closed-loop temperature equalization device having a heat releasing device structured by multiple flowpaths and installed with an operation hole (111) and a sealing plug (110) at the upper end of the top corner of the closed-loop flowpath, according to the present invention.

100: Natural heat storage body
101: Heat gaining device
103: Temperature differentiation body
104: Heat exchange fluid
107: Auxiliary fluid pump
108: Outwardly-expanded arc-shaped fluid chamber
109: Heat insulation member
110: Sealing plug
111: Operation port
112: Top cover
113: Hinge
114: Sealing ring
115: Auxiliary heating/cooling device
116、118: Power wire
120: Signal transmission wire
ECU200: Electric power control unit
TS201: Heat exchange fluid temperature detecting device
TS202: Environment temperature detecting device
1000: Planar thermal energy transmitting surface
1001: Wave-shaped thermal energy transmitting surface
1004: W-shaped pipeline
1005: Rectangular pipeline
1006: Round pipeline
1007: Partitioned flowpath structure
1120: Thermal conductive fin sheet
1011、1012、2011、2012、3011、3012、4011、4012: Fluid inlet/outlet port
201: Heat releasing device
301、401: Pipeline structure

DETAILED DESCRIPTION OF THE PREFERRED EMBODIMENTS

When a heat exchange fluid performs thermal energy transmission in a conventional closed-loop flowpath, if a temperature equalization device with a single-flowpath structure is adopted, the flowpath area is relatively larger and therefore the structural strength is weaker. Furthermore, it is harder for the heat exchange fluid that is spaced further away from the inner layer of the heat releasing surface to transmit the thermal energy to the exterior through the heat releasing surface; and the interior of the temperature equalization device may form return flows or turbulent flows due to the uneven temperature differentiation between the heat releasing surface and the solid or liquid or gaseous temperature differentiation body to which the heat is released, or between the heat releasing surface and a temperature differentiation body formed by an external space, and thus the flow resistance may increase which causes the fluid to be unable to smoothly flow. Moreover, the closed-loop temperature equalization device is often completely passive in operation and lacks interfaces for observation and maintenance, of the capability of including an active type auxiliary device for joint operation.

The present invention utilizes the thermal energy of a natural heat storage body (100) to transmit thermal energy to a heat exchange fluid (104) passing through a heat gaining device (101) installed at the bottom of a closed-loop temperature equalization system, the temperature equalization system further including a heat releasing device structured by multiple flowpaths, with circulation being provided by the cold descending/hot ascending effect of the temperature equalized heat exchange fluid (104) or with the optional assistance of pumping performed by an auxiliary fluid pump. The heat exchange fluid (104) in the heat gaining device (101) is caused to flow through the heat releasing device (201) structured by multiple flowpaths, a pipeline structure (401), and a pipeline structure (301), and then flow back to the heat gaining device (101) for forming a closed-loop circulation, the heat releasing device (201) jointly structured by multiple flowpaths performing a heat releasing operation to a temperature differentiation body (103) in an omni-directional manner or in a preset direction. The temperature differentiation body can be a solid, liquid or gaseous temperature differentiation body (103) or a temperature differentiation body (103) structured by the internal or external space of a building. Additional features of the temperature equalization may include one or more of the following: 1) an operation port (111) and a sealing plug (110) installed at the upper end of the top corner of a closed-loop flowpath connected with a fluid inlet/outlet port (2011) formed at a higher location of the multiple-flowpath heat releasing device (201) and the pipeline structure (401), for filling in or sucking out the heat exchange fluid (104) and serving as an interface for observation and maintenance; 2) an outwardly-expanded arc-shaped flowpath structure is formed at one or more turning locations of the closed-type circulation flowpath configured by series-connecting the heat gaining device (101), the pipeline structure (301), the heat releasing device (201) and the pipeline structure (401), for temporarily storing a part of the heat exchange fluid (104) and moderating the flow speed of the heat exchange fluid (104) for reducing flow damping of the closed-type circulation flowpath; 3) an auxiliary heating/cooling device (115) may be installed; 4) an auxiliary fluid pump (107) may be installed; 5) a heat exchange fluid temperature sensing device (TS201) may be installed; 6) an environment temperature sensing device (TS202) may be installed; and 7) an electric energy control unit (ECU200) may be installed.

The structural features and functions of the present invention are exemplified by embodiments illustrated in the accompanying drawings, as follows:

FIG. 1 is a cross-sectional side view showing a closed-loop temperature equalization device having a heat releasing device structured by multiple flowpaths and installed with an operation hole (111) and a sealing plug (110) at the upper end of the top corner of the closed-type flowpath, according to the present invention.

As shown in FIG. 1, the heat gaining device (101) is installed in a natural heat storage body (100) which is constituted by a solid or liquid heat storage body having a greater and more stable heat storage capacity, such as a stratum, ground, lake, pool, river, desert, ice berg and ocean.

A fluid inlet/output port (1011) of the heat gaining device (101) is connected to the fluid inlet/outlet port (2012) of the heat releasing device (201) via the pipeline structure (301), and another fluid inlet/outlet port (1012) of the heat gaining device (101) is connected to a fluid inlet/outlet port (2011) of the heat releasing device (201) via the pipeline structure (401), thereby forming a closed-loop circulation flowpath, so that the heat exchange fluid (104) passing through the heat gaining device (101) is enabled to form a closed-type circulation flowpath by also passing through the pipeline structures (301), (401) and the heat releasing device (201). The heat releasing device (201) releases the thermal energy to the temperature differentiation body (103) at its periphery to achieve temperature equalization after completing the closed-loop flow circulation. The heat exchange fluid (104) is constituted by a gaseous or liquid fluid having heat storage and thermal conduction properties; the temperature differentiation body (103) being a space or a structure configured by a gas, solid, or liquid for receiving the thermal energy released by the heat exchange fluid passing through the heat releasing device (201) during system operation.

Features of the temperature equalization system of FIG. 1 including the following:

Heat gaining device (101): which is made of a material having good heat conductivity, and provided with a flowpath structure jointly configured by one or more flowpaths, or structured by a conduit structure jointly configured by one or more flowpaths, for being installed in the natural heat storage body (100); two ends of the flowpath of the heat gaining device (101) respectively have a fluid inlet/outlet port (1011), (1012) for being respectively connected to one end of the pipeline structure (301) and one end of the pipeline structure (401), so as to lead and be connected to the heat releasing device (201) for forming a closed-type circulation flowpath, in which the flowpath inside the heat gaining device (101) is inclined with respect to horizontal, the fluid inlet/outlet port (1011) at the lower position allowing the heat exchange fluid (104) having a relatively low temperature to flow in, and the fluid inlet/outlet port (1012) at a higher position allowing the heat exchange fluid (104) having a relatively high temperature to flow out, so as to enable the heat exchange fluid (104) to generate a hot ascending/cold descending effect.

Heat releasing device (201): which is made of a material having good heat conductivity, and provided with a flowpath structure jointly configured by two or more than two flowpaths, or structured by a pipeline structure jointly configured by two or more than two flowpaths; the exterior of the heat releasing device (201) being in contact with the temperature differentiation body (103), and the thermal energy of the heat exchange fluid (104) passing through the heat releasing device (201) performing the heat releasing operation to the temperature differentiation body (103) in an omni-directional manner or in a set direction, the height difference between the fluid inlet/outlet port (2011) and the fluid inlet/outlet port (2012) of the heat releasing device (201) being designed to facilitate or at least to have no negative influence on flow of the heat exchange fluid (104) from the heat gaining device (101) to perform the closed-loop circulation by means of the hot ascending/cold descending effect of the fluid.

Pipeline structure (301): which is constituted by a fluid pipeline structure jointly configured by one or more flowpaths, the exterior of the pipeline structure (301) being covered by a heat insulation member (109), or a pipeline structure having one or more flowpaths is configured by a pipe-like structural body or building structural body made of a material having good heat insulation property and formed in a round shape or other geometric shapes; one end of the pipeline structure (301) has one or more fluid inlet/outlet ports (3011) for being connected to the fluid inlet/outlet port (1011) of the heat gaining device (101) having one or more flowpaths, and the other end of the pipeline structure (301) has one or more fluid inlet/outlet ports (3012) for being connected to the fluid inlet/outlet port (2012) of the heat releasing device (201) having two or more than two flowpaths for transporting the heat exchange fluid (104).

Pipeline structure (401): which is constituted by a fluid pipeline structure configured by one or more flowpaths in round or other geometric shapes, the pipeline structure (401) is configured by one or more than one of the following means: 1) configured by a material having good heat conductivity; 2) configured by a material having good heat conductivity, and the exterior of a pipeline segment defined between the pipeline at the location having less temperature differentiation or the same temperature as the natural heat storage body (100) that is in contact with the heat releasing device (201) being covered by a heat insulation member (109); 3) configured by a pipe-like structure or building structural body made of a material having a good heat insulation property; one end of the pipeline structure (401) having one or more fluid inlet/outlet ports (4012) for being connected to the fluid inlet/outlet port (1012) of the heat gaining device (101) having one or more than one flowpaths, and the other end of the pipeline structure (401) has one or more than one fluid inlet/outlet ports (4011) for being respectively connected to the fluid inlet/outlet port (2011) of the heat releasing device (201) having two or more than two flowpaths for transporting the heat exchange fluid (104).

By installing the sealing plug (110) and the operation port (111) at the upper end of the top corner of the closed-type circulation flowpath configured by the heat gaining device (101), the heat releasing device (201), the pipeline structure (301) and the pipeline structure (401), the fluid is enabled to be filled in or sucked out, and observation and maintenance can be carried out.

The closed-loop temperature equalization system having a heat releasing device structured by multiple flowpath includes at least a heat gaining device (101), at least a heat releasing device (201), at least a pipeline structure (301) and at least a pipeline structure (401) in series connection or in series and parallel connection to configure a closed-loop flowpath; wherein the heat gaining device (101), the heat releasing device (201), the pipeline structure (301) and the pipeline structure (401) can be integrally formed or assembled by plural components, the dimension and shape at each connecting location for the assembly being gradually altered to form a smooth transition, the smooth transition reducing damping while the fluid is flowing, thereby facilitating circulation of the fluid.

The closed-loop temperature equalization system having a heat releasing device structured by multiple flowpath can be applied to release energy to a gaseous or solid or liquid heat releasing object, such as a road surface, roof, wall, floor of a building, air inside a green house, or air inside a house, or water in a lake, or equipment or a structural body desired to be heated for freeze prevention.

Figure 2:
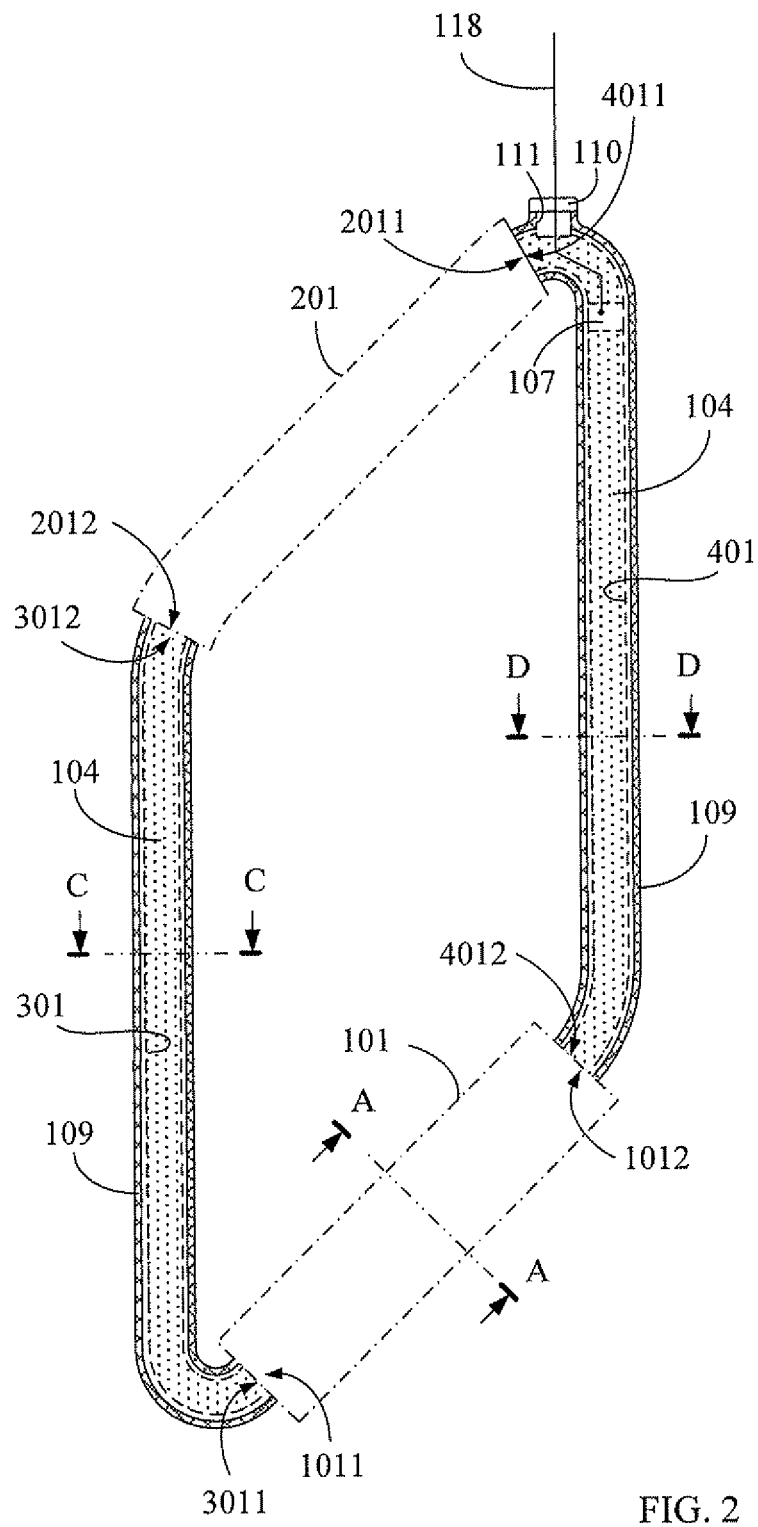
FIG. 2 is a cross-sectional side view showing the embodiment illustrated in FIG. 1 installed with an auxiliary fluid pump, according to the present invention.

The closed-loop temperature equalization system having a heat releasing device structured by multiple flowpaths can be further series installed with an auxiliary fluid pump (107) in the closed-type circulation flowpath configured by the heat gaining device (101), the heat releasing device (201), the pipeline structure (301) and the pipeline structure (401), so that the closed-loop temperature equalization system is not only provided with circulative flow through the cold descending/hot ascending effect of the heat exchange fluid (104), but also can perform normal-direction fluid pumping in the same direction as the cold descending/hot ascending flow of the fluid exchange fluid (104) through actively operating the auxiliary fluid pump (107), or can perform reverse-direction fluid pumping in the direction opposite to the cold descending/hot ascending flow of the fluid exchange fluid (104) through actively operating the auxiliary fluid pump (107), as follows:

FIG. 2 is a cross-sectional side view showing the embodiment illustrated in FIG. 1 being installed with the above-mentioned auxiliary fluid pump, according to the present invention.

As shown in FIG. 2, the heat gaining device (101) is installed in a natural heat storage body (100) which is constituted by a solid or liquid heat storage body having greater and more stable heat storage capacity such as a stratum, ground, lake, pool, river, desert, iceberg and ocean.

A fluid inlet/output port (1011) of the heat gaining device (101) is connected to the fluid inlet/outlet port (2012) of the heat releasing device (201) via the pipeline structure (301), and another fluid inlet/outlet port (1012) of the heat gaining device (101) is connected to a fluid inlet/outlet port (2011) of the heat releasing device (201) via the pipeline structure (401), thereby forming a closed-loop circulation flowpath, so the heat exchange fluid (104) passing through the heat gaining device (101) is enabled to form a closed-type circulation flowpath through the pipeline structures (301), (401) and the heat releasing device (201), and the heat releasing device (201) releases the thermal energy to the temperature differentiation body (103) at its periphery to provide temperature equalization through the heat exchange fluid (104) performing closed-loop circulation. The heat exchange fluid (104) is constituted by a gaseous or liquid fluid having heat storage and thermal conduction properties; and the temperature differentiation body (103) is a space or structure configured by gas or solid or liquid for receiving the thermal energy released by the heat exchange fluid passing through the heat releasing device (201) during system operation.

Features of the main components of the embodiment illustrated in FIG. 2 are as follows:

Heat gaining device (101): which is made of a material having good heat conductivity, and provided with a flowpath structure jointly configured by one or more flowpaths, or structured by a conduit structure jointly configured by one or more flowpaths, for being installed in the natural heat storage body (100); two ends of the flowpath of the heat gaining device (101) respectively have a fluid inlet/outlet port (1011), (1012) for being respectively connected to one end of the pipeline structure (301) and one end of the pipeline structure (401), so as to lead and be connected to the heat releasing device (201) for forming the closed-type circulation flowpath, in which the flowpath inside the heat gaining device (101) is inclined with respect to horizontal, the fluid inlet/outlet port (1011) at a lower position allows the heat exchange fluid (104) having relatively low temperature to flow in, and the fluid inlet/outlet port (1012) at a higher position allows the heat exchange fluid (104) having a relatively high temperature to flow out, so as to facilitate circulation of the heat exchange fluid (104) as a result of a hot ascending/cold descending effect.

Heat releasing device (201): which is made of a material having good heat conductivity, and provided with a flowpath structure jointly configured by two or more than two flowpaths, or structured by a pipeline structure jointly configured by two or more than two flowpaths; the exterior of the heat releasing device (201) being in contact with the temperature differentiation body (103), and the thermal energy of the heat exchange fluid (104) passing the heat releasing device (201) performing the heat releasing operation to the temperature differentiation body (103) in an omni-directional manner or in a set direction, the height difference between the fluid inlet/outlet port (2011) and the fluid inlet/outlet port (2012) of the heat releasing device (201) being designed to facilitate or at least to have no negative influence on the flow of the heat exchange fluid (104) from the heat gaining device (101) to perform the closed-loop flow circulation in the closed-loop temperature equalization system by means of the hot ascending/cold descending effect of the fluid.

Pipeline structure (301): which is constituted by a fluid pipeline structure jointly configured by one or more flowpaths, the exterior of the pipeline structure (301) being covered by a heat insulation member (109), or a pipeline structure having one or more than one flowpaths being configured by a pipe-like structural body or building structural body made of a material having a good heat insulation property and formed in a round shape or other geometric shapes; one end of the pipeline structure (301) having one or more than one fluid inlet/outlet ports (3011) for being connected to the fluid inlet/outlet port (1011) of the heat gaining device (101), which has one or more than one flowpaths, and the other end of the pipeline structure (301) having one or more than one fluid inlet/outlet ports (3012) for being connected to the fluid inlet/outlet port (2012) of the heat releasing device (201) having two or more than two flowpaths for transporting the heat exchange fluid (104).

Pipeline structure (401): which is constituted by a fluid pipeline structure configured by one or more than one flowpaths in round or other geometric shapes, the pipeline structure (401) being configured by one or more than one following means: 1) configured by a material having good heat conductivity; 2) configured by a material having good heat conductivity, with the exterior of a pipeline segment defined between the pipeline at the location having less temperature differentiation or the same temperature as the natural heat storage body (100) and in contact with the heat releasing device (201) being covered by a heat insulation member (109); 3) configured by a pipe-like structure or building structural body made of a material having a good heat insulation property; one end of the pipeline structure (401) having one or more than one fluid inlet/outlet ports (4012) for being connected to the fluid inlet/outlet port (1012) of the heat gaining device (101), which has one or more than one flowpaths, and the other end of the pipeline structure (401) having one or more fluid inlet/outlet ports (4011) for being respectively connected to the fluid inlet/outlet port (2011) of the heat releasing device (201) having two or more than two flowpaths for transporting the heat exchange fluid (104).

Auxiliary fluid pump (107): which is constituted by a fluid pump driven by a motor driven by electric power externally supplied through a power wire (118) or by a fluid pump driven by natural forces, provided for being series connected to the closed-type circulation flowpath for pumping the heat exchange fluid (104). The auxiliary fluid pump (107) includes a fixed single-direction pumping operation, or the pumping direction is selectable, and the operation of ON/OFF, speed changing or the pumping flow amount is controllable.

The temperature equalization system of this embodiment may have the following operation functions: the auxiliary fluid pump (107) is not operated, and the heat exchange fluid (104) circulates due to the cold descending/hot ascending effect; the auxiliary fluid pump (107) is actively controlled to pump in the normal direction for performing auxiliary pumping in the same direction as the cold descending/hot ascending flow direction of the heat exchange fluid (104); or the auxiliary fluid pump (107) is actively controlled to pump in the reverse direction for performing reverse pumping in the direction opposite to the cold descending/hot ascending flow direction of the heat exchange fluid (104).

By installing the sealing plug (110) and the operation port (111) at the upper end of the top corner of the closed-type circulation flowpath configured by the heat gaining device (101), the heat releasing device (201), the pipeline structure (301) and the pipeline structure (401), the fluid is enabled to be filled in or sucked out, and observation and maintenance can be carried out.

The closed-loop temperature equalization system having a heat releasing device structured by multiple flowpaths includes at least a heat gaining device (101), at least a heat releasing device (201), at least a pipeline structure (301) and at least a pipeline structure (401) in series connection or in series and parallel connection to configure a closed-loop flowpath. The heat gaining device (101), the heat releasing device (201), the pipeline structure (301) and the pipeline structure (401) can be integrally formed or assembled by plural components, the dimension and shape at each connecting location for the assembly having a gradually-altered shape for forming a smooth transition between components, the smooth transition reducing damping while the fluid is flowing, thereby facilitating the flow circulation of the fluid.

The closed-loop temperature equalization device having a heat releasing device structured by multiple flowpaths can be applied to release energy to a gaseous or solid or liquid heat releasing object, such as a road surface, roof, wall, floor of a building, air inside a green house, or air inside a house, or water in a lake, or equipment or structural body desired to be heated for freeze prevention.

Figure 3:
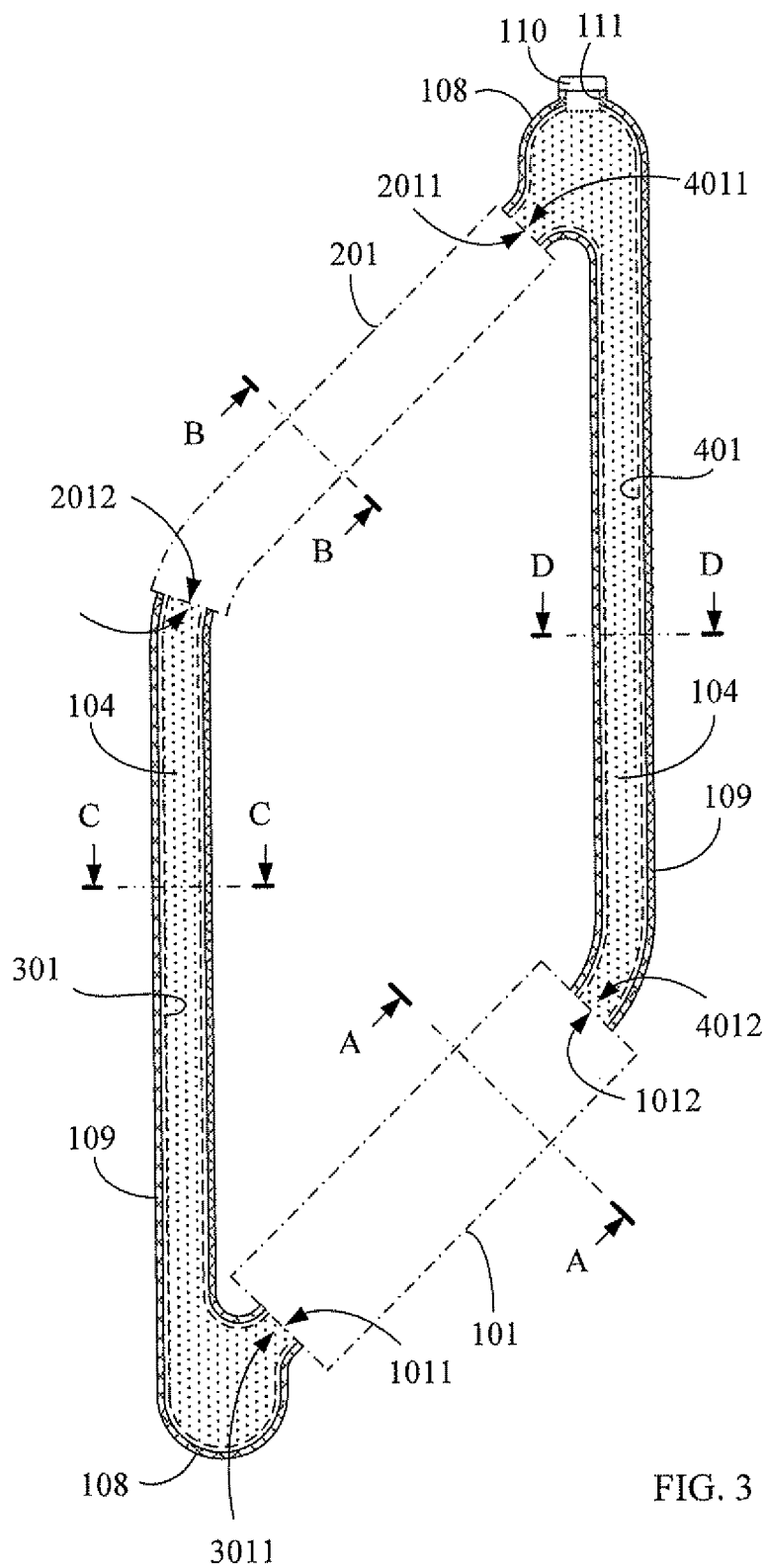
FIG. 3 is a cross-sectional side view showing the embodiment illustrated in FIG. 1, wherein the upper end of the top corner of the closed-type flowpath is installed with an outwardly-expanded arc-shaped fluid chamber (108), and provided with an operation port (111) and sealing plug (110), according to the present invention.

According to the present invention, the closed-loop temperature equalization system having a heat releasing device structured by multiple flowpaths can be further installed with an outwardly-expanded arc-shaped fluid chamber (108) at the upper end of the top corner of the closed-type circulation flowpath configured by the heat gaining device (101), the heat releasing device (201), the pipeline structure (301) and the pipeline structure (401), to reduce damping of the circulative flow of the heat exchange fluid (104), as follows:

FIG. 3 is a cross-sectional side view showing the embodiment illustrated in FIG. 1, wherein the upper end of the top corner of the closed-type flowpath being installed with an outwardly-expanded arc-shaped fluid chamber (108), and being provided with the operation port (111) and the sealing plug (110) thereon, according to the present invention.

As shown in FIG. 3, the heat gaining device (101) is installed in a natural heat storage body (100) which is constituted by a solid or liquid heat storage body having greater and more stable heat storage capacity such as a stratum, ground, lake, pool, river, desert, iceberg and ocean.

A fluid inlet/output port (1011) of the heat gaining device (101) is connected to the fluid inlet/outlet port (2012) of the heat releasing device (201) via the pipeline structure (301), and another fluid inlet/outlet port (1012) of the heat gaining device (101) is connected to a fluid inlet/outlet port (2011) of the heat releasing device (201) via the pipeline structure (401), thereby forming a closed-loop circulation flowpath so that the heat exchange fluid (104) passing through the heat gaining device (101) is enabled to form a closed-type circulation flowpath through the pipeline structures (301), (401) and the heat releasing device (201), and the heat releasing device (201) releases the thermal energy to the temperature differentiation body (103) at its periphery to provide temperature equalization. The heat exchange fluid (104) is constituted by a gaseous or liquid fluid having heat storage and thermal conduction properties; and the temperature differentiation body (103) is a space or structure configured by gas or solid or liquid for receiving the thermal energy released by the heat exchange fluid passing through the heat releasing device (201) during system operation.

Features of the main components the temperature equalization system of the embodiment of FIG. 3 are as follows:

Heat gaining device (101): which is made of a material having good heat conductivity, and provided with a flowpath structure jointly configured by one or more flowpaths, or structured by a conduit structure jointly configured by one or more flowpaths, is installed in the natural heat storage body (100); two ends of the flowpath of the heat gaining device (101) respectively having a fluid inlet/outlet port (1011), (1012) for being respectively connected to one end of the pipeline structure (301) and one end of the pipeline structure (401) so as to lead and be connected to the heat releasing device (201) for forming a closed-type circulation flowpath, the flowpath inside the heat gaining device (101) being inclined with respect to horizontal, the fluid inlet/outlet port (1011) at a lower position allowing the heat exchange fluid (104) having relatively low temperature to flow in, and the fluid inlet/outlet port (1012) at a higher position allowing the heat exchange fluid (104) having relatively high temperature to flow out, so as to cause the heat exchange fluid (104) to circulate as a result of a hot ascending/cold descending effect.

Heat releasing device (201): which is made of a material having good heat conductivity, and provided with a flowpath structure jointly configured by two or more than two flowpaths, or structured by a pipeline structure jointly configured by two or more than two flowpaths; the exterior of the heat releasing device (201) being in contact with the temperature differentiation body (103), and the thermal energy of the heat exchange fluid (104) passing through the heat releasing device (201) releasing heat to the temperature differentiation body (103) in an omni-directional manner or in a set direction, the height difference between the fluid inlet/outlet port (2011) and the fluid inlet/outlet port (2012) of the heat releasing device (201) being designed to facilitate or at least have no negative influence on the flow of heat exchange fluid (104) from the heat gaining device (101) to perform the closed-loop flow circulation in the closed-loop temperature equalization system by means of the hot ascending/cold descending effect of the fluid.

Pipeline structure (301): which is constituted by a fluid pipeline structure jointly configured by one or more flowpaths, the exterior of the pipeline structure (301) being covered by a heat insulation member (109), or a pipeline structure having one or more flowpaths being configured by pipe-like structural body or building structural body made of a material having a good heat insulation property and formed in a round shape or other geometric shapes; one end of the pipeline structure (301) having one or more than one fluid inlet/outlet ports (3011) for being connected to the fluid inlet/outlet port (1011) of the heat gaining device (101), and the other end of the pipeline structure (301) having one or more than one fluid inlet/outlet ports (3012) for being connected to the fluid inlet/outlet port (2012) of the heat releasing device (201) having two or more than two flowpaths for transporting the heat exchange fluid (104).

Pipeline structure (401): which is constituted by a fluid pipeline structure configured by one or more flowpaths in round or other geometric shapes, the pipeline structure (401) being configured by one or more than one of the following means: 1) configured by a material having good heat conductivity; 2) configured by a material having good heat conductivity, the exterior of a pipeline segment defined between the pipeline at the location having less temperature differentiation or the same temperature as the natural heat storage body (100) and contacting the heat releasing device (201) being covered by a heat insulation member (109); 3) configured by a pipe-like structure or building structural body made of a material having a good heat insulation property; one end of the pipeline structure (401) having one or more than one fluid inlet/outlet ports (4012) for being connected to the fluid inlet/outlet port (1012) of the heat gaining device (101), and the other end of the pipeline structure (401) having one or more than one fluid inlet/outlet ports (4011) for being respectively connected to the fluid inlet/outlet port (2011) of the heat releasing device (201) having two or more than two flowpaths for transporting the heat exchange fluid (104).

Outwardly-expanded arc-shaped fluid chamber (108): which is constituted by an outwardly-expanded arc-shaped flowpath structure formed at one or more turning locations of the closed-type circulation flowpath configured by the heat gaining device (101), the heat releasing device (201), the pipeline structure (301) and the pipeline structure (401), for temporarily storing a part of the heat exchange fluid (104) and moderating the flow speed of the heat exchange fluid (104) so as to reduce flow damping of the closed-type circulation flowpath to the heat exchange fluid (104).

By installing the outwardly-expanded arc-shaped fluid chamber (108) at the upper end of the top corner of the closed-type circulation flowpath configured by the heat gaining device (101), the heat releasing device (201), the pipeline structure (301) and the pipeline structure (401), the damping generated when the heat exchange fluid (104) performs circulative flow can be reduced to facilitate heat exchange, and by installing the sealing plug (110) and the operation port (111) at the upper end of the outwardly-expanded arc-shaped fluid chamber (108) installed at the turning location defined between the pipeline structure (401) and the heat releasing device (201), the fluid is allowed to be filled in or sucked out, and observation and maintenance can be carried out.

The volume of the fluid stored in the outwardly-expanded arc-shaped fluid chamber (108) installed close to the fluid inlet/outlet port of the heat gaining device (101) or the heat releasing device (201) is relatively larger and therefore the total heat capacity is larger, so that when the thermal energy introduced from the temperature differentiation body which is in contact with the exterior of the heat gaining device (101) or the heat releasing device (201) is transmitted towards two ends through the fluid, the fluid at the end where the heat gaining device (101) or the heat releasing device (201) is provided with the outwardly-expanded arc-shaped fluid chamber (108) generates a smaller temperature difference, and the other end where the outwardly-expanded arc-shaped fluid chamber (108) is not installed generates a greater temperature difference, resulting in temperature differentiation between the two ends of the inlet/outlet port of the heat gaining device (101) or the heat releasing device (201).

The closed-loop temperature equalization system having a heat releasing device structured by multiple flowpath includes at least a heat gaining device (101), at least a heat releasing device (201), at least a pipeline structure (301) and at least a pipeline structure (401) in series connection or in series and parallel connection to configure a closed-loop flowpath; wherein the heat gaining device (101), the heat releasing device (201), the pipeline structure (301) and the pipeline structure (401) can be integrally formed or assembled by plural components, the dimension and shape at each connecting location for the assembly being gradually-altered to provide a smooth transition between components that can reduce damping while the fluid is flowing, thereby facilitating circulation of the fluid.

The closed-loop temperature equalization system having a heat releasing device structured by multiple flowpaths can be applied to release energy to a gaseous or solid or liquid heat releasing object, such as a road surface, roof, wall, floor of a building, air inside a green house, or air inside a house, or water in a lake, or equipment or structural body desired to be heated for freeze prevention.

Figure 4:
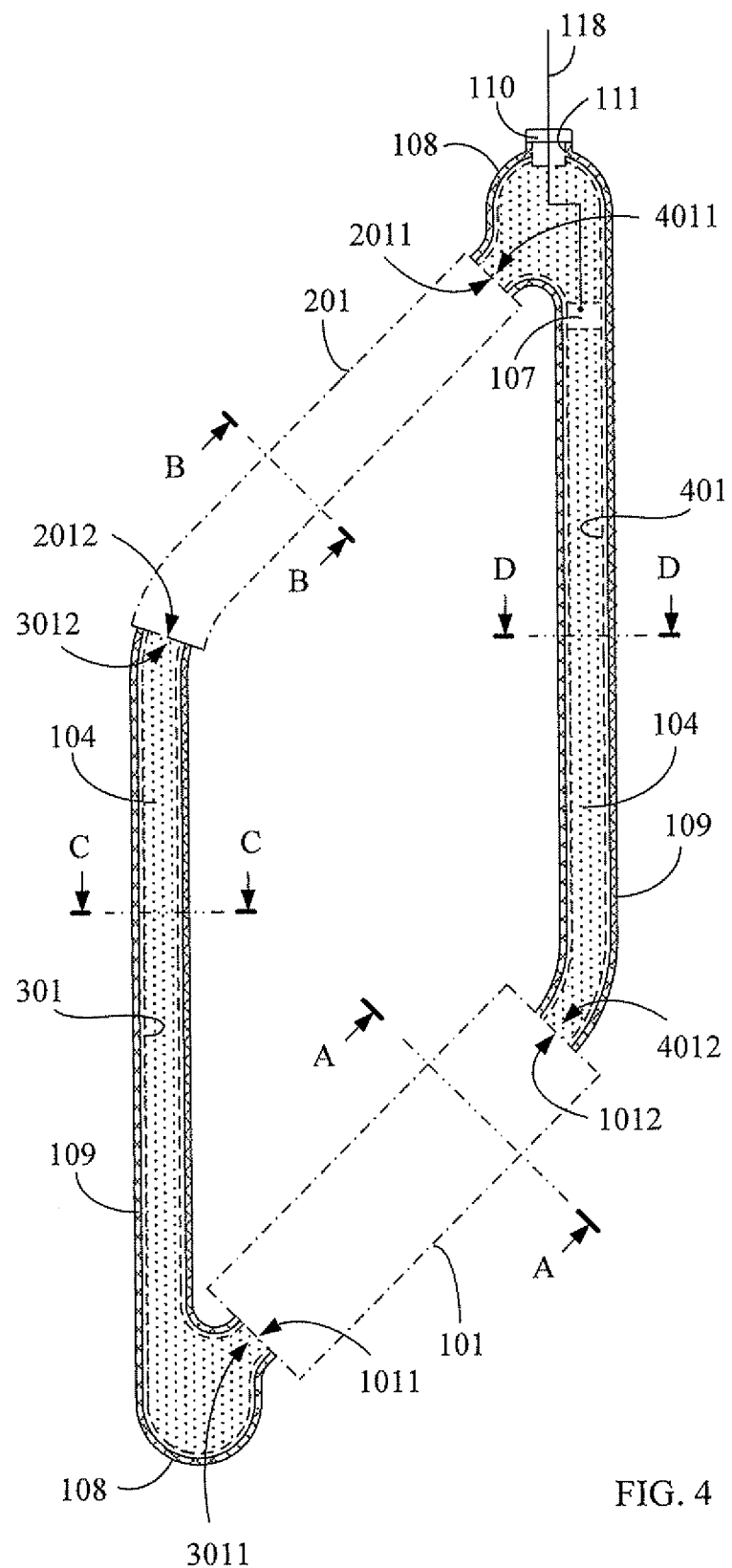
FIG. 4 is a cross-sectional side view showing the embodiment illustrated in FIG. 1 installed with an auxiliary fluid pump (107) and installed with an outwardly-expanded arc-shaped fluid chamber (108), operation port (111) and sealing plug (110) at the top end of the corner part of the closed-type flowpath.

According to the present invention, the closed-loop temperature equalization device having heat releasing device structured by multiple flowpath can be further provided with an auxiliary fluid pump (107) series installed in the closed-type circulation flowpath configured by the heat gaining device (101), the heat releasing device (201), the pipeline structure (301) and the pipeline structure (401) for actively controlling the auxiliary fluid pump (107) to pump in the normal direction or pump in a reverse direction or stop operation, or installed in the outwardly-expanded arc-shaped fluid chamber (108) at the upper end of the top corner of the closed-type circulation flowpath for lowering the damping of the closed-type circulative flow of the heat exchange fluid (104) so as to facilitate the heat exchange, as follows:

FIG. 4 is a lateral structure view showing the embodiment illustrated in FIG. 1 being installed with the auxiliary fluid pump (107) and being installed with the outwardly-expanded arc-shaped fluid chamber (108) and operation port (111) and sealing plug (110) at the top end of the corner part of the closed-type flowpath.

As shown in FIG. 4, the heat gaining device (101) is installed in a natural heat storage body (100) which is constituted by a solid or liquid heat storage body having greater and more stable heat storage capacity such as a stratum, ground, lake, pool, river, desert, iceberg and ocean.

A fluid inlet/output port (1011) of the heat gaining device (101) is connected to the fluid inlet/outlet port (2012) of the heat releasing device (201) via the pipeline structure (301), and another fluid inlet/outlet port (1012) of the heat gaining device (101) is connected to a fluid inlet/outlet port (2011) of the heat releasing device (201) via the pipeline structure (401), thereby forming a closed-loop circulation flowpath so that the heat exchange fluid (104) passing through the heat gaining device (101) is enabled to form a closed-type circulation flowpath through the pipeline structures (301), (401) and the heat releasing device (201), and the heat releasing device (201) releases the thermal energy to the temperature differentiation body (103) at its periphery. As a result of the heat exchange fluid (104) performing closed-loop flow circulation in the closed-loop temperature equalization system, the thermal energy of the natural heat storage body (100) and the thermal energy of the temperature differentiation body (103) are transmitted for temperature equalization, the heat exchange fluid (104) being constituted by a gaseous or liquid fluid having heat storage and thermal conduction properties, the temperature differentiation body (103) being a space or structure configured by gas or solid or liquid for receiving the thermal energy released by the heat exchange fluid passing the heat releasing device (201) during system operation.

Features of the main components of the embodiment of FIG. 4 are as follows:

Heat gaining device (101): which is made of a material having good heat conductivity, and provided with a flowpath structure jointly configured by one or more flowpaths, or structured by a conduit structure jointly configured by one or more flowpaths, is installed in the natural heat storage body (100); two ends of the flowpath of the heat gaining device (101) respectively having a fluid inlet/outlet port (1011), (1012) for being respectively connected to one end of the pipeline structure (301) and one end of the pipeline structure (401) so as to lead and be connected to the heat releasing device (201) for forming a closed-type circulation flowpath, in which the flowpath inside the heat gaining device (101) is inclined with respect to the horizontal level, the fluid inlet/outlet port (1011) at a lower position allowing the heat exchange fluid (104) having relatively low temperature to flow in, and the fluid inlet/outlet port (1012) at a higher position allowing the heat exchange fluid (104) having relatively high temperature to flow out, so as to cause the heat exchange fluid (104) to generate a hot ascending/cold descending effect.

Heat releasing device (201): which is made of a material having good heat conductivity, and provided with a flowpath structure jointly configured by two or more than two flowpaths, or structured by a pipeline structure jointly configured by two or more than two flowpaths; the exterior of the heat releasing device (201) being in contact with the temperature differentiation body (103), and the thermal energy of the heat exchange fluid (104) passing through the heat releasing device (201) releasing heat to the temperature differentiation body (103) in an omni-directional manner or in a set direction, the height difference between the fluid inlet/outlet port (2011) and the fluid inlet/outlet port (2012) of the heat releasing device (201) being designed to facilitate or at least have no negative influence on the heat exchange fluid (104) flowing from the heat gaining device (101) to perform the closed-loop flow circulation in the closed-loop temperature equalization system by means of the hot ascending/cold descending effect of the fluid.

Pipeline structure (301): which is constituted by a fluid pipeline structure jointly configured by one or more flowpaths, the exterior of the pipeline structure (301) being covered by a heat insulation member (109), or a pipeline structure having one or more than one flowpaths being configured by pipe-like structural body or building structural body made of a material having good heat insulation property and formed in a round shape or other geometric shapes; one end of the pipeline structure (301) having one or more than one fluid inlet/outlet ports (3011) for being connected to the fluid inlet/outlet port (1011) of the heat gaining device (101), and the other end of the pipeline structure (301) having one or more than one fluid inlet/outlet ports (3012) for being connected to the fluid inlet/outlet port (2012) of the heat releasing device (201) having two or more than two flowpaths for transporting the heat exchange fluid (104).

Pipeline structure (401): which is constituted by a fluid pipeline structure configured by one or more than one flowpaths in round or other geometric shapes, the pipeline structure (401) being configured by one or more than one of the following means: 1) configured by a material having good heat conductivity; 2) configured by a material having good heat conductivity, the exterior of a pipeline segment defined between the pipeline at the location having less temperature differentiation or the same temperature as the natural heat storage body (100) and contacting the heat releasing device (201) being covered by a heat insulation member (109); 3) configured by a pipe-like structure or building structural body made of a material having a good heat insulation property; one end of the pipeline structure (401) having one or more than one fluid inlet/outlet ports (4012) for being connected to the fluid inlet/outlet port (1012) of the heat gaining device (101), and the other end of the pipeline structure (401) having one or more than one fluid inlet/outlet ports (4011) for being respectively connected to the fluid inlet/outlet port (2011) of the heat releasing device (201) for transporting the heat exchange fluid (104).

Outwardly-expanded arc-shaped fluid chamber (108): which is constituted by an outwardly-expanded arc-shaped flowpath structure formed at one or more than one of the turning locations of the closed-type circulation flowpath configured by the heat gaining device (101), the heat releasing device (201), the pipeline structure (301) and the pipeline structure (401), temporarily storing a part of the heat exchange fluid (104) and moderating the flow speed of the heat exchange fluid (104) so as to reduce flow damping of the closed-type circulation flowpath to the heat exchange fluid (104). By installing the sealing plug (110) and the operation port (111) at the upper end of the outwardly-expanded arc-shaped fluid chamber (108) installed at the turning location defined between the pipeline structure (401) and the heat releasing device (201), the fluid is allowed to be filled in or sucked out, and observation and maintenance can be carried out.

The volume of the fluid stored in the outwardly-expanded arc-shaped fluid chamber (108) installed close to the fluid inlet/outlet port of the heat gaining device (101) or the heat releasing device (201) is relatively larger, and therefore the total heat capacity is larger, so that when the thermal energy introduced from the temperature differentiation body which is in contact with exterior of the heat gaining device (101) or the heat releasing device (201) is transmitted towards two ends through the fluid, the fluid at the end where the heat gaining device (101) or the heat releasing device (201) is provided with the outwardly-expanded arc-shaped fluid chamber (108) generates a smaller temperature difference, and the other end where the outwardly-expanded arc-shaped fluid chamber (108) is not installed generates a greater temperature difference, resulting in temperature differentiation between the two ends of the inlet/outlet port of the heat gaining device (101) or the heat releasing device (201).

Auxiliary fluid pump (107): which is constituted by a fluid pump driven by a motor driven by electric power externally supplied through a power wire (118) or by a fluid pump driven by natural forces, for being series connected to the closed-type circulation flowpath for pumping the heat exchange fluid (104); the auxiliary fluid pump (107) having a fixed single-direction pumping operation, or a pumping direction that is selectable, and the operations of ON/OFF, speed changing or pumping flow amount being controllable.

The auxiliary fluid pump (107) may have the following operating modes: when the auxiliary fluid pump (107) is not operated, the heat exchange fluid (104) circulates due to the cold descending/hot ascending effect; or the auxiliary fluid pump (107) may be actively controlled to pump in the normal direction, for performing auxiliary pumping in the same direction as the cold descending/hot ascending flow direction of the heat exchange fluid (104); or actively controlled to pump in the reverse direction, for performing reverse pumping in the direction opposite the cold descending/hot ascending flow direction of the heat exchange fluid (104).

The closed-loop temperature equalization system having a heat releasing device structured by multiple flowpaths includes at least a heat gaining device (101), at least a heat releasing device (201), at least a pipeline structure (301) and at least a pipeline structure (401) in series connection or in series and parallel connection to configure a closed-loop flowpath; wherein the heat gaining device (101), the heat releasing device (201), the pipeline structure (301) and the pipeline structure (401) can be integrally formed or assembled by plural components, the dimension and shape at each connecting location for the assembly being gradually-altered for forming a smooth transition between components to reduce damping while the fluid is flowing, thereby facilitating circulation of the fluid.

The closed-loop temperature equalization device having a heat releasing device structured by multiple flowpath can be applied to release energy to a gaseous or solid or liquid heat releasing object, such as a road surface, roof, wall, floor of a building, air inside a green house, or air inside a house, or water in a lake, or equipment or structural body desired to be heated for freeze prevention.

Figure 5:
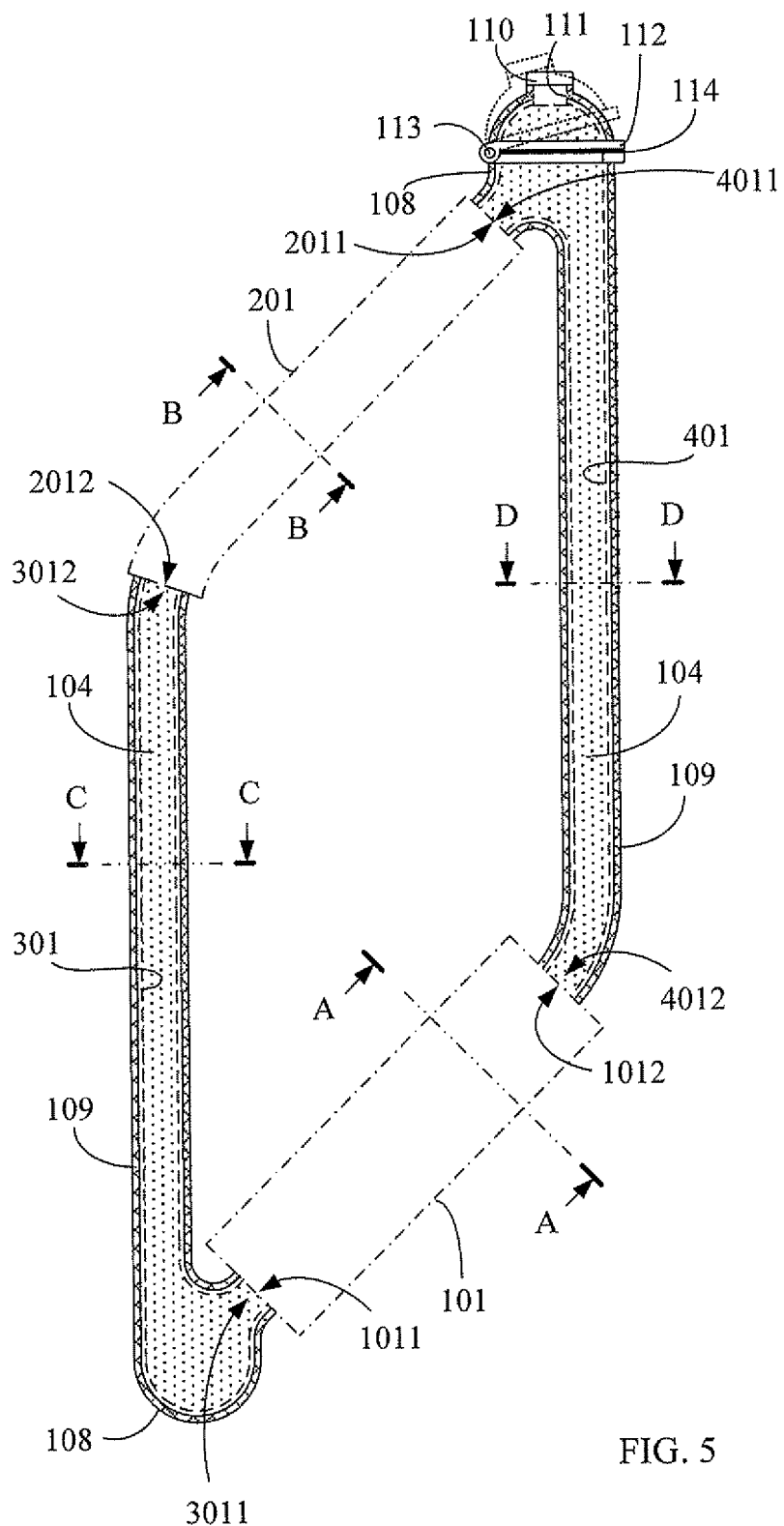
FIG. 5 is a cross-sectional side view showing the embodiment illustrated in FIG. 1 installed with an outwardly-expanded arc-shaped fluid chamber (108) at the upper end of the top corner of the closed-type flowpath and installed with a top cover (112) capable of being opened or tightly engaged, a hinge (113), a sealing ring (114), and a sealing plug (110) and operation port (111) installed at the upper end of the top cover, according to the present invention.

According to the present invention, the closed-loop temperature equalization system having a heat releasing device structured by multiple flowpaths can be further installed with an outwardly-expanded arc-shaped fluid chamber (108) at the upper end of the top corner of the closed-type circulation flowpath configured by the heat gaining device (101), the heat releasing device (201), the pipeline structure (301) and the pipeline structure (401) for lowering damping of the circulative flow of the heat exchange fluid (104), the topmost outwardly-expanded arc-shaped fluid chamber (108) being installed with a top cover (112) capable of being opened or tightly engaged, a hinge (113), and a sealing ring (114), with a sealing plug (110) and operation port (111) being installed at the upper end of the top cover, as follows:

FIG. 5 is a cross-sectional side view showing the embodiment illustrated in FIG. 1 being installed with the outwardly-expanded arc-shaped fluid chamber (108) at the upper end of the top corner of the closed-type flowpath, a top cover (112) capable of being opened or tightly engaged, a hinge (113), a sealing ring (114), and a sealing plug (110) and operation port (111) installed at the upper end of the top cover, according to the present invention.

As shown in FIG. 5, the heat gaining device (101) is installed in a natural heat storage body (100) which is constituted by a solid or liquid heat storage body having greater and stable heat storage capacity such as a stratum, ground, lake, pool, river, desert, iceberg and ocean.

A fluid inlet/output port (1011) of the heat gaining device (101) is connected to the fluid inlet/outlet port (2012) of the heat releasing device (201) via the pipeline structure (301), and another fluid inlet/outlet port (1012) of the heat gaining device (101) is connected to a fluid inlet/outlet port (2011) of the heat releasing device (201) via the pipeline structure (401), thereby forming a closed-loop circulation flowpath so that the heat exchange fluid (104) passing through the heat gaining device (101) is enabled to form a closed-type circulation flowpath through the pipeline structures (301), (401) and the heat releasing device (201), and the heat releasing device (201) releases the thermal energy to the temperature differentiation body (103) at its periphery. As a result of the heat exchange fluid (104) performing closed-loop flow circulation in the closed-loop temperature equalization system, the thermal energy of the natural heat storage body (100) and the thermal energy of the temperature differentiation body (103) subjected to temperature equalization are transmitted for temperature equalization, the heat exchange fluid (104) being constituted by a gaseous or liquid fluid having heat storage and thermal conduction properties; and the temperature differentiation body (103) being a space or structure configured by gas or solid or liquid for receiving the thermal energy released by the heat exchange fluid passing the heat releasing device (201) during system operation.

Features of the main components of the embodiment of FIG. 5 are as follows:

Heat gaining device (101): which is made of a material having good heat conductivity, and provided with a flowpath structure jointly configured by one or more flowpaths, or structured by a conduit structure jointly configured by one or more flowpaths, is installed in the natural heat storage body (100); two ends of the flowpath of the heat gaining device (101) respectively having a fluid inlet/outlet port (1011), (1012) for being respectively connected to one end of the pipeline structure (301) and one end of the pipeline structure (401) so as to lead and be connected to the heat releasing device (201) for forming a closed-type circulation flowpath, in which the flowpath inside the heat gaining device (101) is inclined with respect to the horizontal level, the fluid inlet/outlet port (1011) at a lower position allowing the heat exchange fluid (104) having a relatively low temperature to flow in, and the fluid inlet/outlet port (1012) at a higher position allowing the heat exchange fluid (104) having a relatively high temperature to flow out, so as to facilitate the heat exchange fluid (104) to generate a hot ascending/cold descending effect.

Heat releasing device (201): which is made of a material having good heat conductivity, and provided with a flowpath structure jointly configured by two or more than two flowpaths, or structured by a pipeline structure jointly configured by two or more than two flowpaths; the exterior of the heat releasing device (201) contacting the temperature differentiation body (103), and the thermal energy of the heat exchange fluid (104) passing through the heat releasing device (201) releasing heat to the temperature differentiation body (103) in an omni-directional manner or in a set direction, the height difference between the fluid inlet/outlet port (2011) and the fluid inlet/outlet port (2012) of the heat releasing device (201) being designed to facilitate or at least to have no negative influence on the heat exchange fluid (104) flowing from the heat gaining device (101) to perform the closed-loop flow circulation in the closed-loop temperature equalization system by means of the hot ascending/cold descending effect of the fluid.

Pipeline structure (301): which is constituted by a fluid pipeline structure jointly configured by one or more flowpaths, the exterior of the pipeline structure (301) being covered by a heat insulation member (109), or a pipeline structure having one or more than one flowpaths being configured by a pipe-like structural body or building structural body made of a material having a good heat insulation property and formed in a round shape or other geometric shapes; one end of the pipeline structure (301) having one or more fluid inlet/outlet ports (3011) for being connected to the fluid inlet/outlet port (1011) of the heat gaining device (101), and the other end of the pipeline structure (301) having one or more than one fluid inlet/outlet ports (3012) for being connected to the fluid inlet/outlet port (2012) of the heat releasing device (201) for transporting the heat exchange fluid (104).

Pipeline structure (401): which is constituted by a fluid pipeline structure configured by one or more flowpaths in round or other geometric shapes, the pipeline structure (401) being configured by one or more than one of the following means: 1) configured by a material having good heat conductivity; 2) configured by a material having good heat conductivity, the exterior of a pipeline segment defined between the pipeline at the location having less temperature differentiation or the same temperature as the natural heat storage body (100) and contacting the heat releasing device (201) being covered by a heat insulation member (109); 3) configured by a pipe-like structure or building structural body made of a material having good heat insulation property; one end of the pipeline structure (401) having one or more fluid inlet/outlet ports (4012) for being connected to the fluid inlet/outlet port (1012) of the heat gaining device (101), and the other end of the pipeline structure (401) having one or more than one fluid inlet/outlet ports (4011) being respectively connected to the fluid inlet/outlet port (2011) of the heat releasing device (201) for transporting the heat exchange fluid (104).

Outwardly-expanded arc-shaped fluid chamber (108): which is constituted by an outwardly-expanded arc-shaped flowpath structure formed at one or more turning locations of the closed-type circulation flowpath configured by the heat gaining device (101), the heat releasing device (201), the pipeline structure (301) and the pipeline structure (401), for temporarily storing a part of the heat exchange fluid (104) and moderating the flow speed of the heat exchange fluid (104) so as to reduce the flow damping of the closed-type circulation flowpath to the heat exchange fluid (104).

By installing the mentioned outwardly-expanded arc-shaped fluid chamber (108) at the upper end of the top corner of the closed-type circulation flowpath configured by the heat gaining device (101), the heat releasing device (201), the pipeline structure (301) and the pipeline structure (401), the damping generated when the heat exchange fluid (104) performs circulative flow can be reduced, thereby facilitating heat exchange. The topmost outwardly-expanded arc-shaped fluid chamber (108) is installed with a top cover (112) capable of being opened or tightly engaged, a hinge (113), and a sealing ring (114) to facilitate pipeline maintenance, and the upper end of the top cover is installed with a sealing plug (110) and operation port (111) to allow fluid to be filled in or sucked out and allowing observation and maintenance to be carried out. A protection fence or protection net can be optionally installed between the top cover (112) and the pipeline.

The volume of the fluid stored in the outwardly-expanded arc-shaped fluid chamber (108) installed close to the fluid inlet/outlet port of the heat gaining device (101) or the heat releasing device (201) is relatively larger, and therefore the total heat capacity is larger, so that when the thermal energy introduced from the temperature differentiation body which is in contact with the exterior of the heat gaining device (101) or the heat releasing device (201) is transmitted towards two ends through the fluid, the fluid at the end where the heat gaining device (101) or the heat releasing device (201) is provided with the outwardly-expanded arc-shaped fluid chamber (108) generates a smaller temperature difference, and the other end where the outwardly-expanded arc-shaped fluid chamber (108) is not installed generates a greater temperature difference, resulting temperature differentiation at the two ends of the inlet/outlet port of the heat gaining device (101) or the heat releasing device (201).

The closed-loop temperature equalization system having a heat releasing device structured by multiple flowpaths includes at least a heat gaining device (101), at least a heat releasing device (201), at least a pipeline structure (301) and at least a pipeline structure (401) in series connection or in series and parallel connection to configure a closed-loop flowpath; wherein the heat gaining device (101), the heat releasing device (201), the pipeline structure (301) and the pipeline structure (401) can be integrally formed or assembled by plural components, the dimension and shape at each connecting location for the assembly being gradually-altered for forming a smooth transition to reduce damping while the fluid is flowing, thereby facilitating circulation of the fluid.

The closed-loop temperature equalization system having a heat releasing device structured by multiple flowpaths can be applied to release energy to a gaseous or solid or liquid heat releasing object, such as a road surface, roof, wall, floor of a building, air inside a green house, or air inside a house, or water in a lake, or equipment or structural body desired to be heated for freeze prevention.

Figure 6:
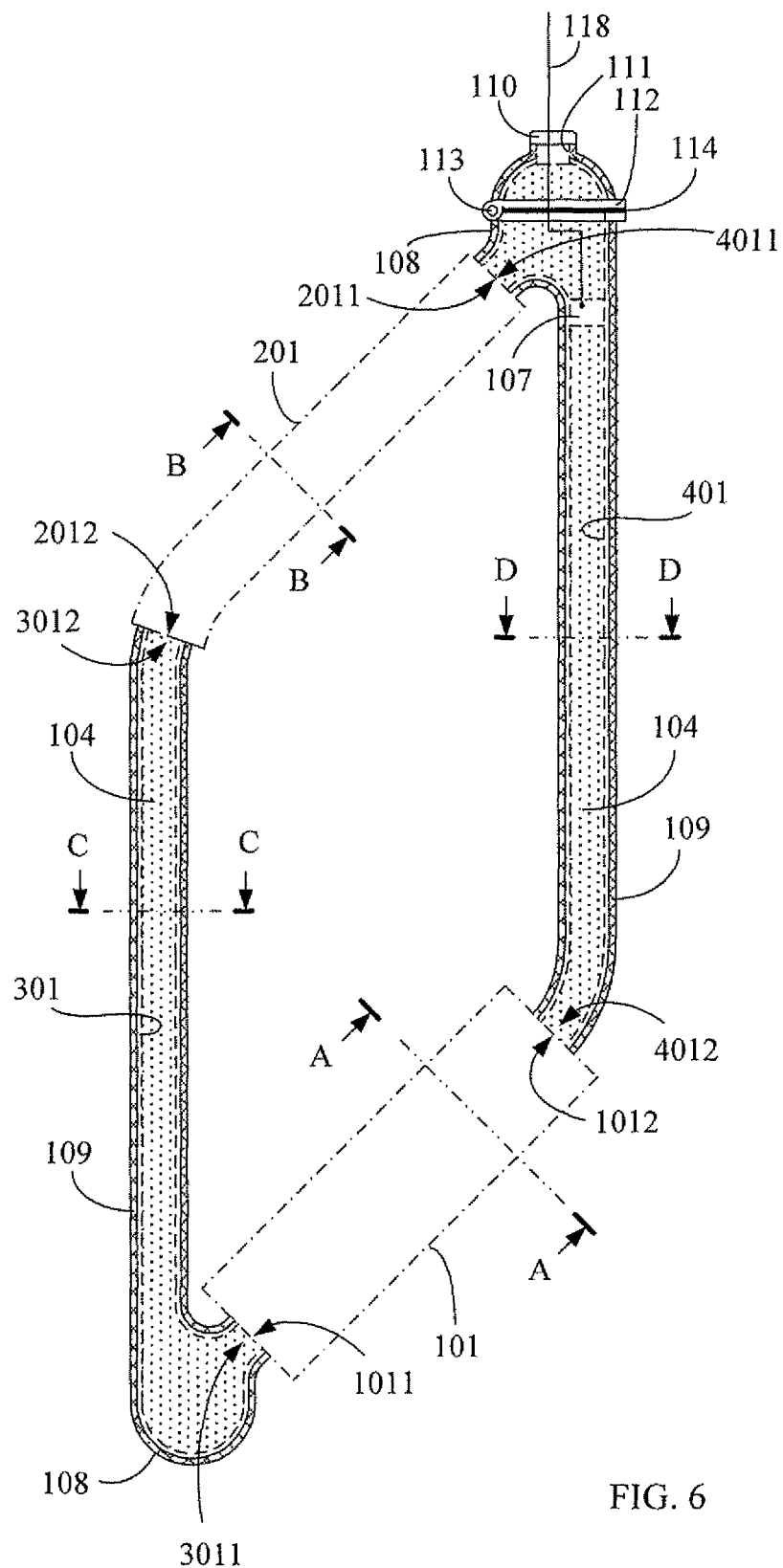
FIG. 6 is a cross-sectional side view showing the embodiment illustrated in FIG. 1 installed with an auxiliary fluid pump and outwardly-expanded arc-shaped fluid chamber (108) at the upper end of the top corner of the closed-type flowpath, and the topmost outwardly-expanded arc-shaped fluid chamber (108) being further installed with a top cover (112) capable of being opened or tightly engaged, a hinge (113), a sealing ring (114), and having a sealing plug (110) and operation port (111) installed at the upper end of the top cover, according to the present invention.

According to the present invention, the closed-loop temperature equalization system having a heat releasing device structured by multiple flowpaths can be further series installed with an auxiliary fluid pump (107) in the closed-type circulation flowpath configured by the heat gaining device (101), the heat releasing device (201), the pipeline structure (301) and the pipeline structure (401) the auxiliary fluid pump (107) can be actively controlled to pump in the normal direction or pump in the reverse direction or stop operation, the outwardly-expanded arc-shaped fluid chamber (108) can be installed at the upper end of the top corner of the closed-type flowpath for lowering damping of the closed-type circulative flow of the heat exchange fluid (104) to facilitate the heat exchange, and the outwardly-expanded topmost arc-shaped fluid chamber (108) can in addition be further installed with a top cover (112) capable of being opened or tightly engaged, a hinge (113), a sealing ring (114), and a sealing plug (110) and operation port (111) installed at the upper end of the top cover, as follows:

FIG. 6 is a cross-sectional side view showing the embodiment illustrated in FIG. 1 being installed with the auxiliary fluid pump and outwardly-expanded arc-shaped fluid chamber (108) at the upper end of the top corner of the closed-type flowpath, with the outwardly-expanded arc-shaped fluid chamber (108) being further installed with the top cover (112) capable of being opened or tightly engaged, the hinge (113), the sealing ring (114), and the sealing plug (110) and operation port (111) installed at the upper end of the top cover, according to the present invention.

As shown in FIG. 6, the heat gaining device (101) is installed in a natural heat storage body (100) which is constituted by a solid or liquid heat storage body having greater and more stable heat storage capacity, such as a stratum, ground, lake, pool, river, desert, iceberg and ocean.

A fluid inlet/output port (1011) of the heat gaining device (101) is connected to the fluid inlet/outlet port (2012) of the heat releasing device (201) via the pipeline structure (301), and another fluid inlet/outlet port (1012) of the heat gaining device (101) is connected to a fluid inlet/outlet port (2011) of the heat releasing device (201) via the pipeline structure (401), thereby forming a closed-loop circulation flowpath so that the heat exchange fluid (104) passing through the heat gaining device (101) forms a closed-type circulation flowpath through the pipeline structures (301), (401) and the heat releasing device (201), and the heat releasing device (201) releases the thermal energy to the temperature differentiation body (103) at its periphery as the heat exchange fluid (104) performs closed-loop circulation. The heat exchange fluid (104) is constituted by a gaseous or liquid fluid having heat storage and thermal conduction properties and the temperature differentiation body (103) is a space or structure configured by gas or solid or liquid for receiving the thermal energy released by the heat exchange fluid passing through the heat releasing device (201) during system operation.

Features of main components of the embodiment of FIG. 6 are as follows:

Heat gaining device (101): which is made of a material having good heat conductivity, and provided with a flowpath structure jointly configured by one or more flowpaths, or structured by a conduit structure jointly configured by one or more flowpaths, for being installed in the natural heat storage body (100); two ends of the flowpath of the heat gaining device (101) respectively having a fluid inlet/outlet port (1011), (1012) for being respectively connected to one end of the pipeline structure (301) and to one end of the pipeline structure (401) so as to lead and be connected to the heat releasing device (201) to form a closed-type circulation flowpath, in which the flowpath inside the heat gaining device (101) is inclined with respect to horizontal, the fluid inlet/outlet port (1011) at a lower position allowing the heat exchange fluid (104) having relatively low temperature to flow in, and the fluid inlet/outlet port (1012) at a higher position allowing the heat exchange fluid (104) having relatively high temperature to flow out, so as to generate a hot ascending/cold descending effect.

Heat releasing device (201): which is made of a material having good heat conductivity, and provided with a flowpath structure jointly configured by two or more than two flowpaths, or structured by a pipeline structure jointly configured by two or more than two flowpaths; the exterior of the heat releasing device (201) contacting the temperature differentiation body (103), and the thermal energy of the heat exchange fluid (104) passing through the heat releasing device (201) releasing heat to the temperature differentiation body (103) in an omni-directional manner or in a set direction, the height difference between the fluid inlet/outlet port (2011) and the fluid inlet/outlet port (2012) of the heat releasing device (201) being designed to facilitate or at least to have no negative influence on the flow of heat exchange fluid (104) from the heat gaining device (101) to perform the closed-loop flow circulation by means of the hot ascending/cold descending effect of the fluid.

Pipeline structure (301): which is constituted by a fluid pipeline structure jointly configured by one or more flowpaths, the exterior of the pipeline structure (301) being covered by a heat insulation member (109), or a pipeline structure having one or more flowpaths being configured by a pipe-like structural body or building structural body made of a material having good heat insulation property and formed in a round shape or other geometric shapes; one end of the pipeline structure (301) having one or more fluid inlet/outlet ports (3011) for being connected to the fluid inlet/outlet port (1011) of the heat gaining device (101), and the other end of the pipeline structure (301) having one or more fluid inlet/outlet ports (3012) for being connected to the fluid inlet/outlet port (2012) of the heat releasing device (201) for transporting the heat exchange fluid (104).

Pipeline structure (401): which is constituted by a fluid pipeline structure configured by one or more flowpaths in round or other geometric shapes, the pipeline structure (401) being configured by one or more of the following means: 1) configured by a material having good heat conductivity; 2) configured by a material having good heat conductivity, and the exterior of a pipeline segment at the location having less temperature differentiation or the same temperature as the natural heat storage body (100) and that contacts the heat releasing device (201) being covered by a heat insulation member (109); 3) configured by a pipe-like structure or building structural body made of a material having good heat insulation property; one end of the pipeline structure (401) having one or more fluid inlet/outlet ports (4012) for being connected to the fluid inlet/outlet port (1012) of the heat gaining device (101), and the other end of the pipeline structure (401) having one or more than one fluid inlet/outlet ports (4011) for being respectively connected to the fluid inlet/outlet port (2011) of the heat releasing device (201) for transporting the heat exchange fluid (104).

Outwardly-expanded arc-shaped fluid chamber (108): which is constituted by an outwardly-expanded arc-shaped flowpath structure formed at one or more of the turning locations of the closed-type circulation flowpath configured by the heat gaining device (101), the heat releasing device (201), the pipeline structure (301) and the pipeline structure (401), for temporarily storing a part of the heat exchange fluid (104) and moderating the flow speed of the heat exchange fluid (104) so as to reduce flow damping of the heat exchange fluid (104), the topmost outwardly-expanded arc-shaped fluid chamber (108) being installed with a top cover (112) capable of being opened or tightly engaged, a hinge (113) and the sealing ring (114) to facilitate pipeline maintenance, and the upper end of the top cover being installed with the sealing plug (110) and operation port (111) to allow the fluid to be filled in or sucked out and to allow observation and maintenance to be carried out, with a protection fence or protection net being optionally installed between the top cover (112) and the pipeline.

The volume of the fluid stored in the outwardly-expanded arc-shaped fluid chamber (108) installed close to the fluid inlet/outlet port of the heat gaining device (101) or the heat releasing device (201) is relatively large, and therefore the total heat capacity is also relatively large, when the thermal energy introduced from the temperature differentiation body which is in contact with exterior of the heat gaining device (101) or the heat releasing device (201) is transmitted towards two ends through the heat exchange fluid (104), the fluid at the end where the heat gaining device (101) or the heat releasing device (201) is provided with the outwardly-expanded arc-shaped fluid chamber (108) generating a smaller temperature difference, and the other end where the outwardly-expanded arc-shaped fluid chamber (108) is not installed generating a greater temperature difference, thereby forming temperature differentiation between the inlet/outlet ports at the two ends of the heat gaining device (101) or the heat releasing device (201).

Auxiliary fluid pump (107): which is constituted by a fluid pump driven by a motor driven by electric power externally supplied through a power wire (118) or by a fluid pump driven by natural forces, and series connected to the closed-type circulation flowpath for pumping the heat exchange fluid (104); the auxiliary fluid pump (107) including a fixed single-direction pumping operation, or a selectable pumping direction, and controllable ON/OFF, speed changing, or pumping flow amount setting operations.

Operation functions of the auxiliary fluid pump 107 include: a function in which the auxiliary fluid pump (107) is not operated, and the heat exchange fluid (104) circulates due to the cold descending/hot ascending effect; an active control function in which the auxiliary fluid pump (107) is controlled to pump in the normal direction, for performing auxiliary pumping in the same direction as the cold descending/hot ascending flow direction of the heat exchange fluid (104); or an active control function in which the auxiliary fluid pump (107) is controlled to pump in the reverse direction, for performing reverse pumping in the direction opposite to the cold descending/hot ascending flow direction of the heat exchange fluid (104).

The closed-loop temperature equalization system having a heat releasing device structured by multiple flowpaths includes at least a heat gaining device (101), at least a heat releasing device (201), at least a pipeline structure (301) and at least a pipeline structure (401) in series connection or in series and parallel connection to configure a closed-loop flowpath; wherein the heat gaining device (101), the heat releasing device (201), the pipeline structure (301) and the pipeline structure (401) can be integrally formed or assembled by plural components, the dimension and shape at each connecting location for the assembly being gradually-altered to provide a smooth transition between components, the smooth transition reducing damping while the fluid is flowing, thereby facilitating circulation of the fluid.

The closed-loop temperature equalization system having a heat releasing device structured by multiple flowpaths can be applied to release energy to a gaseous or solid or liquid heat releasing object, such as a road surface, roof, wall, floor of a building, air inside a green house, or air inside a house, or water in a lake, or equipment or structural body desired to be heated for freeze prevention.

According to the embodiments of the closed-loop temperature equalization system shown in FIG. 1 to FIG. 6, one or more than one auxiliary heating/cooling devices (115) can be installed in the interior or the exterior of the flowpath segment configured by the heat gaining device (101) and the pipeline structure (401), for actively controlling the thermal energy transmitted from the heat releasing device (201) to the temperature differentiation body (103), wherein:

Auxiliary heating/cooling device (115) is driven by electric power provided from a power wire (116), may be constituted by an electrothermal device capable of converting electric energy into thermal energy, or constituted by a temperature regulation device capable of converting electric energy into thermal energy or converting electric energy into cooling energy, or constituted by a semiconductor chips capable of converting electric energy into thermal energy or cooling energy, and is installed in the closed-type circulation flowpath of the closed-loop temperature equalization system at a location capable of assisting the heat exchange fluid (104) to perform hot ascending/cold descending without impeding the flow of heat exchange fluid (104). Installation means for the auxiliary heating/cooling device (115) includes one or more of the following means: 1) means for fixedly installing the auxiliary heating/cooling device inside the flowpath segment configured by the heat gaining device (101) and the pipeline structure (401); 2) means for surroundingly or partially installing the auxiliary heating/cooling device (115) at the exterior of a flowpath segment configured by the heat gaining device (101) and the pipeline structure (401) being made of a heat conductive material for indirectly heating or cooling the heat exchange fluid (104) inside the circulation flowpath; 3) means for installing the auxiliary heating/cooling device (115) inside the flowpath segment configured by the heat gaining device (101) and the pipeline structure (401) by randomly inserting the auxiliary heating/cooling device (115) through the operation port (111) or by opening the top cover (112); and 4) means for installing the auxiliary heating/cooling device (115) at the bottom of the sealing plug (110) for being coupled to the interior of the flowpath segment configured by the heat gaining device (101) and the pipeline structure (401) of the closed-type circulation flowpath.

Figure 7:
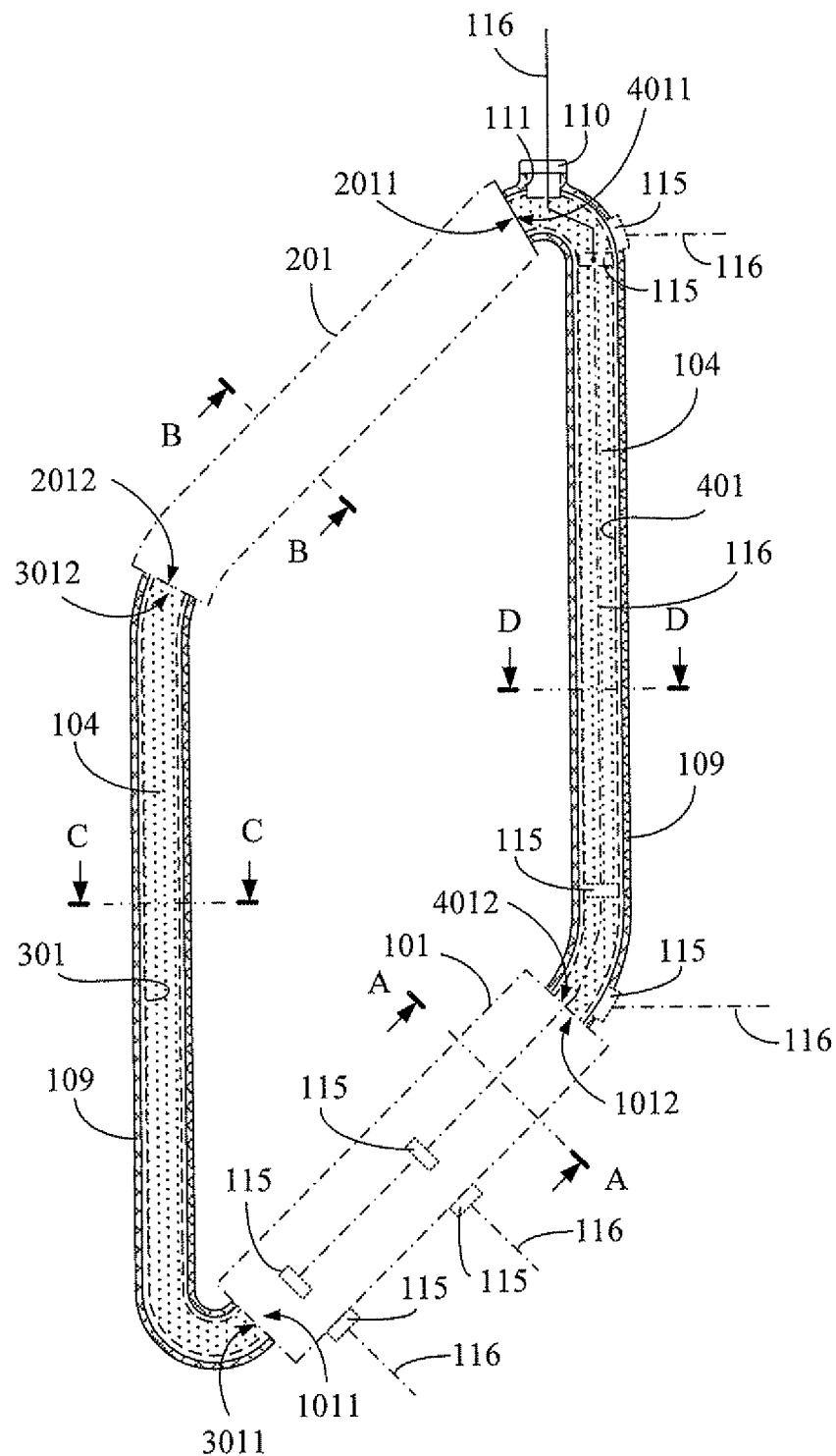
FIG. 7 is a cross-sectional side view showing a cross section of FIG. 1, wherein the interior or exterior of the flowpath segment configured by the heat gaining device (101) and the pipeline structure (401) are installed with an auxiliary heating/cooling device (115), according to the present invention.

FIG. 7 is a cross-sectional side view showing a cross section of FIG. 1 in which the interior or exterior of the flowpath segment configured by the heat gaining device (101) and the pipeline structure (401) is installed with the auxiliary heating/cooling device (115), according to the present invention.

Figure 8:
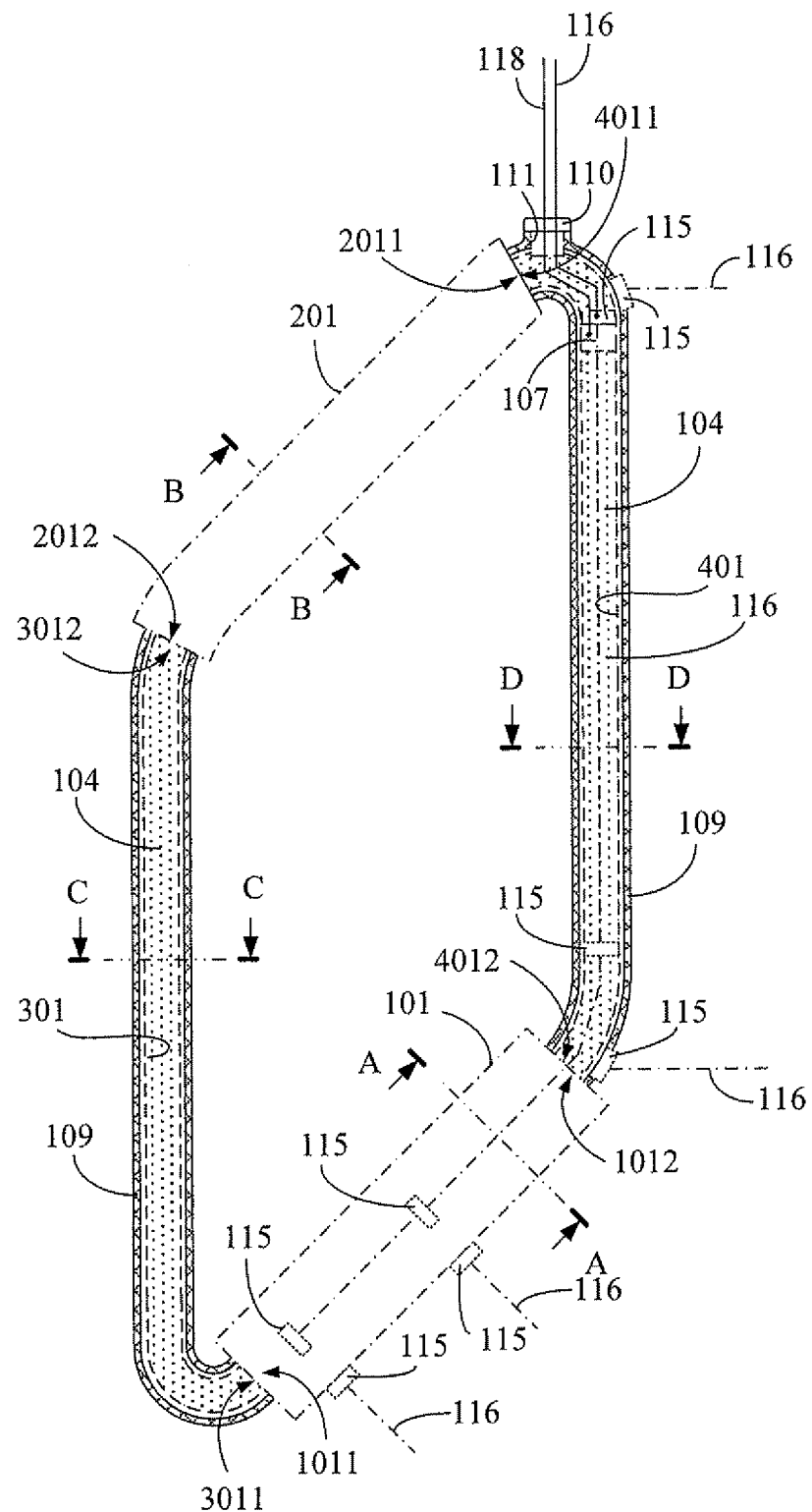
FIG. 8 is a cross-sectional side view showing a cross section of FIG. 2, wherein the interior of the flowpath segment configured by the heat gaining device (101) and the pipeline structure (401) are installed with an auxiliary fluid pump (107), and the interior or the exterior are installed with an auxiliary heating/cooling device (115), according to the present invention.

FIG. 8 is a cross-sectional side view showing a cross section of FIG. 2 in which the interior of the flowpath segment configured by the heat gaining device (101) and the pipeline structure (401) is installed with the auxiliary fluid pump (107), and the interior or the exterior is installed with the auxiliary heating/cooling device (115), according to the present invention.

Figure 9:
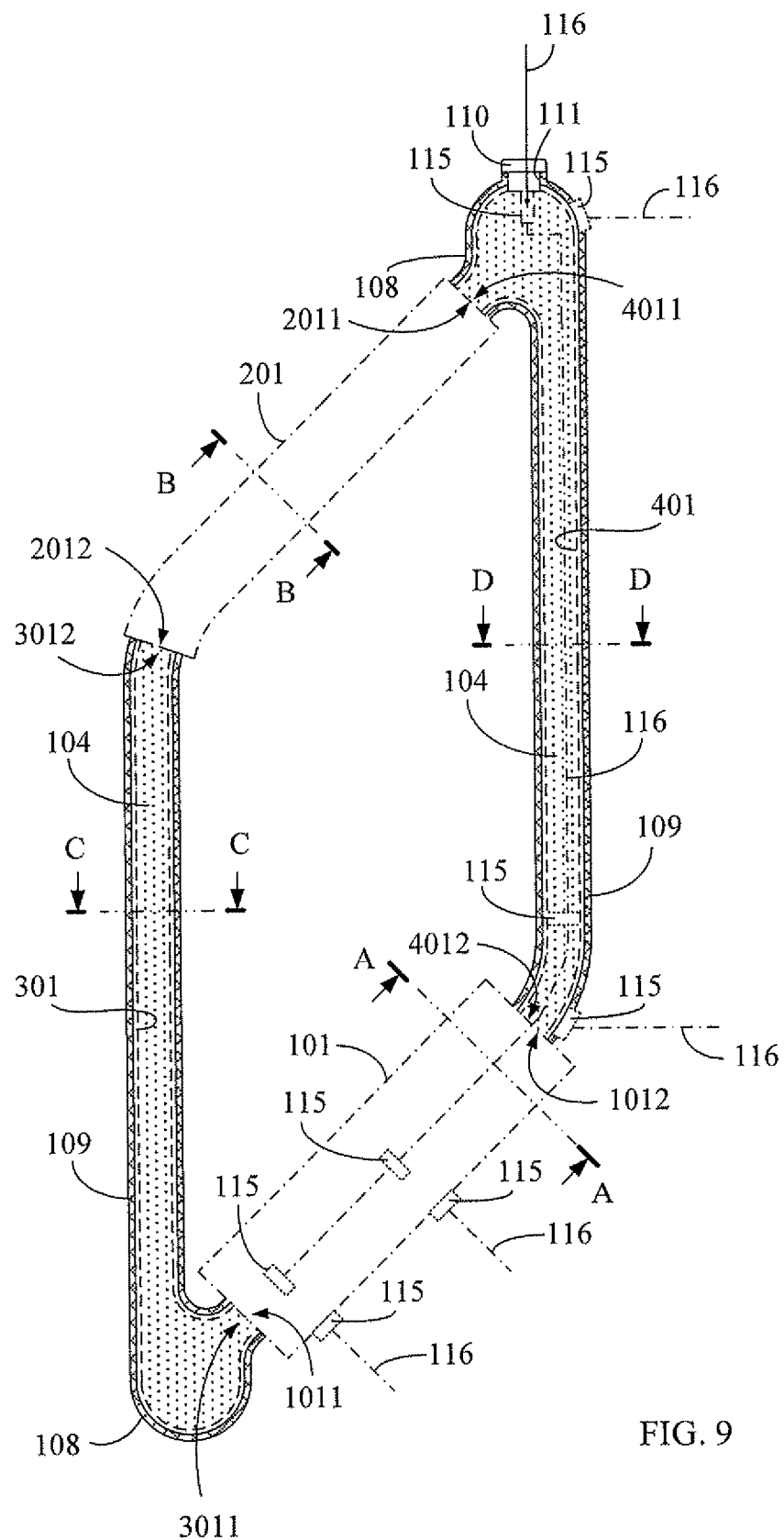
FIG. 9 is a cross-sectional side view showing a cross section of FIG. 3, wherein the interior or exterior of the flowpath segment configured by the heat gaining device (101) and the pipeline structure (401) are installed with an auxiliary heating/cooling device (115), according to the present invention.

FIG. 9 is a cross-sectional side view showing a cross section of FIG. 3, in which the interior or exterior of the flowpath segment configured by the heat gaining device (101) and the pipeline structure (401) is installed with the auxiliary heating/cooling device (115), according to the present invention.

Figure 10:
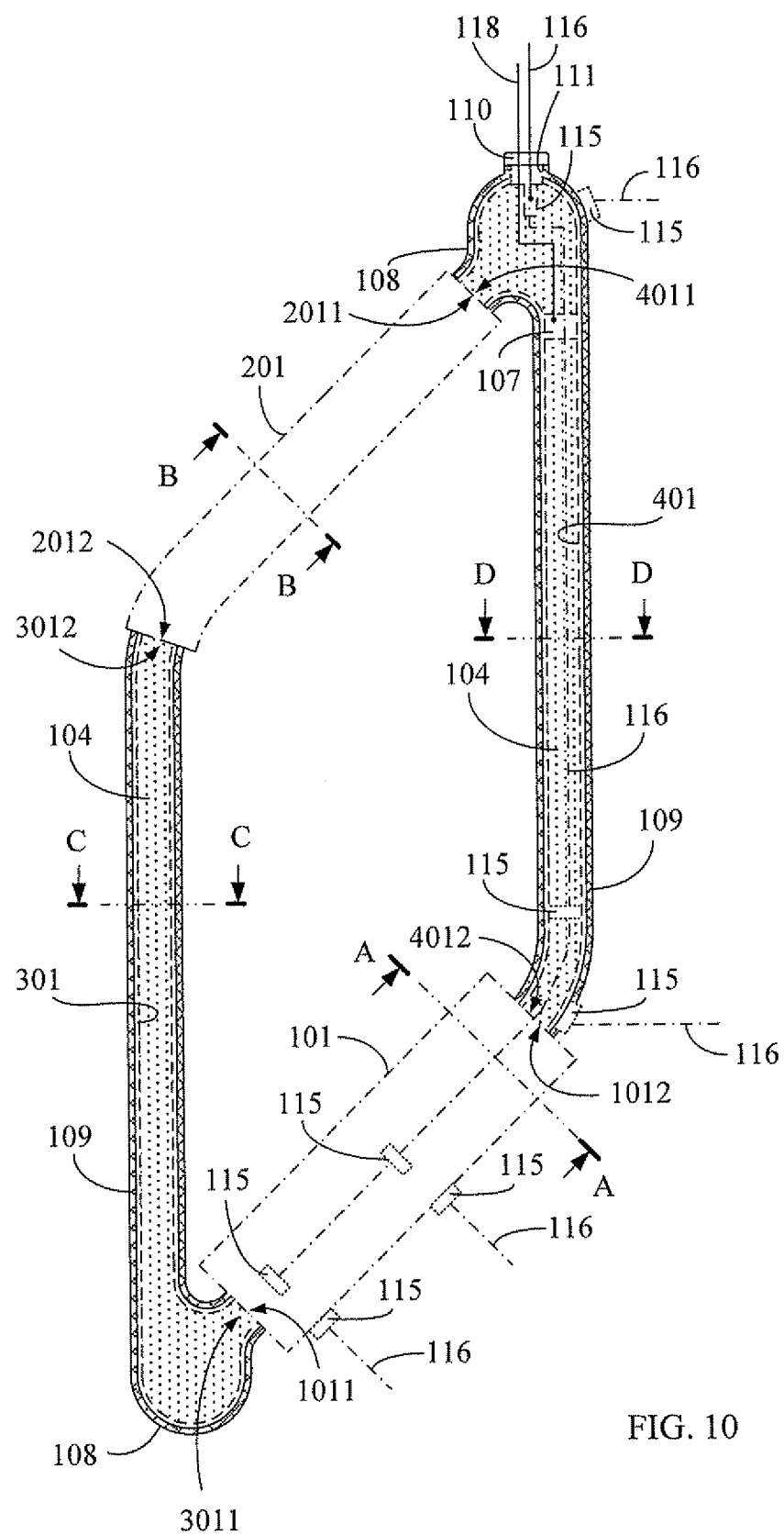
FIG. 10 is a cross-sectional side view showing a cross section of FIG. 4, wherein the interior of the flowpath segment configured by the heat gaining device (101) and the pipeline structure (401) are installed with an auxiliary fluid pump (107), and the interior or the exterior are installed with an auxiliary heating/cooling device (115), according to the present invention.

FIG. 10 is a cross-sectional side view showing a cross section of FIG. 4, in which the interior of the flowpath segment configured by the heat gaining device (101) and the pipeline structure (401) is installed with the auxiliary fluid pump (107), and the interior or the exterior is installed with the auxiliary heating/cooling device (115), according to the present invention.

Figure 11:
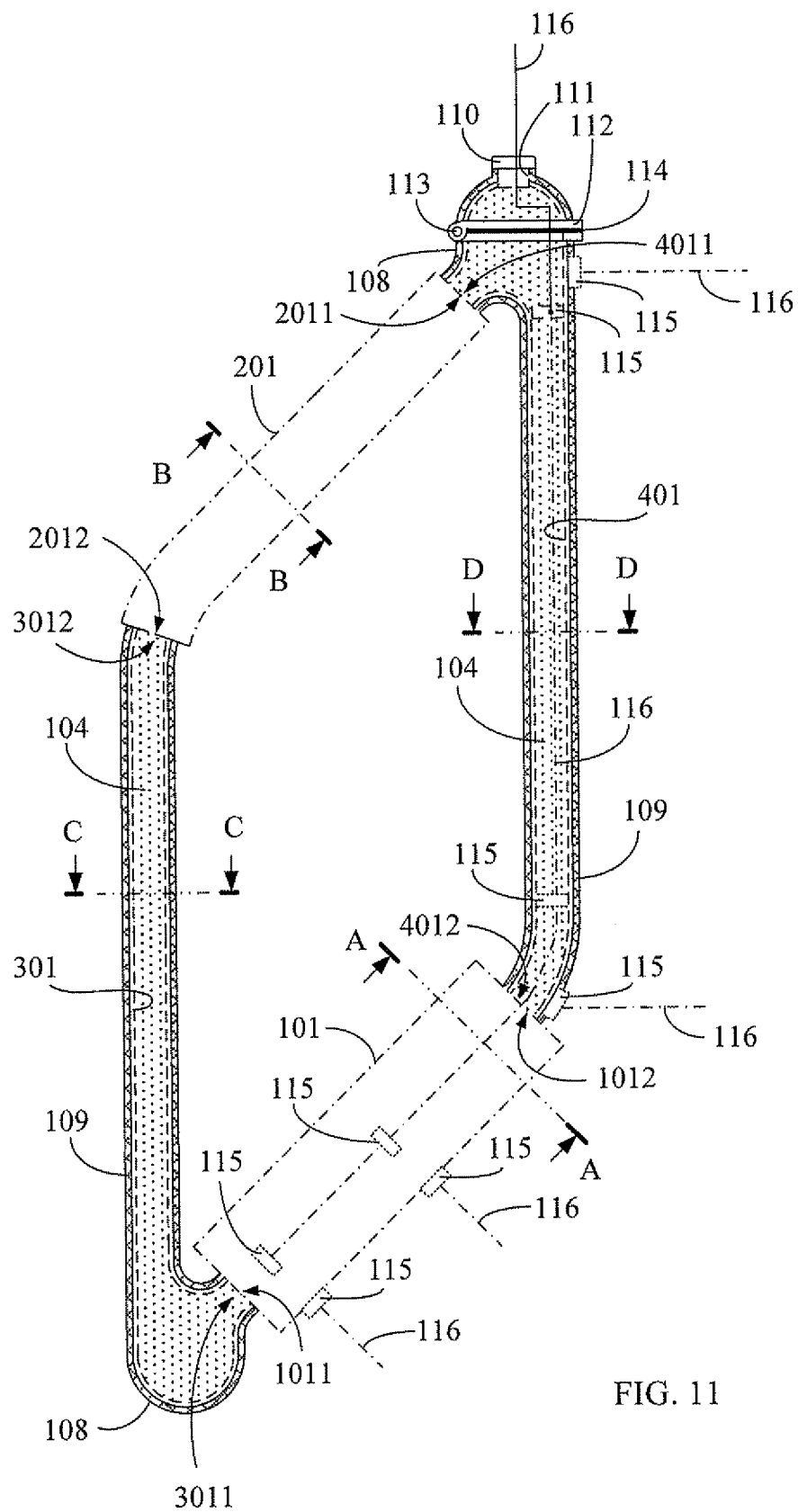
FIG. 11 is a cross-sectional side view showing a cross section of FIG. 5, wherein the interior or exterior of the flowpath segment configured by the heat gaining device (101) and the pipeline structure (401) are installed with an auxiliary heating/cooling device (115), according to the present invention.

FIG. 11 is a cross-sectional side view showing a cross section of FIG. 5, in which the interior or exterior of the flowpath segment configured by the heat gaining device (101) and the pipeline structure (401) is installed with the auxiliary heating/cooling device (115), according to the present invention.

Figure 12:
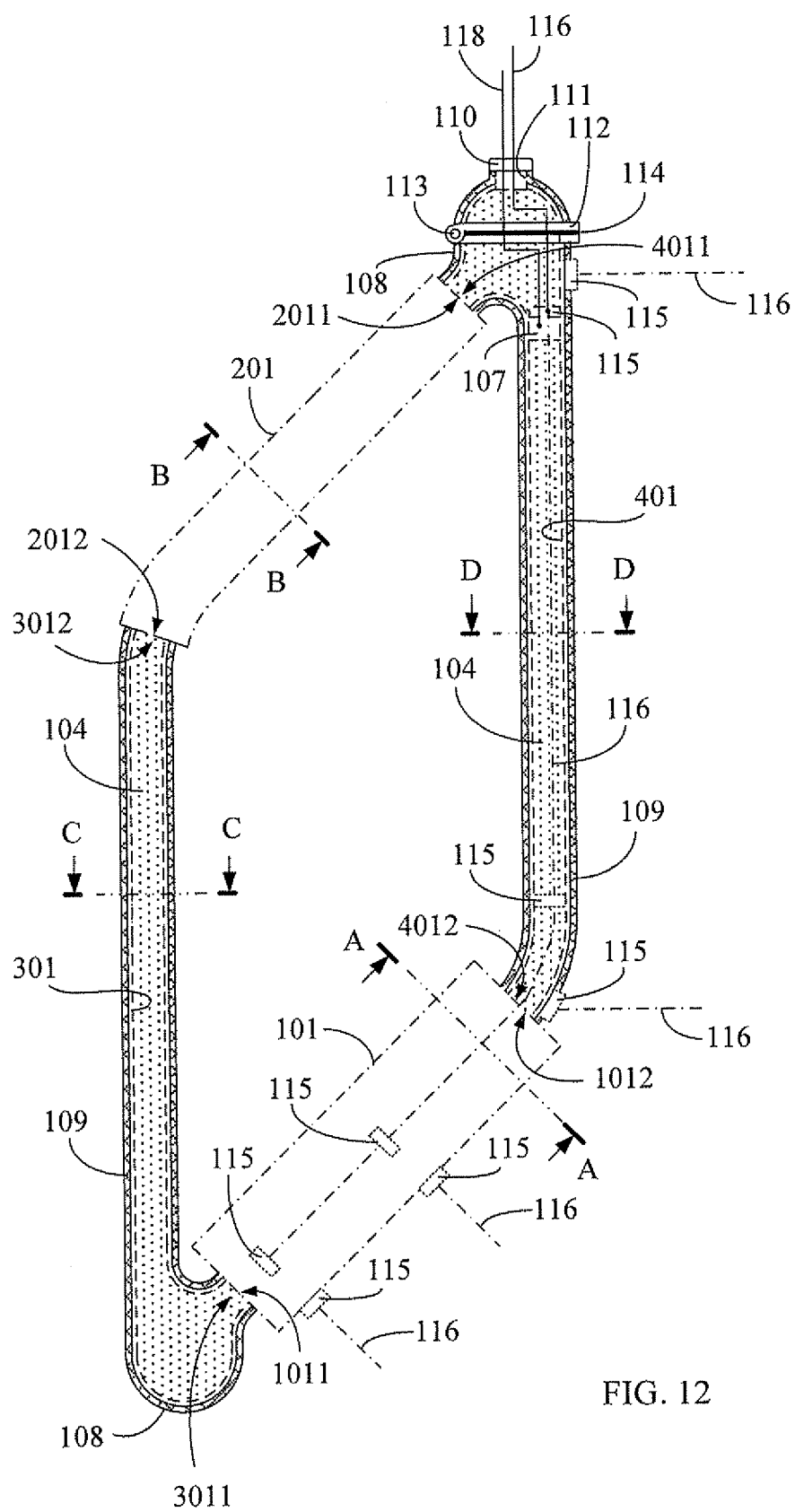
FIG. 12 is a cross-sectional side view showing a cross section of FIG. 6, wherein the interior of the flowpath segment configured by the heat gaining device (101) and the pipeline structure (401) are installed with an auxiliary fluid pump (107), and the interior or the exterior are installed with an auxiliary heating/cooling device (115), according to the present invention.

FIG. 12 is a cross-sectional side view showing a cross section of FIG. 6, in which the interior of the flowpath segment configured by the heat gaining device (101) and the pipeline structure (401) is installed with the auxiliary fluid pump (107), and the interior or the exterior is installed with the auxiliary heating/cooling device (115), according to the present invention.

According to the embodiments shown in FIG. 2, FIG. 4, FIG. 6, and FIG. 7 to FIG. 12, the present invention can be further installed with one or both of the auxiliary fluid pump (107) and the auxiliary heating/cooling device (115), and one or both of the heat exchange fluid temperature detecting device (TS201) and the environment temperature detecting device (TS202), wherein the auxiliary fluid pump (107), the auxiliary heating/cooling device (115), the heat exchange fluid temperature detecting device (TS201) and the environment temperature detecting device (TS202) can be controlled through operations of manually reading or setting a power supply state, or can be controlled to operate in a power supply state by the installation of the electric power control unit (ECU200).

Figure 13:
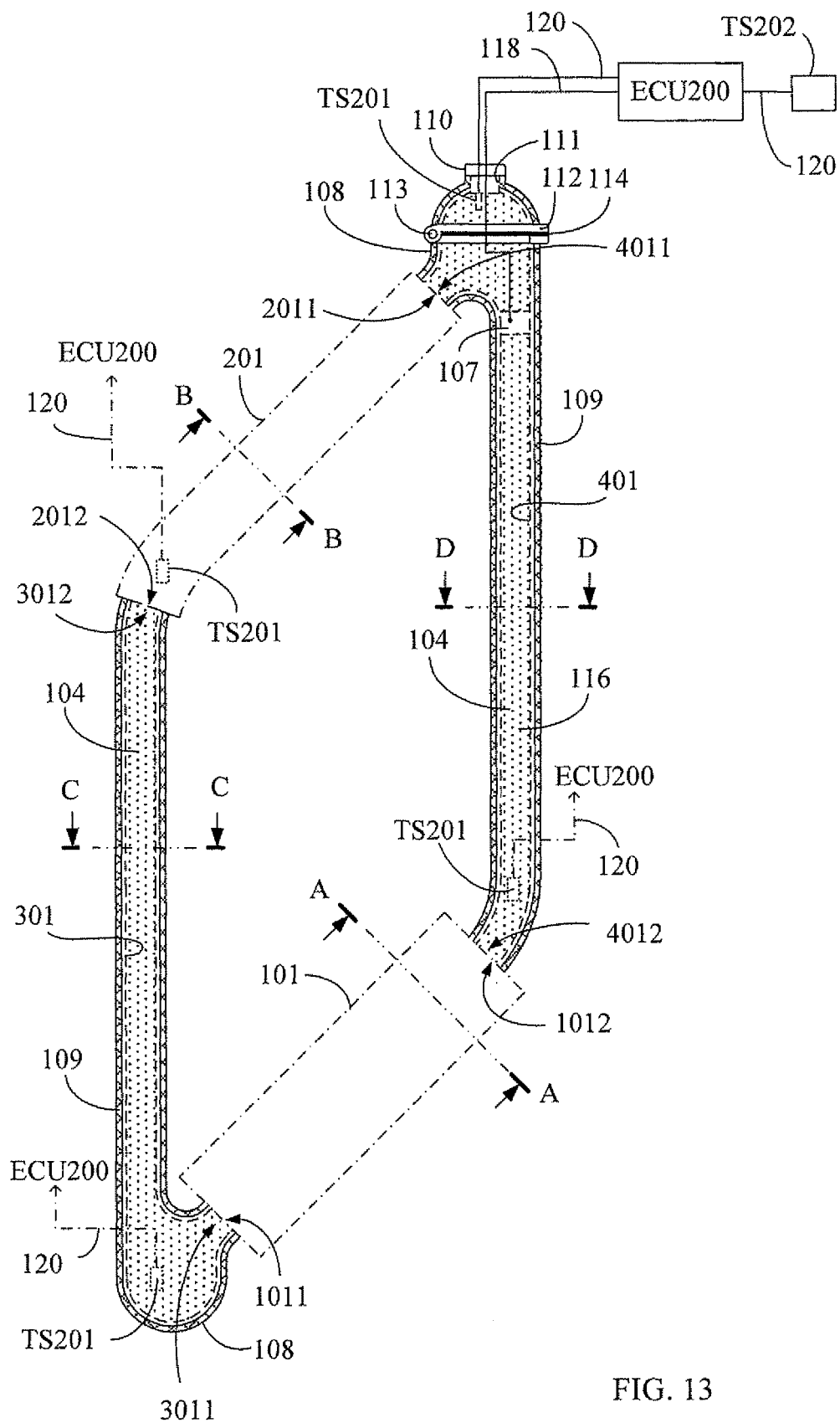
FIG. 13 is a schematic view showing the present invention being installed with an electric power control unit (ECU200), a heat exchange fluid temperature detecting device (TS201) and an environment temperature detecting device (TS202) for controlling the auxiliary fluid pump (107).

FIG. 13 is a schematic view showing the present invention being installed with the electric power control unit (ECU200), the heat exchange fluid temperature detecting device (TS201) and the environment temperature detecting device (TS202) for controlling the auxiliary fluid pump (107).

As shown in FIG. 13, one or more than one of the heat exchange fluid temperature detecting device (TS201) is installed in the closed-type circulation flowpath, and by utilizing a signal transmission wire (120) to transmit the detected temperature value of the heat exchange fluid to the electric power control unit (ECU200), and to feedback the detected temperature value from an environment temperature detecting device (TS202) to the electric power control unit (ECU200), the timing for supplying power for operation and the amount of pumping flow and pumping direction of the auxiliary fluid pump (107) can be controlled by the electric power control unit (ECU200) with respect to an internal setting and the feedback signals from the heat exchange fluid temperature detecting device (TS201) and the environment temperature detecting device (TS202). Details of the main components shown in FIG. 13 are as follows:

Electric power control unit (ECU200): which is constituted by electromechanical components, electric circuit components, micro processors, and/or related software, the electric power control unit (ECU200) including an operation parameter setting with respect to the signals sent by the heat exchange fluid temperature detecting device (TS201) and the environment temperature detecting device (TS202) to control the timing for supplying electric power for operation and to control the amount of pumping flow and pumping direction of the auxiliary fluid pump (107).

Heat exchange fluid temperature detecting device (TS201) and environment temperature detecting device (TS202): which are constituted by one or more temperature detecting devices capable of converting the temperature variation into an analog or digital electric power signal, and installed at selected temperature detecting points or environment temperature detecting points in the closed-type circulation flowpath for transmitting the signals to the electric power control unit (ECU200) through the signal transmission wire (120).

The environment temperature detecting device (TS202) can be optionally installed according to actual needs.

Figure 14:
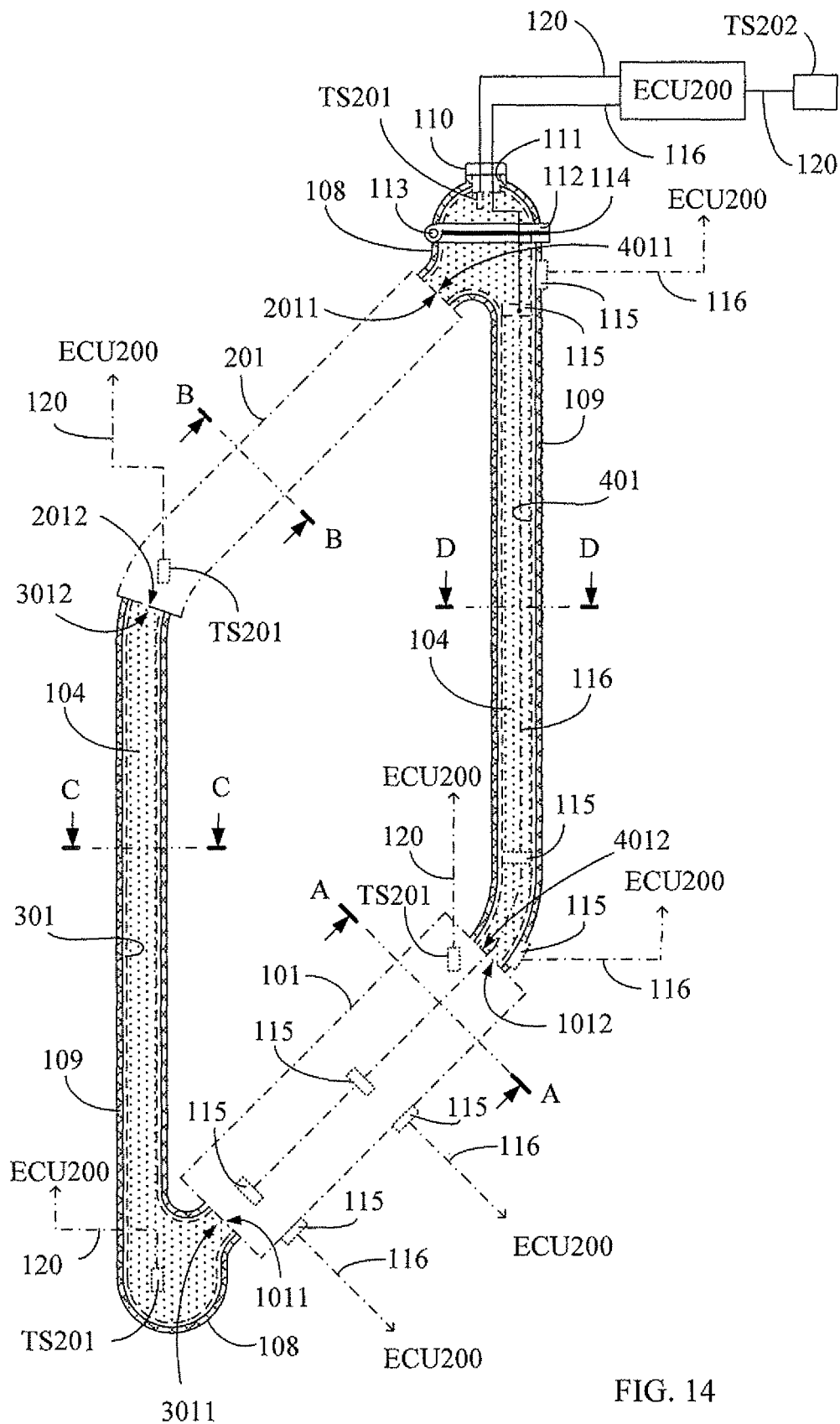
FIG. 14 is a schematic view showing the present invention being installed with an electric power control unit (ECU200), a heat exchange fluid temperature detecting device (TS201) and an environment temperature detecting device (TS202) for controlling the auxiliary heating/cooling device (115).

FIG. 14 is a schematic view showing the present invention being installed with the electric power control unit (ECU200), the heat exchange fluid temperature detecting device (TS201) and the environment temperature detecting device (TS202) for controlling the auxiliary heating/cooling device (115).

As shown in FIG. 14, one or more than one of the heat exchange fluid temperature detecting device (TS201) is installed in the closed-type circulation flowpath, and by utilizing a signal transmission wire (120) to transmit the detected temperature value of the heat exchange fluid to the electric power control unit (ECU200), and to feedback a detected environment temperature value from the temperature detecting device (TS202) to the electric power control unit (ECU200), the timing for supplying power for heating and heating values of the auxiliary heating/cooling device (115) can be controlled by the electric power control unit (ECU200) with respect to the internal setting and the feedback signals of the heat exchange fluid temperature detecting device (TS201) and the environment temperature detecting device (TS202), wherein:

Electric power control unit (ECU200): which is constituted by electromechanical components, electric circuit components, micro processors and/or related software, and provided with an operation parameter setting with respect to the signals sent by the heat exchange fluid temperature detecting device (TS201) and the environment temperature detecting device (TS202) for controlling the timing for supplying the electric power for heating and the heating values of the auxiliary heating/cooling device (115).

Heat exchange fluid temperature detecting device (TS201) and environment temperature detecting device (TS202): which are constituted by one or more temperature detecting devices capable of converting the temperature variation into an analog or digital electric power signal, and installed at selected temperature detecting points or environment temperature detecting points in the closed-type circulation flowpath for transmitting the signals to the electric power control unit (ECU200) through the signal transmission wire (120).

The environment temperature detecting device (TS202) can be optionally installed according to actual needs.

Figure 15:
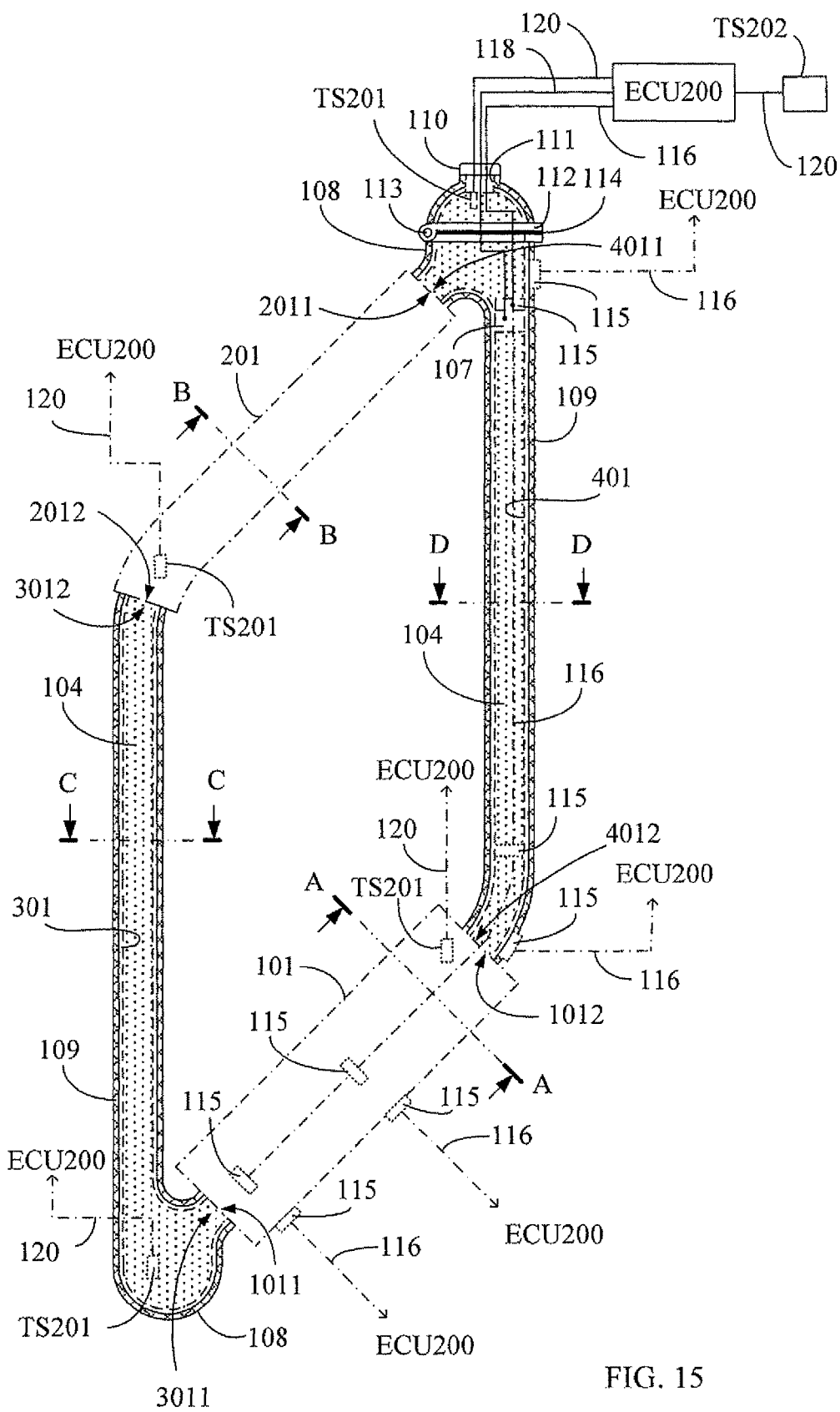
FIG. 15 is a schematic view showing the present invention being installed with an electric power control unit (ECU200), a heat exchange fluid temperature detecting device (TS201) and an environment temperature detecting device (TS202) for controlling the auxiliary fluid pump (107) and the auxiliary heating/cooling device (115).

FIG. 15 is a schematic view showing the present invention being installed with the electric power control unit (ECU200), the heat exchange fluid temperature detecting device (TS201) and the environment temperature detecting device (TS202) for controlling the auxiliary fluid pump (107) and the auxiliary heating/cooling device (115).

As shown in FIG. 15, one or more than one of the heat exchange fluid temperature detecting device (TS201) is installed in the closed-type circulation flowpath, and by utilizing a signal transmission wire (120) to transmit the detected temperature value of the heat exchange fluid to the electric power control unit (ECU200), and to feedback a detected environment temperature from the environment temperature detecting device (TS202), the timing for supplying power for operation, the amount of pumping flow and pumping direction of the auxiliary fluid pump (107), and the timing for supplying power for heating and the heating values of the auxiliary heating/cooling device (115) can be controlled by the electric power control unit (ECU200) with respect to the internal setting and the feedback signals of the heat exchange fluid temperature detecting device (TS201) and the environment temperature detecting device (TS202), wherein details of the main components shown in FIG. 15 are as follows:

Electric power control unit (ECU200): which is constituted by electromechanical components, electric circuit components, or micro processors and/or related software, and provided with an operation parameter setting with respect to the signals sent by the heat exchange fluid temperature detecting device (TS201) and the environment temperature detecting device (TS202) to control the timing for supplying power for operation, the amount of pumping flow and pumping direction of the auxiliary fluid pump (107), and the timing for supplying power for heating and the heating values of the auxiliary heating/cooling device (115).

Heat exchange fluid temperature detecting device (TS201) and environment temperature detecting device (TS202): which are constituted by one or more temperature detecting devices capable of converting the temperature variation into an analog or digital electric power signal, and installed at selected temperature detecting points or environment temperature detecting points in the closed-type circulation flowpath for transmitting the signals to the electric power control unit (ECU200) through the signal transmission wire (120).

The environment temperature detecting device (TS202) can be optionally installed according to actual needs.

In the closed-loop temperature equalization device having heat releasing device structured by multiple flowpath, among the heat gaining device (101), the heat releasing device (201), the pipeline structure (301) and the pipeline structure (401) provided for configuring the closed-type circulation flowpath, only the heat releasing device (201) is configured by two or more than two flowpaths. The heat gaining device (101), the pipeline structure (301) and the pipeline structure (401) are all formed as a closed-type circulation flowpath configured by one or more rather than two or more flowpaths; and the heat releasing device (201) having two or more flowpaths, the heat gaining device (101) having one or more flowpaths, the pipeline structure (301) having one or more flowpaths and the pipeline structure (401) having one or more flowpaths are series connected to constitute the closed-type circulation flowpath, wherein the cross section of heat gaining device (101) is defined as A-A', the cross section of heat releasing device (201) is defined as B-B', the cross section of pipeline structure (301) is defined as C-C', and the cross section of pipeline structure (401) is defined as D-D', and each selectable flowpath structure can be configured as follows:

(I) The pipeline structure (301) with C-C' cross section and the pipeline structure (401) with D-D' cross section may be structured by rectangular pipes or pipeline structures having shapes near rectangular, and made of a heat conductive material, the exterior thereof being covered by a heat insulation member (109), and the interior thereof being configured by one or more than one of the following structures including being: 1) formed as a hollow flowpath, 2) formed with a staggered semi-partitioned flowpath structure, 3) formed with a semi-partitioned flowpath structure at a single side, and 4) formed with a partitioned flowpath structure.

Figure 16:
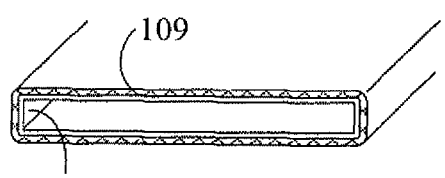
FIG. 16 is a cross sectional view of a rectangular pipeline made of a heat conductive material, wherein the exterior is covered by a heat insulation member and the interior is hollow to configure the pipeline structure (301) or the pipeline structure (401) of the closed-type circulation flowpath, according to the present invention.

FIG. 16 is a cross sectional view of a rectangular pipeline made of a heat conductive material wherein the exterior is covered by the heat insulation member and the interior is hollow to configure the pipeline structure (301) or the pipeline structure (401) of the closed-type circulation flowpath, according to the present invention.

Figure 17:
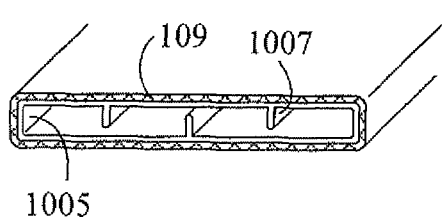
FIG. 17 is a cross sectional view of a rectangular pipeline made of a heat conductive material, wherein the exterior is covered by a heat insulation member and the interior is formed with a staggered semi-partitioned structure to configure the pipeline structure (301) or the pipeline structure (401) of the closed-type circulation flowpath, according to the present invention.

FIG. 17 is a cross sectional view of a rectangular pipeline made of a heat conductive material wherein the exterior is covered by the heat insulation member and the interior is formed with a staggered semi-partitioned structure to configure the pipeline structure (301) or the pipeline structure (401) of the closed-type circulation flowpath, according to the present invention.

Figure 18:
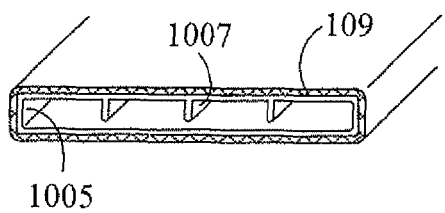
FIG. 18 is a cross sectional view of a rectangular pipeline made of a heat conductive material, wherein the exterior is covered by a heat insulation member and the interior is formed with a semi-partitioned structure at a single side to configure the pipeline structure (301) or the pipeline structure (401) of the closed-type circulation flowpath, according to the present invention.

FIG. 18 is a cross sectional view of a rectangular pipeline made of a heat conductive material wherein the exterior being covered by the heat insulation member and the interior being formed with a semi-partitioned structure at single side to configure the pipeline structure (301) or the pipeline structure (401) of the closed-type circulation flowpath, according to the present invention.

Figure 19:
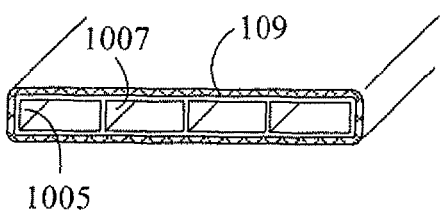
FIG. 19 is a cross sectional view of a rectangular pipeline made of a heat conductive material, wherein the exterior is covered by a heat insulation member and the interior is formed with a partitioned structure to configure the pipeline structure (301) or the pipeline structure (401) of the closed-type circulation flowpath, according to the present invention.

FIG. 19 is a cross sectional view of a rectangular pipeline made of a heat conductive material wherein the exterior is covered by the heat insulation member and the interior is formed with a partitioned structure to configure the pipeline structure (301) or the pipeline structure (401) of the closed-type circulation flowpath, according to the present invention.

The rectangular pipeline structure shown in FIG. 16 to FIG. 19 may also be made of a non-heat conductive material, and the heat insulation member can be selected to be provided or not provided according to actual needs.

(II) The pipeline structure (301) with C-C' cross section and the pipeline structure (401) with D-D' cross section may be structured by round pipelines or pipeline structures having similar shapes with the exterior thereof covered by the heat insulation member (109), and the interior configured by one or more than one of the following structures: 1) formed as a single pipeline structure having the heat insulation member (109) covering the exterior, 2) the exterior of each round pipeline structure being covered by the heat insulation member (109) and then arranged in parallel to form a multiple flowpath structure, 3) each round pipeline structure being formed with multiple flowpaths arranged in parallel and being connected by a connection structure, and then jointly covered by the heat insulation structure, and 4) each round pipeline structure being spaced at intervals and then jointly covered by the heat insulation member.

Figure 20:
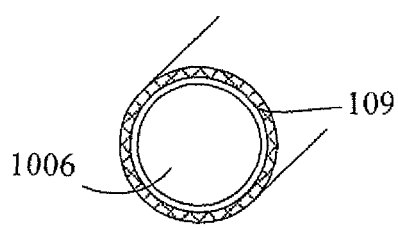
FIG. 20 is a cross sectional view of a round pipeline structure made of a heat conductive material, wherein the interior is hollow and the exterior is covered by a heat insulation member to configure the pipeline structure (301) or the pipeline structure (401) of the closed-type circulation flowpath, according to the present invention.

FIG. 20 is a cross sectional view of a round pipeline structure made of a heat conductive material, wherein the interior is hollow and the exterior is covered by the heat insulation member to configure the pipeline structure (301) or the pipeline structure (401) of the closed-type circulation flowpath, according to the present invention.

Figure 21:
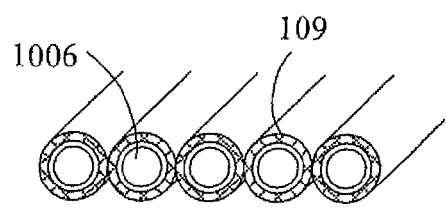
FIG. 21 is a cross sectional view of a round pipeline structure made of a heat conductive material and having one or more flowpaths, wherein the exterior of each flowpath of the round pipeline structure is covered by a heat insulation member and then arranged in parallel to form a multiple flowpath structure, thereby to configure the pipeline structure (301) or the pipeline structure (401) of the closed-type circulation flowpath, according to the present invention.

FIG. 21 is a cross sectional view of a round pipeline structure made of a heat conductive material and having one or more than one flowpaths, wherein the exterior of each flowpath of round pipeline structure is covered by the heat insulation member and then arranged in parallel to form a multiple flowpath structure, thereby to configure the pipeline structure (301) or the pipeline structure (401) of the closed-type circulation flowpath, according to the present invention.

Figure 22:
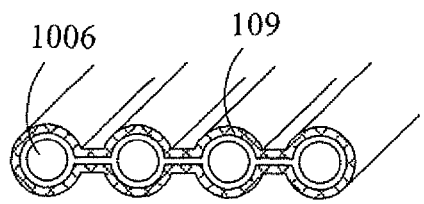
FIG. 22 is a cross sectional view of a round pipeline structure having one or more flowpaths made of a heat conductive material, wherein each flowpath of the round pipeline structure is arranged in parallel to form multiple flowpaths and connected by a connection structure, and then jointly covered by a heat insulation member so as to form a multiple flowpath structure, thereby to configure the pipeline structure (301) or the pipeline structure (401) of the closed-type circulation flowpath, according to the present invention.

FIG. 22 is a cross sectional view of a pipeline structure having one or more flowpaths formed by round pipeline structures and made of a heat conductive material wherein each flowpath of the pipeline structure is arranged in parallel and connected by a connection structure, and then jointly being covered by a heat insulation member so as to form a multiple flowpath structure, thereby to configure the pipeline structure (301) or the pipeline structure (401) of the closed-type circulation flowpath, according to the present invention.

Figure 23:
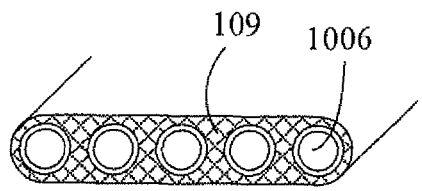
FIG. 23 is a cross sectional view of a round pipeline structure having one or more paths and made of a heat conductive material, wherein each flowpath of the round pipeline structure is spaced at intervals and then jointly covered by a heat insulation member so as to form a multiple flowpath structure, thereby to configure the pipeline structure (301) or the pipeline structure (401) of the closed-type circulation flowpath, according to the present invention.

FIG. 23 is a cross sectional view of a pipeline structure having one or more flowpaths formed by round pipeline structures and made of a heat conductive material wherein each flowpath is spaced at intervals from the other and then jointly covered by a heat insulation member so as to form a multiple flowpath structure, thereby to configure the pipeline structure (301) or the pipeline structure (401) of the closed-type circulation flowpath, according to the present invention.

The round pipeline structures shown in FIG. 20 to FIG. 23 may also be made of a non-heat conductive material, and the heat insulation member can be selected to be provided or not provided according to actual needs.

(III) The heat releasing device (201) with B-B' cross section and the heat gaining device (101) with A-A' cross section may be formed by rectangular pipelines or pipeline structures having similar shapes to be applied in the closed-type circulation flowpath of the present invention and configured by a heat conductive material, and the external thermal energy transmitting surface may be a heat releasing surface or a heat gaining surface of a planar thermal energy transmitting surface (1000), or a wave-shaped thermal energy transmitting surface (1001), with the pipeline structures having one of the following insulation configuration: 1) not being covered by the heat insulation member (109), 2) the exterior of the surface opposite to the thermal energy transmitting surface being covered by the heat insulation member (109), and the lateral sides also being fully covered by the heat insulation member (109), 3) the exterior of the surface opposite to the thermal energy transmitting surface being covered by the heat insulation member (109), 4) the exterior of the surface opposite to the thermal energy transmitting surface being covered by the heat insulation member (109), and the lateral sides being partially covered by the heat insulation member (109). The interior of the pipeline structures may be configured by one or more than one of the following structures including being: 1) formed with a hollow flowpath, 2) formed with a staggered semi-partition flowpath structure, 3) formed with a semi-partitioned flowpath structure at a single side, and 4) forming a partitioned flowpath structure.

Figure 24:
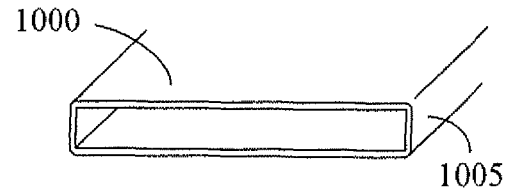
FIG. 24 is a cross sectional view showing a rectangular pipeline structure made of a heat conductive material, wherein the exterior is formed as a planar thermal energy transmitting surface (1000) that serves as the heat releasing surface or heat gaining surface, and the interior is formed with a hollow flowpath structure to thereby configure the heat gaining device (101) of the closed-type circulation flowpath, according to the present invention.

FIG. 24 is a cross sectional view showing a rectangular pipeline structure made of a heat conductive material, wherein the exterior is formed as a planar thermal energy transmitting surface (1000) that serves as the heat releasing surface or heat gaining surface, and the interior is formed with a hollow flowpath structure, thereby to configure the heat gaining device (101) of the closed-type circulation flowpath, according to the present invention.

Figure 25:
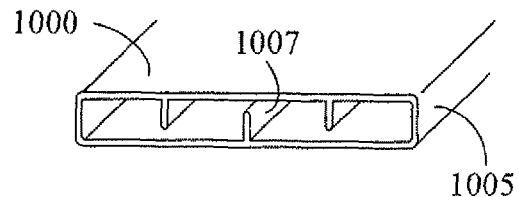
FIG. 25 is a cross sectional view showing a rectangular pipeline structure made of a heat conductive material, wherein the exterior is formed as a planar thermal energy transmitting surface (1000) that serves as the heat releasing surface or heat gaining surface, and the interior is formed with a staggered semi-partitioned flowpath structure to thereby configure the heat gaining device (101) or the heat releasing device (201) of the closed-type circulation flowpath, according to the present invention.

FIG. 25 is a cross sectional view showing a rectangular pipeline structure made of a heat conductive material, wherein the exterior is formed as a planar thermal energy transmitting surface (1000) that serves as the heat releasing surface or heat gaining surface, and the interior is formed with a staggered semi-partitioned flowpath structure, thereby to configure the heat gaining device (101) or the heat releasing device (201) of the closed-type circulation flowpath, according to the present invention.

Figure 26:
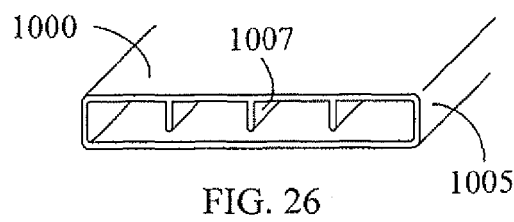
FIG. 26 is a cross sectional view showing a rectangular pipeline structure made of a heat conductive material, wherein the exterior is formed as a planar thermal energy transmitting surface (1000) that serves as the heat releasing surface or heat gaining surface, and the interior is formed with a semi-partitioned flowpath structure at a single side to thereby configure the heat gaining device (101) or the heat releasing device (201) of the closed-type circulation flowpath, according to the present invention.

FIG. 26 is a cross sectional view showing a rectangular pipeline structure made of a heat conductive material, wherein the exterior is formed as a planar thermal energy transmitting surface (1000) that serves as the heat releasing surface or heat gaining surface, and the interior is formed with a semi-partitioned flowpath structure at a single side, thereby to configure the heat gaining device (101) or the heat releasing device (201) of the closed-type circulation flowpath, according to the present invention.

Figure 27:
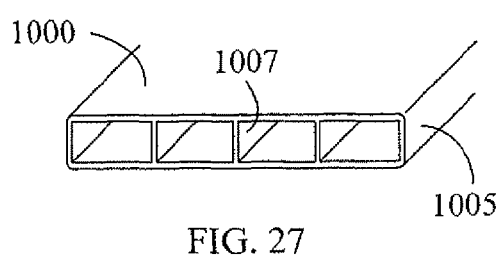
FIG. 27 is a cross sectional view showing a rectangular pipeline structure made of a heat conductive material, wherein the exterior is formed as a planar thermal energy transmitting surface (1000) that serves as the heat releasing surface or heat gaining surface, and the interior being formed with a partitioned flowpath structure, thereby to configure the heat gaining device (101) or the heat releasing device (201) of the closed-type circulation flowpath, according to the present invention.

FIG. 27 is a cross sectional view showing a rectangular pipeline structure made of a heat conductive material, wherein the exterior is formed as a planar thermal energy transmitting surface (1000) that serves as the heat releasing surface or heat gaining surface, and the interior is formed with a partitioned flowpath structure, thereby to configure the heat gaining device (101) or the heat releasing device (201) of the closed-type circulation flowpath, according to the present invention.

In the embodiments shown in FIG. 24 to FIG. 27, the heat insulation member (109) covers three surfaces. In addition to the thermal energy transmitting surface of the rectangular pipeline, the heat insulation member (109) can further be used to cover the back side of the surface opposite to the thermal energy transmitting surface, or to cover both the back side of the surface opposite to the thermal energy transmitting surface and the two lateral sides, so that the two lateral sides of the rectangular pipeline can serve as the thermal energy transmitting surfaces.

Figure 28:
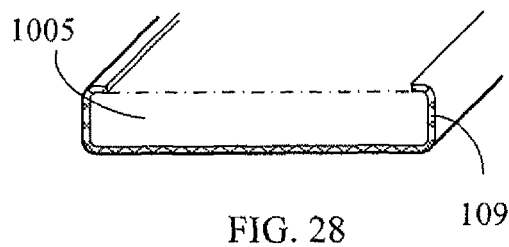
FIG. 28 is a cross sectional view showing a heat insulation member (109) covering the bottom and two lateral sides of the planar thermal energy transmitting surface (1000) of the heat gaining device (101) or the heat releasing device (201) of the rectangular pipeline structure shown in FIG. 21 to FIG. 24.

FIG. 28 is a cross sectional view showing the heat insulation member (109) covering the bottom and two lateral sides of the planar thermal energy transmitting surface (1000) of the heat gaining device (101) or the heat releasing device (201) of the rectangular pipeline structure shown in FIG. 21 to FIG. 24.

As shown in FIG. 28, in the closed-loop temperature equalization system having a heat releasing device structured by multiple flowpaths, the rectangular pipeline for configuring the heat gaining device (101) or the heat releasing device (201) can be further covered by the heat insulation member (109) at the exterior of the surface opposite to the thermal energy transmitting surface of the rectangular pipeline, which serves as the heat gaining surface of the heat gaining device (101) or the heat releasing surface of the heat releasing device (201), and also at two lateral sides of the rectangular pipeline.

Figure 29:
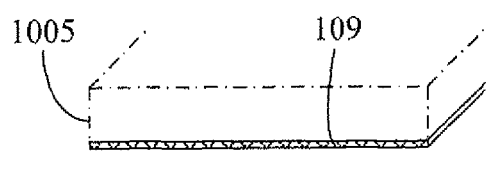
FIG. 29 is a cross sectional view showing a heat insulation member (109) covering the back side of the surface opposite to the planar thermal energy conductive surface (1000) of the rectangular pipeline structure shown in FIG. 21 to FIG. 24.

FIG. 29 is a cross sectional view showing the heat insulation member (109) covering the back side of the surface opposite to the planar thermal energy conductive surface (1000) of the rectangular pipeline structure shown in FIG. 21 to FIG. 24.

As shown in FIG. 29, in the closed-loop temperature equalization system having a heat releasing device structured by multiple flowpaths, the rectangular pipeline for configuring the heat gaining device (101) or the heat releasing device (201) is further covered by the heat insulation member (109) at the back side of the surface opposite to the thermal energy transmitting surface of the rectangular pipeline, which serves as the heat gaining surface of the heat gaining device (101) or the heat releasing surface of the heat releasing device (201), so that the two lateral sides of the rectangular pipeline are enabled to serve as the thermal energy transmitting surfaces.

Figure 30:
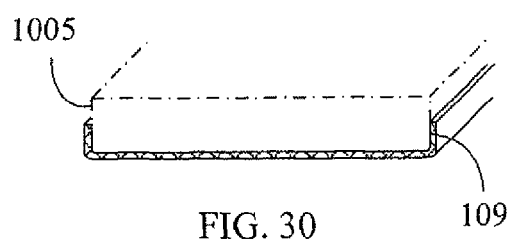
FIG. 30 is a cross sectional view showing a heat insulation member (109) covering the back side of the surface opposite to the planar thermal energy conductive surface (1000) as well as a part of the two lateral sides of the rectangular pipeline structure shown in FIG. 21 to FIG. 24.

FIG. 30 is a cross sectional view showing the heat insulation member (109) covering the back side of the surface opposite to the planar thermal energy conductive surface (1000) as well as a part of the two lateral sides of the rectangular pipeline structure shown in FIG. 21 to FIG. 24.

As shown in FIG. 30, in the closed-loop temperature equalization system having a heat releasing device structured by multiple flowpaths, the rectangular pipeline for configuring the heat gaining device (101) or the heat releasing device (201) is further covered by the heat insulation member (109) at the back side of the surface opposite to the thermal energy transmitting surface of the rectangular pipeline, serves as the heat gaining surface of the heat gaining device (101) or the heat releasing surface of the heat releasing device (201), and at a part of the two lateral sides of the rectangular pipeline, so that a part of the two lateral sides of the rectangular pipeline are enabled to serve as the thermal energy transmitting surfaces.

In the embodiments shown in FIG. 24 to FIG. 30, the heat gaining surface or the heat releasing surface providing the thermal energy transmitting function may be in the form of a planar thermal energy transmitting surface (1000). Alternatively, a wave-shaped thermal energy transmitting surface (1001) structure can be further provided for increasing the thermal energy transmitting effect between the fluid in the pipe and the exterior.

Figure 31:
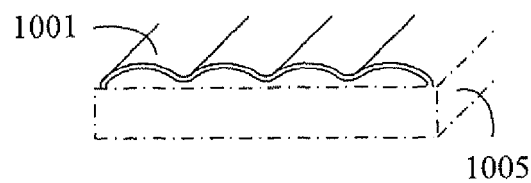
FIG. 31 is a cross sectional view showing the planar thermal energy transmitting surface (1000) that serves as the heat gaining surface of the heat gaining device (101) or the heat releasing surface of the heat releasing device (201) being formed as a wave-like thermal energy transmitting surface (1001) along a transverse cross section with respect to the fluid flowing direction.

FIG. 31 is a cross sectional view showing a heat gaining surface of the heat gaining device (101) or a heat releasing surface of the heat releasing device (201) being formed in a wave-like thermal energy transmitting surface (1001) along the transversal cross section of the fluid flowing direction.

As shown in FIG. 31, the heat gaining device (101) or the heat releasing device (201) is a rectangular pipeline, the heat gaining surface of the heat gaining device (101) or the heat releasing surface of the heat releasing device (201) being configured by the wave-like thermal energy transmitting surface (1001) structure.

(IV) The heat gaining device (101) with A-A' cross section and the heat releasing device (201) with B-B' cross section may be structured by round pipelines or pipeline structures made of a heat conductive material and configured as follows: 1) the interior of the round pipeline being formed as a hollow structure, 2) the interior of the round pipeline being formed with a structure wherein fin sheets are radially spaced with three equal angles and extend towards the center but are not in contact with each other, 3) the interior of the round pipeline being formed with a structure wherein fin sheets are radially spaced with three equal angles and extend towards the center for being connected with each other, 4) the interior of the round pipeline being formed with a structure wherein fin sheets are radially spaced with two equal angles and extend towards the center for being connected with each other, and 5) the interior of the round pipeline being formed with a structure wherein fin sheets are radially spaced with four equal angles and extend towards the center for being connected with each other.

Figure 32:
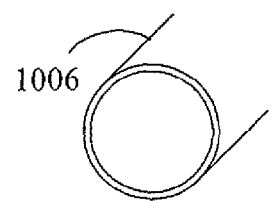
FIG. 32 is a cross sectional view showing a pipeline structure made of a heat conductive material, wherein the pipeline has round or similar shapes and the interior is formed with a hollow structure to thereby configure the heat gaining device (101) or the heat releasing device (201) of the closed-type circulation flowpath, according to the present invention.

FIG. 32 is a cross sectional view showing a round pipeline structure made of a heat conductive material, wherein the interior is formed with a hollow structure, thereby to configure the heat gaining device (101) or the heat releasing device (201) of the closed-type circulation flowpath, according to the present invention.

Figure 33:
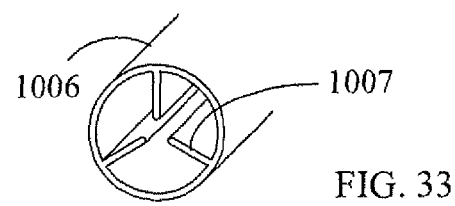
FIG. 33 is a cross sectional view showing a pipeline structure made of a heat conductive material, wherein the pipeline has round or similar shapes and the interior is formed with a structure in which fin sheets radially spaced with three equal angles extend towards the center but are not in contact with each other to thereby configure the heat gaining device (101) or the heat releasing device (201) of the closed-type circulation flowpath, according to the present invention.

FIG. 33 is a cross sectional view showing the round pipeline structure made of a heat conductive material, wherein the interior is formed with a structure wherein fin sheets are radially spaced with three equal angles and extend towards the center but are not in contact with each other, thereby to configure the heat gaining device (101) or the heat releasing device (201) of the closed-type circulation flowpath, according to the present invention.

Figure 34:
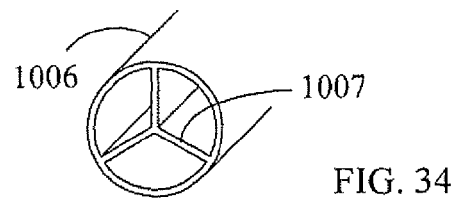
FIG. 34 is a cross sectional view showing a pipeline structure made of a heat conductive material, wherein the pipeline has round or similar shapes and the interior is formed with a structure in which fin sheets are radially spaced with three equal angles and extend towards the center for being connected with each other to thereby configure the heat gaining device (101) or the heat releasing device (201) of the closed-type circulation flowpath, according to the present invention.

FIG. 34 is a cross sectional view showing the round pipeline structure made of a heat conductive material, wherein the interior is formed with a structure wherein fin sheets are radially spaced with three equal angles and extend towards the center for being connected with each other, thereby to configure the heat gaining device (101) or the heat releasing device (201) of the closed-type circulation flowpath, according to the present invention.

Figure 35:
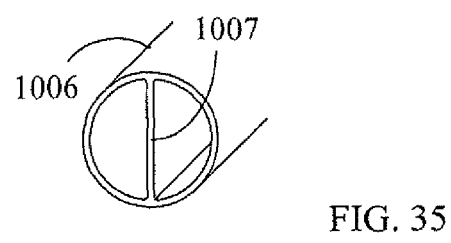
FIG. 35 is a cross sectional view showing a pipeline structure made of a heat conductive material, wherein the pipeline has round or similar shapes and the interior is formed with a structure in which fin sheets are radially spaced with two equal angles and extend towards the center for being connected with each other to thereby configure the heat gaining device (101) or the heat releasing device (201) of the closed-type circulation flowpath, according to the present invention.

FIG. 35 is a cross sectional view showing the round pipeline structure made of a heat conductive material, wherein the interior is formed with a structure wherein fin sheets are radially spaced with two equal angles and extend towards the center for being connected with each other, thereby to configure the heat gaining device (101) or the heat releasing device (201) of the closed-type circulation flowpath, according to the present invention.

Figure 36:
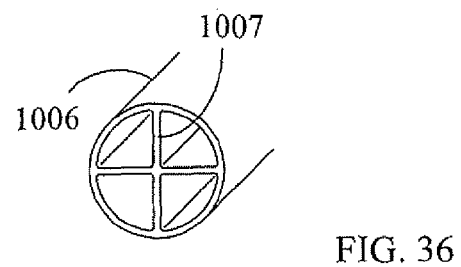
FIG. 36 is a cross sectional view showing a pipeline structure made of a heat conductive material, wherein the pipeline has round or similar shapes and the interior is formed with a structure in which fin sheets radially spaced with four equal angles and extend towards the center for being connected with each other to thereby configure the heat gaining device (101) or the heat releasing device (201) of the closed-type circulation flowpath, according to the present invention.

FIG. 36 is a cross sectional view showing the round pipeline structure made of a heat conductive material, wherein the interior is formed with a structure wherein fin sheets are radially spaced with four equal angles and extend towards the center for being connected with each other, thereby to configure the heat gaining device (101) or the heat releasing device (201) of the closed-type circulation flowpath, according to the present invention.

(V) The heat gaining device (101) with A-A' cross section and the heat releasing device (201) with B-B' cross section may be structured by round pipelines or pipeline structures having similar shapes made of a heat conductive material, and the pipeline arrangement may be configured by one or more pipeline arrangement means including: 1) multiple pipelines being up/down staggeredly separated, 2) multiple pipelines being up/down staggeredly separated and a connection structure being provided between the pipelines, 3) multiple pipelines being linearly and adjacently arranged, 4) multiple pipelines being linearly separated, and 5) multiple pipeline being linearly separated and a connection structure being provided between the pipelines.

Figure 37:
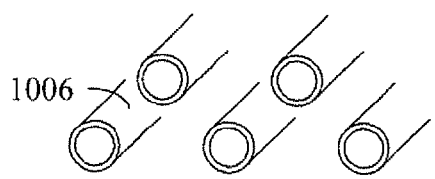
FIG. 37 is a cross sectional view showing a multiple pipeline structure made of a heat conductive material, wherein the multiple pipelines are up/down staggeredly separated to thereby configure the heat gaining device (101) or the heat releasing device (201) of the closed-type circulation flowpath, according to the present invention.

FIG. 37 is a cross sectional view showing the multiple pipeline structure made of a heat conductive material, wherein the multiple pipelines are up/down staggeredly separated, thereby to configure the heat gaining device (101) or the heat releasing device (201) of the closed-type circulation flowpath, according to the present invention.

Figure 38:
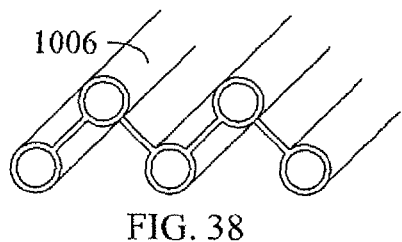
FIG. 38 is a cross sectional view showing a multiple pipeline structure made of a heat conductive material, wherein the multiple pipelines are up/down staggeredly separated and have a connection device between the pipelines to thereby configure the heat gaining device (101) or the heat releasing device (201) of the closed-type circulation flowpath, according to the present invention.

FIG. 38 is a cross sectional view showing the multiple pipeline structure made of a heat conductive material, wherein the multiple pipeline are up/down staggeredly separated and having a connection device between the pipelines, thereby to configure the heat gaining device (101) or the heat releasing device (201) of the closed-type circulation flowpath, according to the present invention.

Figure 39:
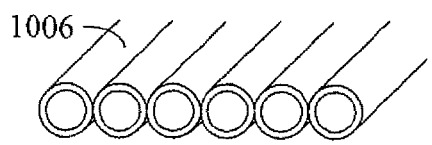
FIG. 39 is a cross sectional view showing a multiple pipeline structure made of a heat conductive material, wherein the multiple pipelines are linearly and adjacently arranged to thereby configure the heat gaining device (101) or the heat releasing device (201) of the closed-type circulation flowpath, according to the present invention.

FIG. 39 is a cross sectional view showing the multiple pipeline structure made of a heat conductive material, wherein the multiple pipelines are linearly and adjacently arranged, thereby to configure the heat gaining device (101) or the heat releasing device (201) of the closed-type circulation flowpath, according to the present invention.

Figure 40:
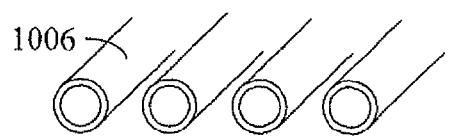
FIG. 40 is a cross sectional view showing a round pipeline structure made of a heat conductive material partially covered with a heat insulation member (109) to thereby configure the heat gaining device (101) or the heat releasing device (201) of the closed-type circulation flowpath, according to the present invention.

FIG. 40 is a cross sectional view showing the round pipeline structure made of a heat conductive material, wherein the multiple pipelines are linearly separated, thereby to configure the heat gaining device (101) or the heat releasing device (201) of the closed-type circulation flowpath, according to the present invention.

Figure 41:
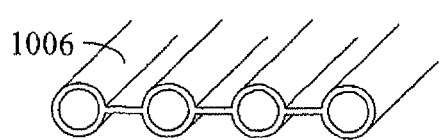
FIG. 41 is a cross sectional view showing a multiple pipeline structure made of a heat conductive material, wherein the multiple pipelines are linearly separated and a connection structure is provided between the pipelines to thereby configure the heat gaining device (101) or the heat releasing device (201) of the closed-type circulation flowpath, according to the present invention.

FIG. 41 is a cross sectional view showing the round pipeline structure made of a heat conductive material, wherein the multiple pipeline are linearly separated and a connection structure being provided between the pipelines, thereby to configure the heat gaining device (101) or the heat releasing device (201) of the closed-type circulation flowpath, according to the present invention.

(VI) The heat gaining device (101) with A-A' cross section and the heat releasing device (201) with B-B' cross section may be structured by round pipelines or pipeline structures made of a heat conductive material, with a part of the pipeline surface serving as a heat gaining surface or a heat releasing surface for transmitting thermal energy, and the other part of the pipeline surface being covered by the heat insulation member (109), the pipeline arrangement being configured by one or more than one of the pipeline arrangement means including: 1) being formed with a single pipeline structure and a part of the pipeline surface being covered by the heat insulation member (109), 2) multiple pipelines being up/down staggeredly separated and a part of the pipeline surface being covered by the heat insulation member (109), 3) multiple pipelines being up/down staggeredly separated and a connection structure being provided between the pipelines and a part of the pipeline surface being covered by the heat insulation member (109), 4) multiple pipelines being linearly and adjacently arranged and a part of the pipeline surface being covered by the heat insulation member (109), 5) multiple pipelines being linearly separated and a part of the pipeline surface being covered by the heat insulation member (109), and 6) multiple pipelines being linearly separated and a connection structure being provided between the pipelines and a part of the pipeline surface being covered by the heat insulation member (109).

Figure 42:
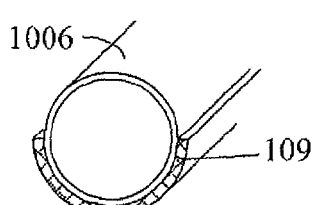
FIG. 42 is a cross sectional view showing a pipeline structure made of a heat conductive material with a part of the pipeline surface being exposed externally and the other part being covered by a heat insulation member (109) to thereby configure the heat gaining device (101) of the closed-type circulation flowpath, according to the present invention.

FIG. 42 is a cross sectional view showing the pipeline structure being made of a heat conductive material, a part of the pipeline surface being exposed externally, and the other part being covered by the heat insulation member (109), thereby to configure the heat gaining device (101) of the closed-type circulation flowpath, according to the present invention.

Figure 43:
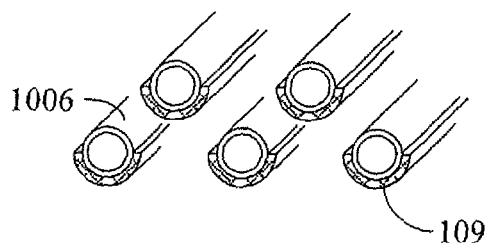
FIG. 43 is a cross sectional view showing a multiple pipeline structure made of a heat conductive material, wherein the multiple pipelines are up/down staggeredly separated, a part of each pipeline surface being exposed externally and the other part being covered by a heat insulation member (109) to thereby configure the heat gaining device (101) or the heat releasing device (201) of the closed-type circulation flowpath, according to the present invention.

FIG. 43 is a cross sectional view showing the multiple pipeline structure being made of a heat conductive material, wherein the multiple pipelines are up/down staggeredly separated, a part of each pipeline surface being exposed externally and the other part being covered by the heat insulation member (109), thereby to configure the heat gaining device (101) or the heat releasing device (201) of the closed-type circulation flowpath, according to the present invention.

Figure 44:
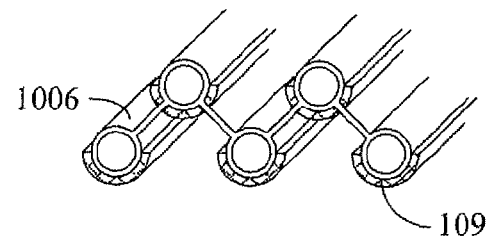
FIG. 44 is a cross sectional view showing a multiple pipeline structure made of a heat conductive material, wherein the multiple pipelines are up/down staggeredly separated and a connection structure is provided between the pipelines, a part of each pipeline surface being exposed externally and the other part being covered by a heat insulation member (109) to thereby configure the heat gaining device (101) or the heat releasing device (201) of the closed-type circulation flowpath, according to the present invention.

FIG. 44 is a cross sectional view showing the multiple pipeline structure being made of a heat conductive material, wherein the multiple pipelines are up/down staggeredly separated and a connection structure is provided between the pipelines, a part of each pipeline surface being exposed externally and the other part being covered by the heat insulation member (109), thereby to configure the heat gaining device (101) or the heat releasing device (201) of the closed-type circulation flowpath, according to the present invention.

Figure 45:
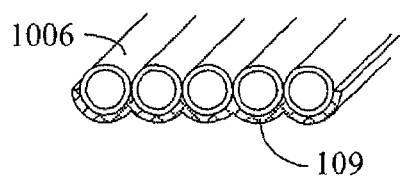
FIG. 45 is a cross sectional view showing a multiple pipeline structure made of a heat conductive material, wherein the multiple pipelines are linearly and adjacently arranged, a part of each pipeline surface being exposed externally and the other part being covered by a heat insulation member (109) to thereby configure the heat gaining device (101) or the heat releasing device (201) of the closed-type circulation flowpath, according to the present invention.

FIG. 45 is a cross sectional view showing the multiple pipeline structure being made of a heat conductive material, wherein the multiple pipelines are linearly and adjacently arranged, a part of each pipeline surface being exposed externally and the other part being covered by the heat insulation member (109), thereby to configure the heat gaining device (101) or the heat releasing device (201) of the closed-type circulation flowpath, according to the present invention.

Figure 46:
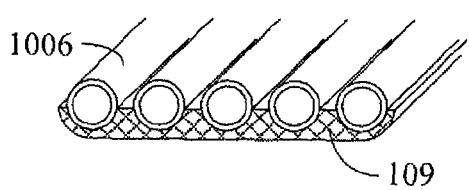
FIG. 46 is a cross sectional view showing a multiple pipeline structure made of a heat conductive material, wherein the multiple pipelines are linearly separated, a part of each pipeline surface being exposed externally and the other part being covered by a heat insulation member (109) to thereby configure the heat gaining device (101) or the heat releasing device (201) of the closed-type circulation flowpath, according to the present invention.

FIG. 46 is a cross sectional view showing the multiple pipeline structure being made of a heat conductive material, wherein the multiple pipelines are linearly separated, a part of each pipeline surface being exposed externally and the other part being covered by the heat insulation member (109), thereby to configure the heat gaining device (101) or the heat releasing device (201) of the closed-type circulation flowpath, according to the present invention.

Figure 47:
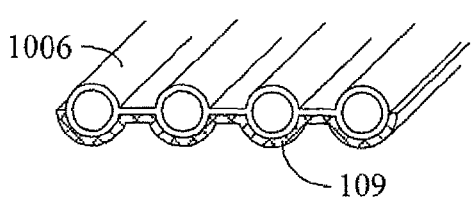
FIG. 47 is a cross sectional view showing a multiple pipeline structure made of a heat conductive material, wherein the multiple pipelines are linearly separated and a connection structure is provided between the pipelines, a part of each pipeline surface being exposed externally and the other part being covered by a heat insulation member (109) to thereby configure the heat gaining device (101) or the heat releasing device (201) of the closed-type circulation flowpath, according to the present invention.

FIG. 47 is a cross sectional view showing the multiple pipeline structure being made of a heat conductive material, wherein the multiple pipelines are linearly separated and a connection structure is provided between the pipelines, a part of each pipeline surface being exposed externally and the other part being covered by the heat insulation member (109), thereby to configure the heat gaining device (101) or the heat releasing device (201) of the closed-type circulation flowpath, according to the present invention.

(VII) The heat gaining device (101) with A-A' cross section and the heat releasing device (201) with B-B' cross section may be structured by round pipelines or pipeline structures having similar shapes made of a heat conductive material, the thermal energy transmitting surface being applied as the heat releasing surface of the heat releasing device (201) or the heat gaining surface of the heat gaining device (101), and the exterior thereof being installed with one or more thermal conductive fin sheets (1120), and configured by one or more pipeline arrangement means including: 1) being formed with a single pipeline structure, 2) multiple pipelines being up/down staggeredly separated, 3) multiple pipelines being up/down staggeredly separated and a connection structure being provided between the pipelines, 4) multiple pipelines being linearly and adjacently arranged, 5) multiple pipelines being linearly separated, and 6) multiple pipeline being linearly separated and a connection structure being provided between the pipelines.

Figure 48:
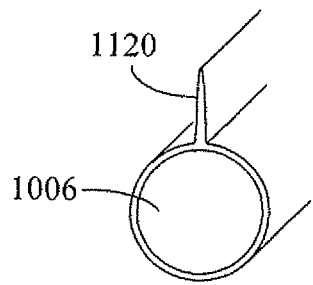
FIG. 48 is a cross sectional view showing a single pipeline structure made of a heat conductive material with the exterior of the thermal energy transmitting surface being installed with a thermal conductive fin sheet (1120) to thereby configure the heat gaining device (101) of the closed-type circulation flowpath, according to the present invention.

FIG. 48 is a cross sectional view showing the single pipeline structure being made of a heat conductive material and the exterior of the thermal energy transmitting surface being installed with a thermal conductive fin sheet (1120), thereby to configure the heat gaining device (101) of the closed-type circulation flowpath, according to the present invention.

Figure 49:
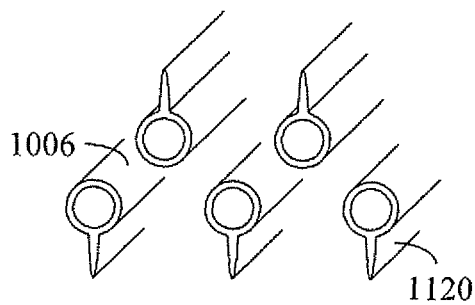
FIG. 49 is a cross sectional view showing a multiple pipeline structure made of a heat conductive material, wherein the multiple pipelines are up/down staggeredly separated and the exterior of each thermal energy transmitting surface is installed with a thermal conductive fin sheet (1120) to thereby configure the heat gaining device (101) or the heat releasing device (201) of the closed-type circulation flowpath, according to the present invention.

FIG. 49 is a cross sectional view showing the multiple pipeline structure being made of a heat conductive material, wherein the multiple pipelines are up/down staggeredly separated and the exterior of each thermal energy transmitting surface is installed with a thermal conductive fin sheet (1120), thereby to configure the heat gaining device (101) or the heat releasing device (201) of the closed-type circulation flowpath, according to the present invention.

Figure 50:
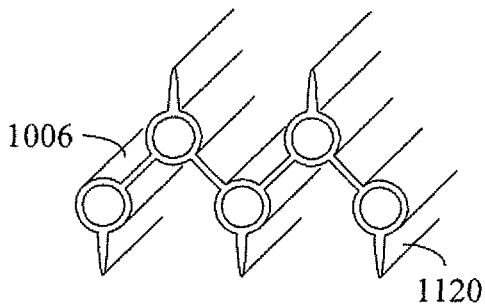
FIG. 50 is a cross sectional view showing a multiple pipeline structure made of a heat conductive material, wherein the multiple pipelines are up/down staggeredly separated and having a connection structure between each pipeline and the exterior of each thermal energy transmitting surface being installed with a thermal conductive fin sheet (1120) to thereby configure the heat gaining device (101) or the heat releasing device (201) of the closed-type circulation flowpath, according to the present invention.

FIG. 50 is a cross sectional view showing the multiple pipeline structure being made of a heat conductive material, wherein the multiple pipelines are up/down staggeredly separated and have a connection structure between each pipeline, the exterior of each thermal energy transmitting surface being installed with a thermal conductive fin sheet (1120), thereby to configure the heat gaining device (101) or the heat releasing device (201) of the closed-type circulation flowpath, according to the present invention.

Figure 51:
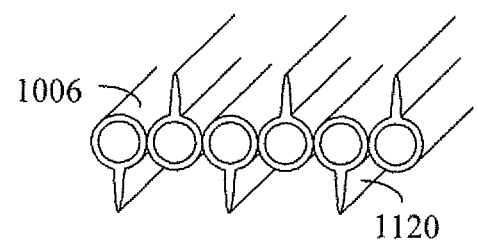
FIG. 51 is a cross sectional view showing a multiple pipeline structure made of a heat conductive material, wherein the multiple pipelines are linearly and adjacently arranged and the exterior of each thermal energy transmitting surface is installed with a thermal conductive fin sheet (1120) to thereby configure the heat gaining device (101) or the heat releasing device (201) of the closed-type circulation flowpath, according to the present invention.

FIG. 51 is a cross sectional view showing the multiple pipeline structure being made of a heat conductive material, wherein the multiple pipelines are linearly and adjacently arranged and the exterior of each thermal energy transmitting surface is installed with a thermal conductive fin sheet (1120), thereby to configure the heat gaining device (101) or the heat releasing device (201) of the closed-type circulation flowpath, according to the present invention.

Figure 52:
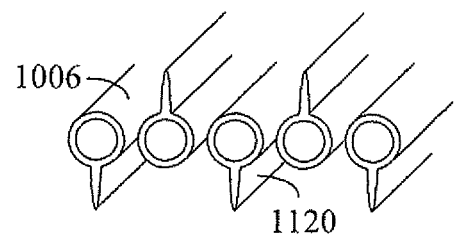
FIG. 52 is a cross sectional view showing a multiple pipeline structure made of a heat conductive material, wherein the multiple pipelines are linearly separated and the exterior of each thermal energy transmitting surface is installed with a thermal conductive fin sheet (1120) to thereby configure the heat gaining device (101) or the heat releasing device (201) of the closed-type circulation flowpath, according to the present invention.

FIG. 52 is a cross sectional view showing the round pipeline structure made of a heat conductive material, wherein the multiple pipelines are linearly separated and the exterior of each thermal energy transmitting surface is installed with a thermal conductive fin sheet (1120), thereby to configure the heat gaining device (101) or the heat releasing device (201) of the closed-type circulation flowpath, according to the present invention.

Figure 53:
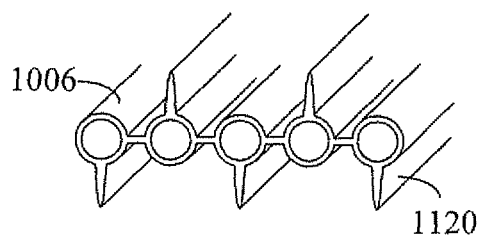
FIG. 53 is a cross sectional view showing a multiple pipeline structure made of a heat conductive material, wherein the multiple pipelines are linearly separated and a connection structure provided between each pipeline and the exterior of each thermal energy transmitting surface is installed with a thermal conductive fin sheet (1120) to thereby configure the heat gaining device (101) or the heat releasing device (201) of the closed-type circulation flowpath, according to the present invention.

FIG. 53 is a cross sectional view showing the round pipeline structure made of a heat conductive material, wherein the multiple pipelines are linearly separated and a connection structure is provided between each pipeline and the exterior of each thermal energy transmitting surface, the exterior of thermal energy transmitting surface being installed with a thermal conductive fin sheet (1120), thereby to configure the heat gaining device (101) or the heat releasing device (201) of the closed-type circulation flowpath, according to the present invention.

(VIII) The heat releasing device (201) with B-B' cross section and the heat gaining device (101) with A-A' cross section may be structured by rectangular pipelines or pipeline structures having similar shapes made of a heat conductive material, the thermal energy transmitting surface being applied as the heat releasing surface of the heat releasing device (201) or the heat gaining surface of the heat gaining device (101) with one side or more than one sides of the exterior being installed with one or more than one thermal conductive fin sheets (1120), and the interior being configured by one or more of the following pipeline arrangement means including: 1) being formed as a hollow structure, 2) formed with a staggered semi-partitioned flowpath structure, 3) formed with a staggered semi-partitioned flowpath structure at single side, and 4) formed with a partitioned flowpath structure.

Figure 54:
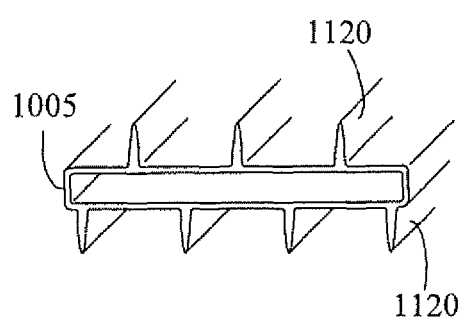
FIG. 54 is a cross sectional view of a rectangular pipeline made of a heat conductive material, wherein the exterior of the thermal energy transmitting surface is installed with thermally conductive fin sheets (1120) and the interior thereof is hollow to thereby configure the heat gaining device (101) or the heat releasing device (201) of the closed-type circulation flowpath, according to the present invention.

FIG. 54 is a cross sectional view of a rectangular pipeline made of a heat conductive material, wherein the exterior of the thermal energy transmitting surface is installed with thermal conductive fin sheets (1120) and the interior thereof is hollow, thereby to configure the heat gaining device (101) or the heat releasing device (201) of the closed-type circulation flowpath, according to the present invention.

Figure 55:
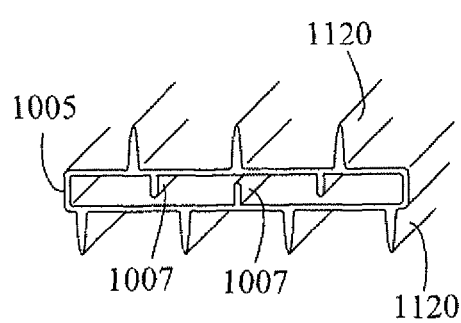
FIG. 55 is a cross sectional view of a rectangular pipeline made of a heat conductive material, wherein the exterior of the thermal energy transmitting surface is installed with thermal conductive fin sheets (1120) and the interior thereof is formed with a staggered semi-partitioned flowpath structure to thereby configure the heat gaining device (101) or the heat releasing device (201) of the closed-type circulation flowpath, according to the present invention.

FIG. 55 is a cross sectional view of a rectangular pipeline made of a heat conductive material, wherein the exterior of the thermal energy transmitting surface is installed with thermal conductive fin sheets (1120) and the interior thereof is formed with a staggered semi-partitioned flowpath structure, thereby to configure the heat gaining device (101) or the heat releasing device (201) of the closed-type circulation flowpath, according to the present invention.

Figure 56:
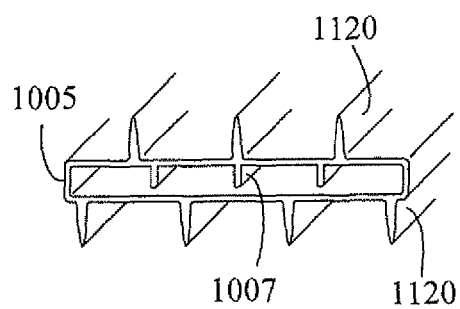
FIG. 56 is a cross sectional view of a rectangular pipeline made of a heat conductive material, wherein the exterior of the thermal energy transmitting surface is installed with thermal conductive fin sheets (1120) and the interior thereof is formed with a semi-partitioned flowpath structure at a single side to thereby configure the heat gaining device (101) or the heat releasing device (201) of the closed-type circulation flowpath, according to the present invention.

FIG. 56 is a cross sectional view of a rectangular pipeline made of a heat conductive material, wherein the exterior of the thermal energy transmitting surface is installed with thermal conductive fin sheets (1120) and the interior thereof is formed with a semi-partitioned flowpath structure at a single side, thereby to configure the heat gaining device (101) or the heat releasing device (201) of the closed-type circulation flowpath, according to the present invention.

Figure 57:
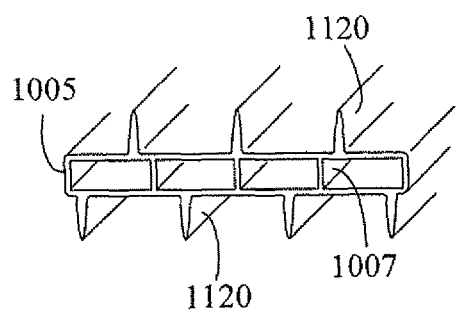
FIG. 57 is a cross sectional view of a rectangular pipeline made of a heat conductive material, wherein the exterior of the thermal energy transmitting surface is installed with thermal conductive fin sheets (1120) and the interior thereof is formed with a partitioned flowpath structure to thereby configure the heat gaining device (101) or the heat releasing device (201) of the closed-type circulation flowpath, according to the present invention.

FIG. 57 is a cross sectional view of a rectangular pipeline made of a heat conductive material, wherein the exterior of the thermal energy transmitting surface is installed with thermal conductive fin sheets (1120) and the interior thereof is formed with a partitioned flowpath structure, thereby to configure the heat gaining device (101) or the heat releasing device (201) of the closed-type circulation flowpath, according to the present invention.

(IX) The heat releasing device (201) with B-B' cross section and the heat gaining device (101) with A-A' cross section may be structured by W-shaped pipelines or pipeline structures having similar shapes to be applied in the closed-type circulation flowpath of the present invention, the wider top and bottom surfaces being formed with outwardly-bent wave-shaped thermal energy transmitting surfaces serving as heat releasing surfaces or heat gaining surfaces, and configured by a heat conductive material, and the interior being configured by one or more of the following pipeline arrangement means including being: 1) formed as a hollow structure, 2) formed with a staggered semi-partitioned flowpath structure, 3) formed with a staggered semi-partitioned flowpath structure at a single side, and 4) formed with a partitioned flowpath structure.

Figure 58:
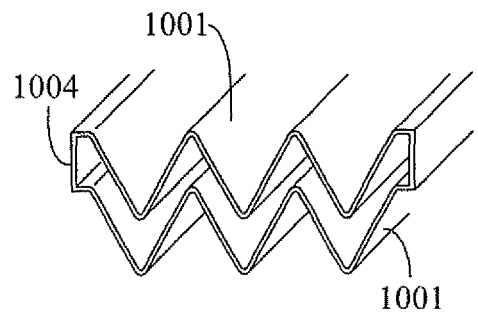
FIG. 58 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a hollow structure to thereby configure the heat gaining device (101) or the heat releasing device (201) of the closed-type circulation flowpath, according to the present invention.

FIG. 58 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a hollow structure, thereby to configure the heat gaining device (101) or the heat releasing device (201) of the closed-type circulation flowpath, according to the present invention.

Figure 59:
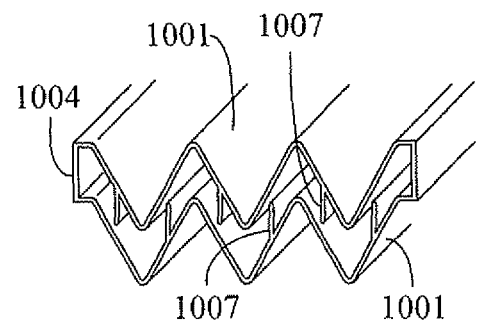
FIG. 59 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a staggered semi-partitioned flowpath structure to thereby configure the heat gaining device (101) or the heat releasing device (201) of the closed-type circulation flowpath, according to the present invention.

FIG. 59 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a staggered semi-partitioned flowpath structure, thereby to configure the heat gaining device (101) or the heat releasing device (201) of the closed-type circulation flowpath, according to the present invention.

Figure 60:
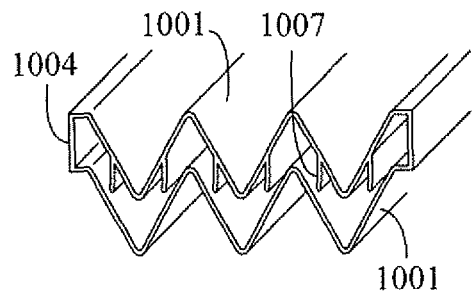
FIG. 60 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a staggered semi-partitioned flowpath structure at a single side to thereby configure the heat gaining device (101) or the heat releasing device (201) of the closed-type circulation flowpath, according to the present invention.

FIG. 60 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a staggered semi-partitioned flowpath structure at a single side, thereby to configure the heat gaining device (101) or the heat releasing device (201) of the closed-type circulation flowpath, according to the present invention.

Figure 61:
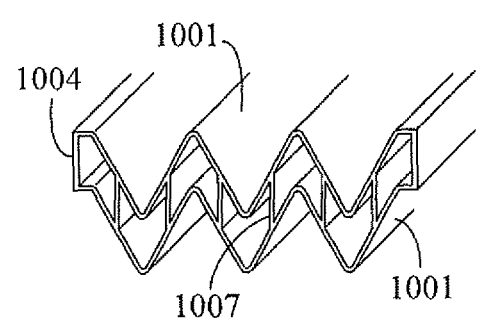
FIG. 61 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a partitioned flowpath structure to thereby configure the pipeline structure (301) or the pipeline structure (401) of the closed-type circulation flowpath, according to the present invention.

FIG. 61 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a partitioned flowpath structure, thereby to configure the pipeline structure (301) or the pipeline structure (401) of the closed-type circulation flowpath, according to the present invention.

The embodiments for illustrating each pipeline structure as shown is FIG. 16 to FIG. 61 serve as examples of applications of closed-loop temperature equalization systems having a heat releasing device structured by multiple flowpaths, and the scope of the present invention shall not be limited thereby.

Figure 62:
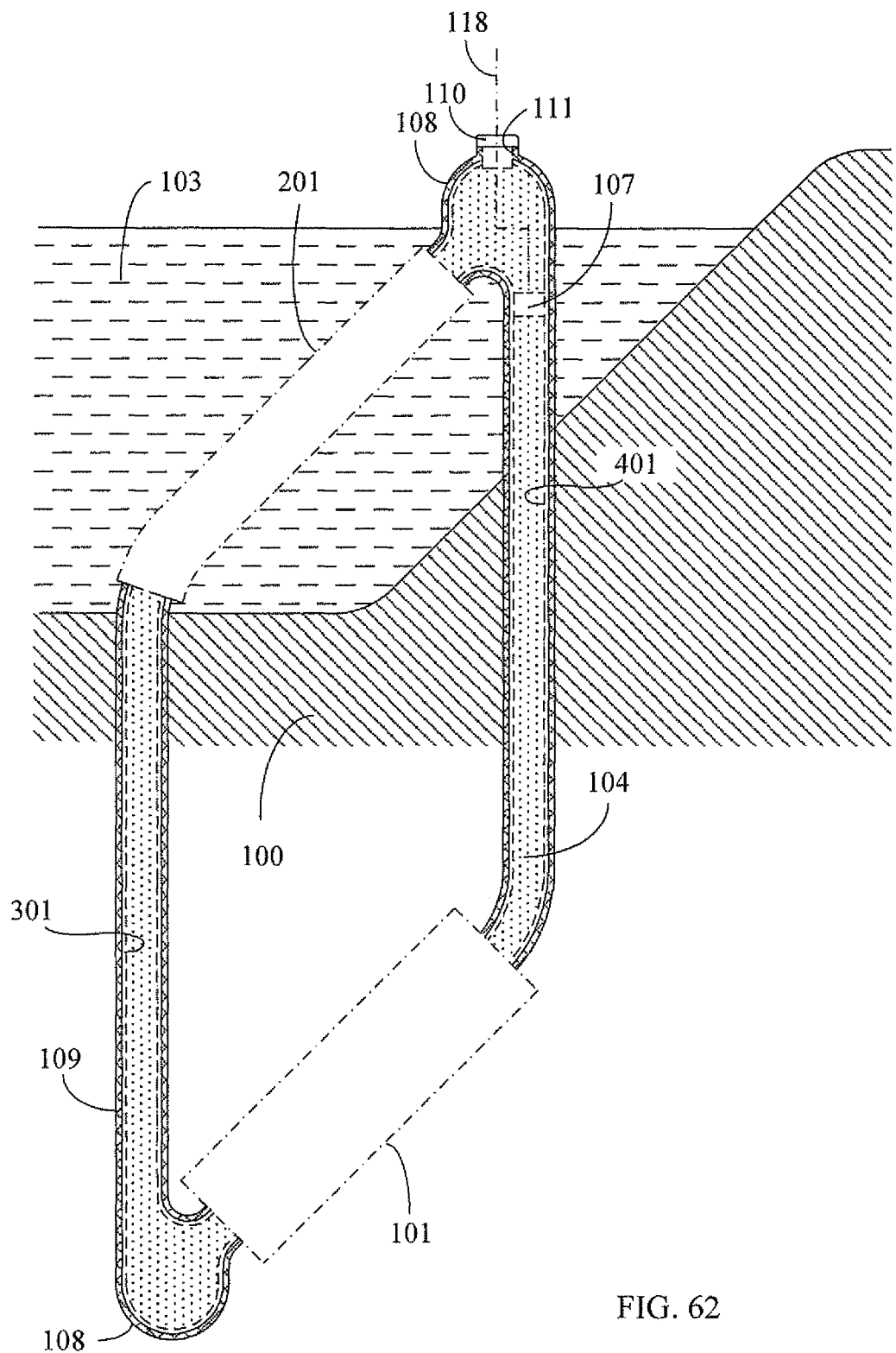
FIG. 62 is a schematic view showing the first example of the applied structure and installation means, according to the present invention.

In the closed-loop temperature equalization system having a heat releasing device structured by multiple flowpaths, examples of the geometric shape of the applied structure configured by the heat gaining device (101), the heat releasing device (201), the pipeline structure (301) and the pipeline structure (401), and the means for being installed in a natural thermal energy body and the means for releasing heat to the exterior are as follows:

FIG. 62 is a schematic view showing the first example of the applied structure and installation means, according to the present invention.

As shown in FIG. 62, in the closed-loop temperature equalization system having a heat releasing device structured by multiple flowpaths, the heat gaining device (101) is buried under the natural heat storage body (100), and the heat releasing device (201) is disposed in water, wherein the heat releasing surface of the heat releasing device (201) releases the thermal energy to the external gaseous or liquid fluid in the an omni-directional manner or in a selected direction, and the closed-type flowpath is configured through the pipeline structure (301) and the pipeline structure (401) for allowing the heat exchange fluid (104) to flow in a closed and circulative manner. An auxiliary fluid pump (107) and auxiliary heating/cooling device (115) can be optionally installed according to actual needs.

Figure 63:
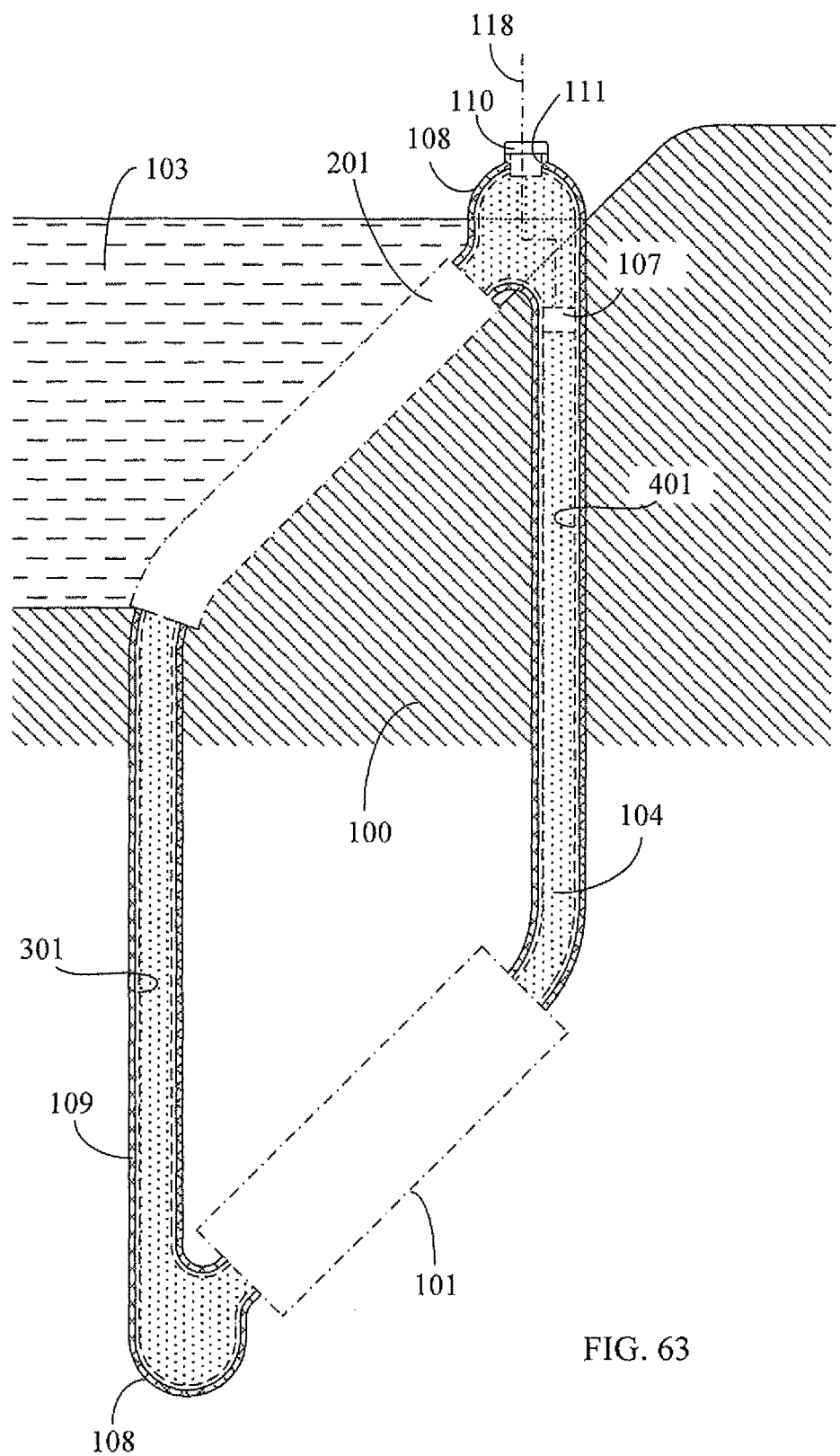
FIG. 63 is a schematic view showing the second example of the applied structure and installation means, according to the present invention.

FIG. 63 is a schematic view showing the second example of the applied structure and installation means, according to the present invention.

As shown in FIG. 63, in the closed-loop temperature equalization system having a heat releasing device structured by multiple flowpaths, the heat gaining device (101) is buried under the natural heat storage body (100), and the heat releasing device (201) is installed adjacent to the shore, wherein the heat releasing surface of the heat releasing device (201) releases the thermal energy to the exterior in the an omni-directional manner or in a selected direction, and the closed-type flowpath is configured through the pipeline structure (301) and the pipeline structure (401) for allowing the heat exchange fluid (104) to flow in a closed and circulative manner. An auxiliary fluid pump (107) and auxiliary heating/cooling device (115) can be optionally installed according to actual needs.

Figure 64:
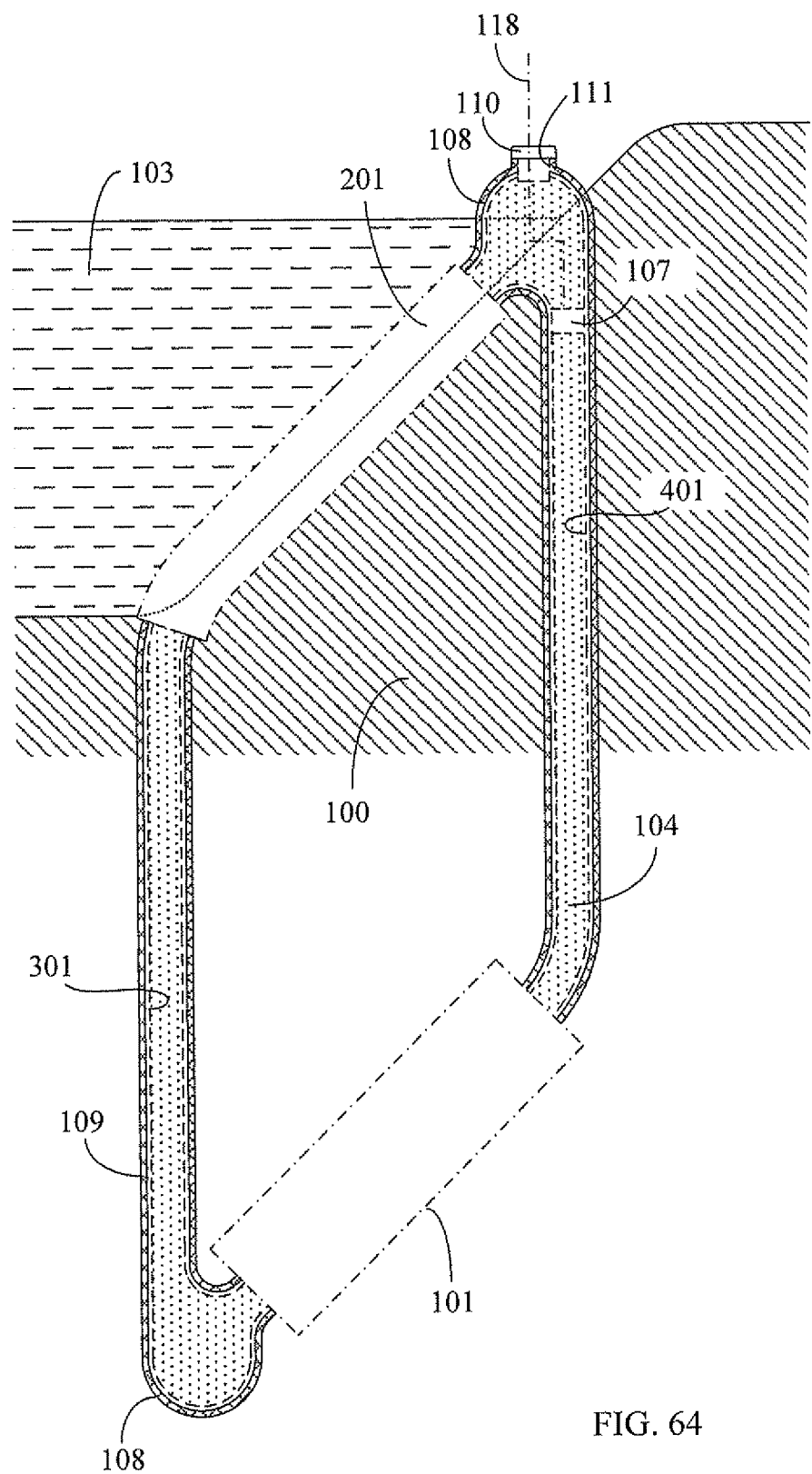
FIG. 64 is a schematic view showing the third example of the applied structures and installation means, according to the present invention.

FIG. 64 is a schematic view showing the third example of the applied structures and installation means, according to the present invention.

As shown in FIG. 64, in the closed-loop temperature equalization system having a heat releasing device structured by multiple flowpaths, the heat gaining device (101) is buried under the natural heat storage body (100), and the heat releasing device (201) is partially embedded in the shore, wherein the heat releasing surface of the heat releasing device (201) releases the thermal energy to the external gaseous or liquid fluid in the an omni-directional manner or in a selected direction, and the closed-type flowpath is configured through the pipeline structure (301) and the pipeline structure (401) for allowing the heat exchange fluid (104) to flow in a closed and circulative manner. An auxiliary fluid pump (107) and auxiliary heating/cooling device (115) can be optionally installed according to actual needs.

Figure 65:
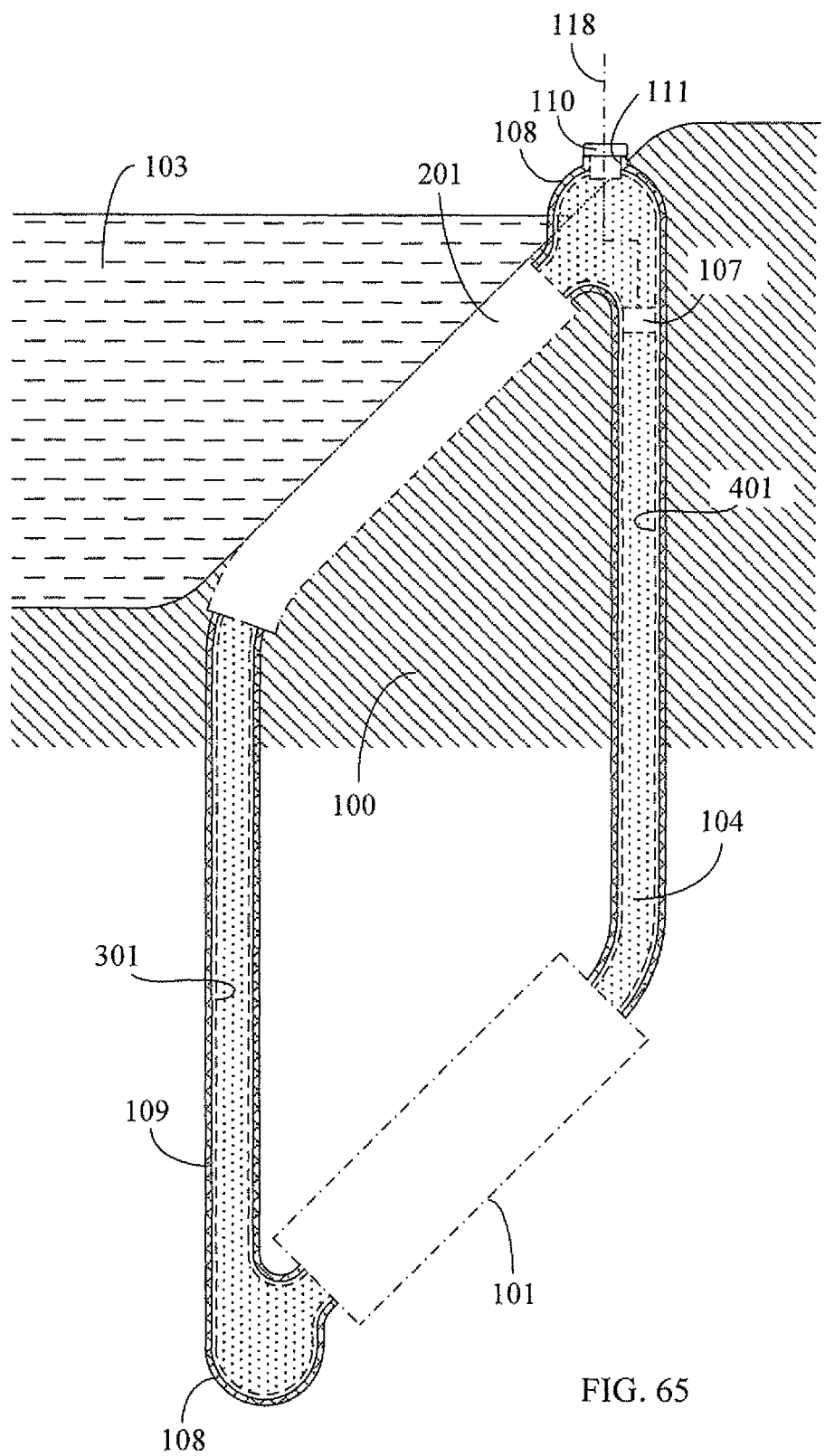
FIG. 65 is a schematic view showing the fourth example of the applied structure and installation means, according to the present invention.

FIG. 65 is a schematic view showing the fourth example of the applied structure and installation means, according to the present invention.

As shown in FIG. 65, in the closed-loop temperature equalization system having a heat releasing device structured by multiple flowpaths, the heat gaining device (101) is buried under the natural heat storage body (100), and the heat releasing device (201) is embedded in the shore, wherein the heat releasing surface of the heat releasing device (201) releases the thermal energy to the external gaseous or liquid fluid in the an omni-directional manner or in a selected direction, and the closed-type flowpath is configured through the pipeline structure (301) and the pipeline structure (401) for allowing the heat exchange fluid (104) to flow in a closed and circulative manner, an auxiliary fluid pump (107) and auxiliary heating/cooling device (115) being optionally installed according to actual needs.

Figure 66:
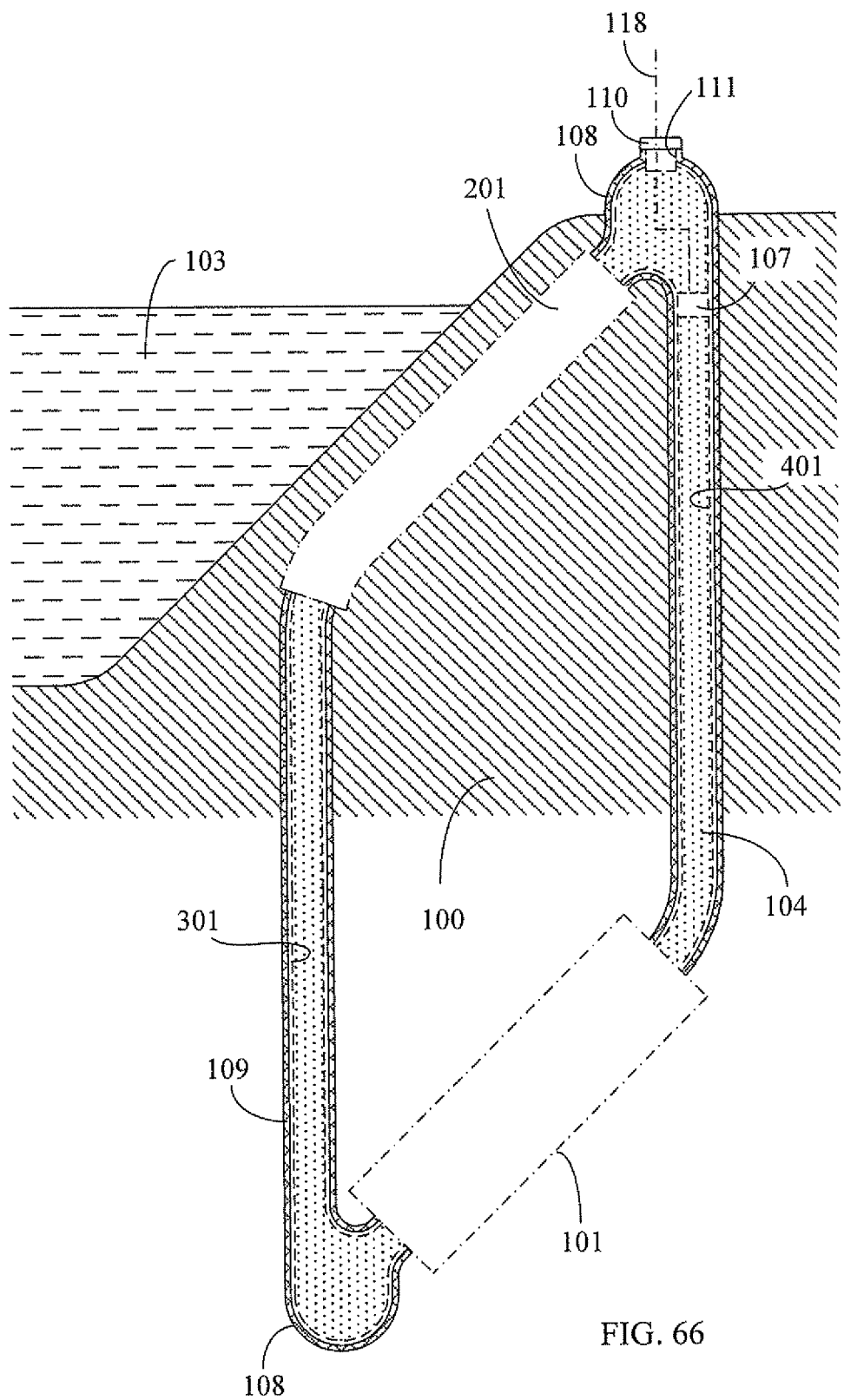
FIG. 66 is a schematic view showing the fifth example of the applied structure and installation means, according to the present invention.

FIG. 66 is a schematic view showing the fifth example of the applied structure and installation means, according to the present invention.

As shown in FIG. 66, in the closed-loop temperature equalization system having a heat releasing device structured by multiple flowpaths, the heat gaining device (101) is buried under the natural heat storage body (100), and the heat releasing device (201) is embedded in the shore, wherein the heat releasing surface of the heat releasing device (201) releases the thermal energy to the external stratum in an omni-directional manner or in a selected direction, and the closed-type flowpath is configured through the pipeline structure (301) and the pipeline structure (401) for allowing the heat exchange fluid (104) to flow in a closed and circulative manner, an auxiliary fluid pump (107) and auxiliary heating/cooling device (115) being optionally installed according to actual needs.

Figure 67:
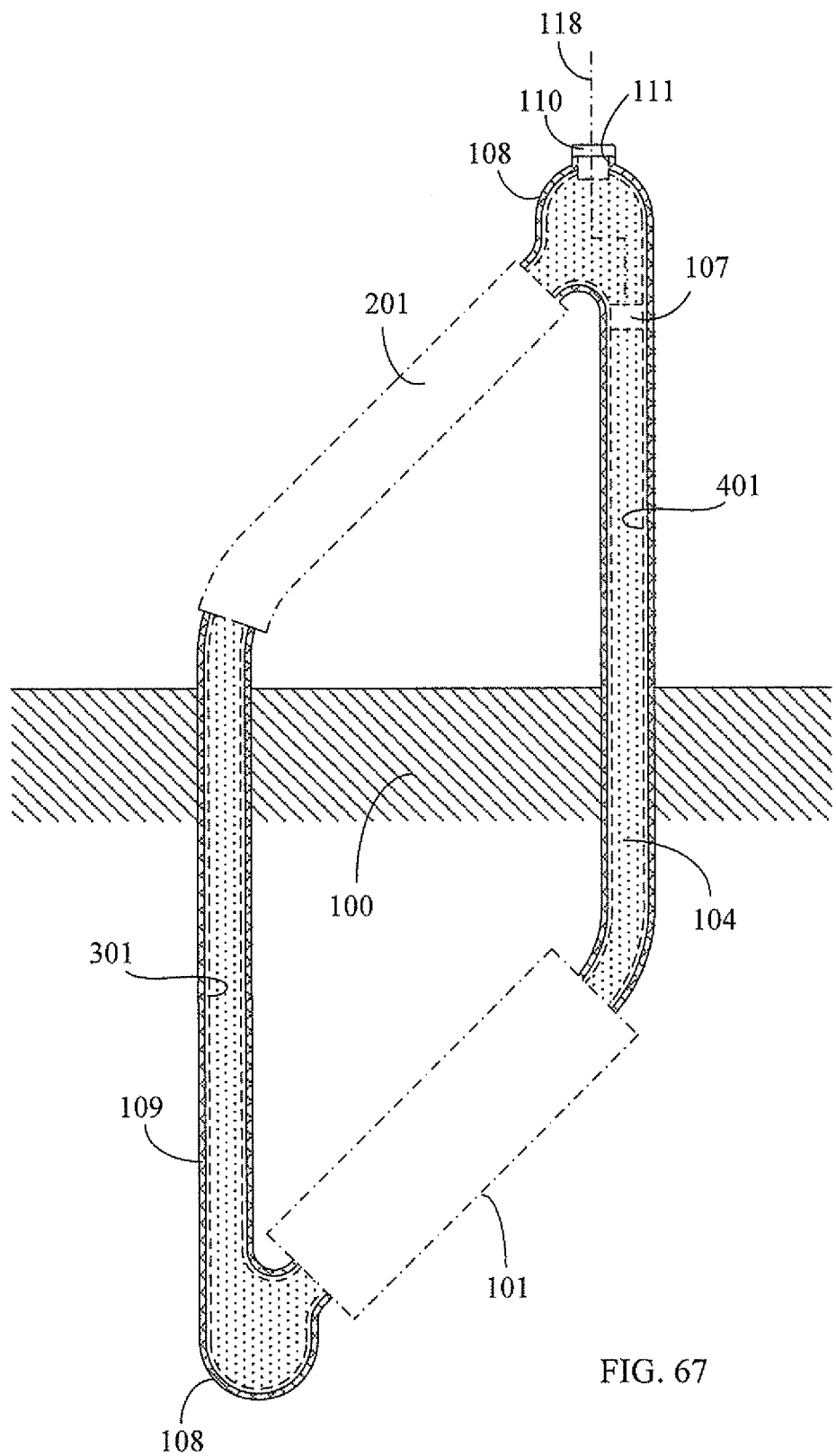
FIG. 67 is a schematic view showing the sixth example of the applied structure and installation means, according to the present invention.

FIG. 67 is a schematic view showing the sixth example of the applied structure and installation means, according to the present invention.

As shown in FIG. 67, in the closed-loop temperature equalization system having a heat releasing device structured by multiple flowpaths, the heat gaining device (101) is buried under the natural heat storage body (100), and the heat releasing device (201) is exposed at the top, wherein the heat releasing surface of the heat releasing device (201) releases the thermal energy to the external gaseous or liquid fluid in an omni-directional manner or in a selected direction, and the closed-type flowpath is configured through the pipeline structure (301) and the pipeline structure (401) for allowing the heat exchange fluid (104) to flow in a closed and circulative manner, an auxiliary fluid pump (107) and auxiliary heating/cooling device (115) being optionally installed according to actual needs.

Figure 68:
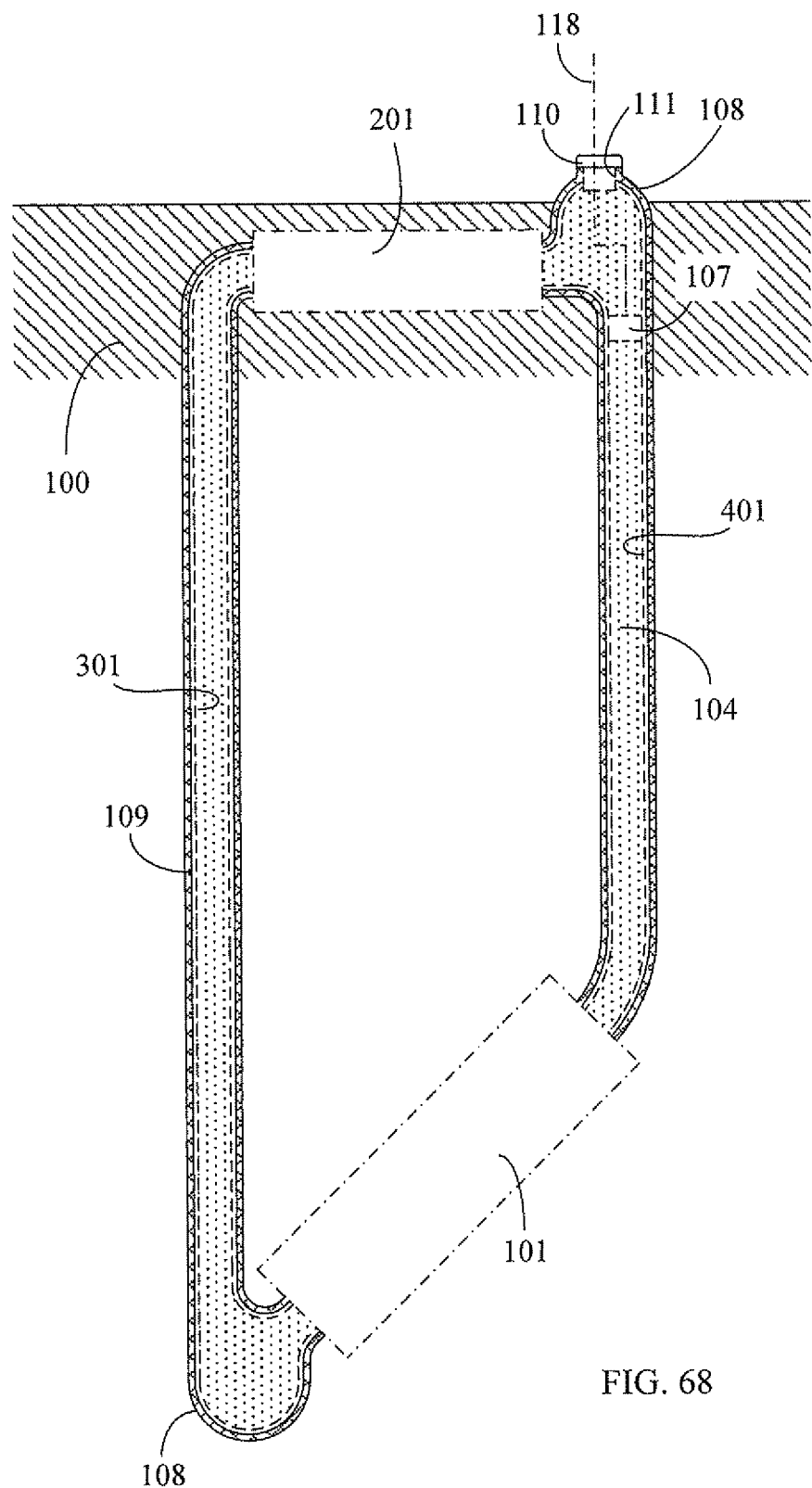
FIG. 68 is a schematic view showing the seventh example of the applied structure and installation means, according to the present invention.

FIG. 68 is a schematic view showing the seventh example of the applied structure and installation means, according to the present invention.

As shown in FIG. 68, in the closed-loop temperature equalization system having a heat releasing device structured by multiple flowpaths, the heat gaining device (101) is inclined and buried under the natural heat storage body (100), and the heat releasing device (201) extends horizontally and is installed in the ground, exposed outside the ground, or partially exposed outside the ground, wherein the heat releasing surface of the heat releasing device (201) releases the thermal energy to the exterior in an omni-directional manner or in a selected direction, and the closed-type flowpath is configured through the pipeline structure (301) and the pipeline structure (401) for allowing the heat exchange fluid (104) to flow in a closed and circulative manner, an auxiliary fluid pump (107) and auxiliary heating/cooling device (115) being optionally installed according to actual needs.

Figure 69:
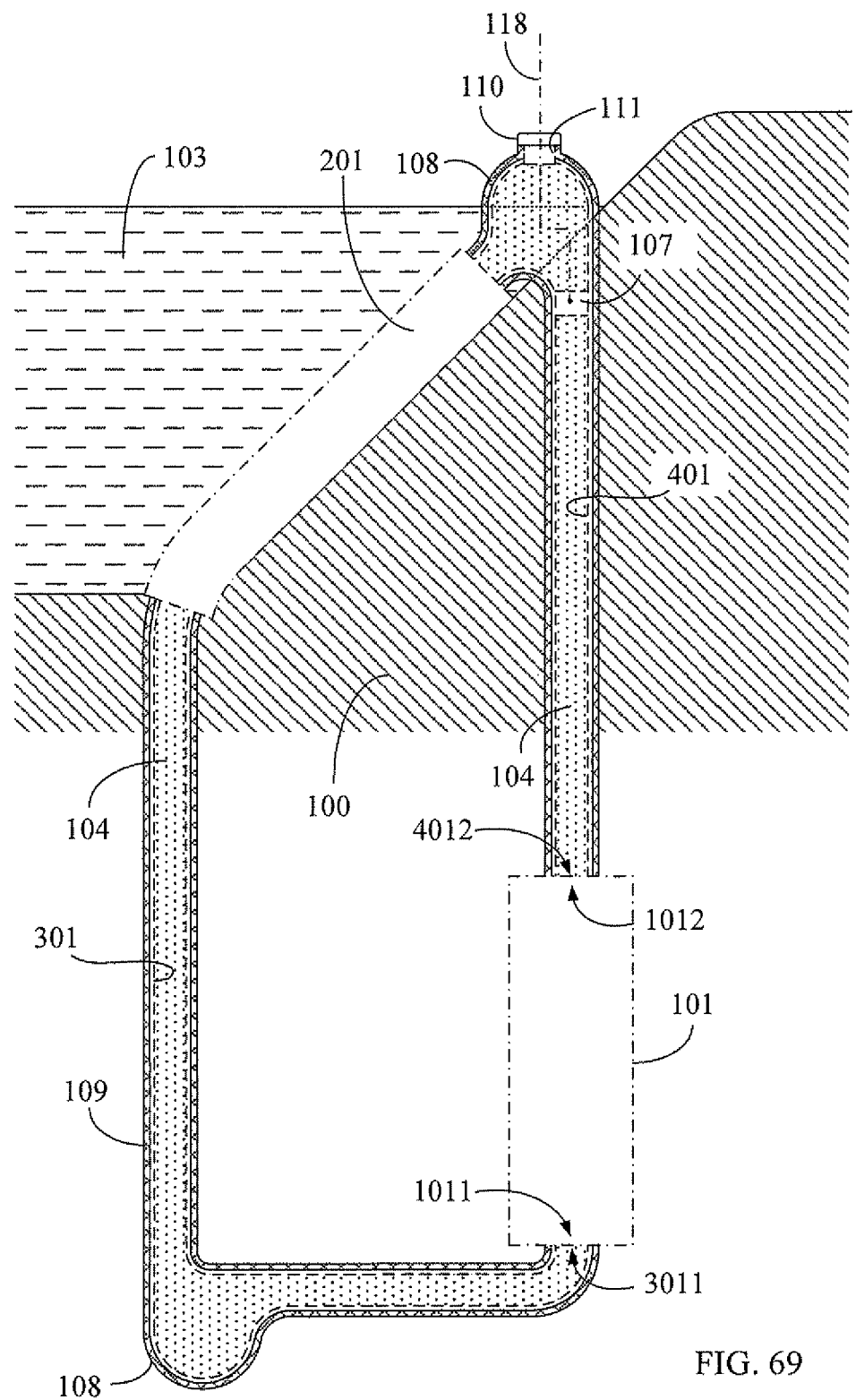
FIG. 69 is a schematic view showing the eighth example of the applied structure and installation means, according to the present invention.

FIG. 69 is a schematic view showing the eighth example of the applied structure and installation means, according to the present invention.

As shown in FIG. 69, in the closed-loop temperature equalization system having a heat releasing device structured by multiple flowpaths, the heat gaining device (101) is vertically disposed and buried under the natural heat storage body (100), and the heat releasing device (201) is installed in the ground, exposed outside the ground, or partially exposed outside the ground, the heat gaining device (101) and the heat releasing device (201) communicating through the vertical pipeline structure (401) to carry the heat exchange fluid (104), to the heat releasing device (201) so that it releases the thermal energy to the external gaseous or liquid fluid in an omni-directional manner or in a selected direction. An upward fluid inlet/outlet port (3011) of an L-shaped pipeline structure (301) is provided with an outwardly-expanded arc-shaped fluid chamber (108) at a bottom turning location, which communicates with a fluid inlet/outlet port (1011) at the bottom of the heat gaining device (101), the heat exchange fluid passing from the fluid inlet/outlet port (3011) to the fluid inlet/outlet port (1011) and then through the heating gaining device (101), after which it passes to the fluid inlet/outlet port (4012) of the pipeline structure (401) through the fluid inlet/outlet port (1012) at the top of the heat gaining device (101), and then passes through the pipeline structure (401) to complete the closed-type flowpath which allows the heat exchange fluid (104) to flow in a closed and circulative manner, an auxiliary fluid pump (107) and auxiliary heating/cooling device (115) being optionally installed according to actual needs.

Figure 70:
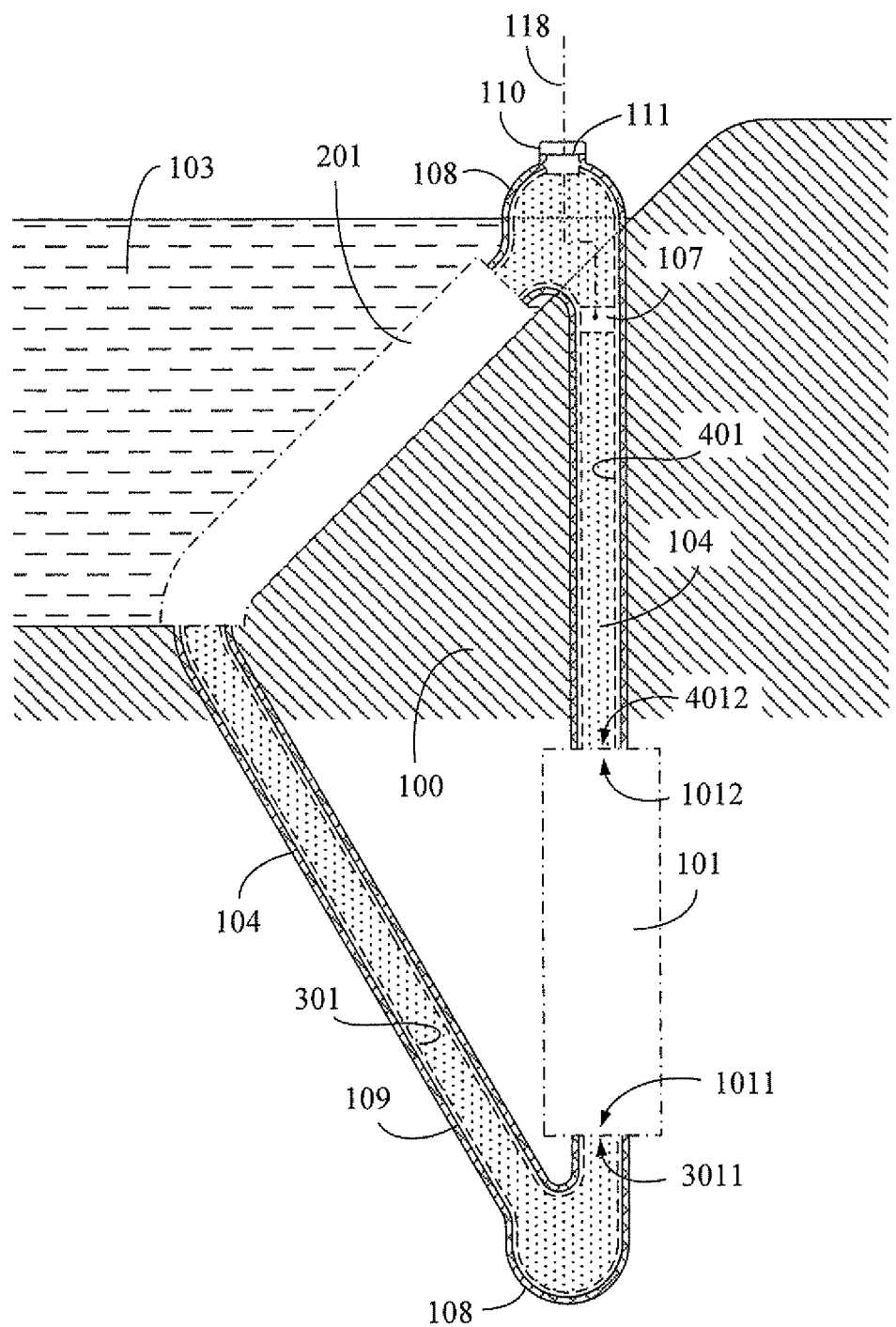
FIG. 70 is a schematic view showing the ninth example of the applied structure and installation means, according to the present invention.

FIG. 70 is a schematic view showing the ninth example of the applied structure and installation means, according to the present invention.

As shown in FIG. 70, in the closed-loop temperature equalization system having a heat releasing device structured by multiple flowpaths, the heat gaining device (101) is vertically disposed and buried under the natural heat storage body (100), and the heat releasing device (201) is installed in the ground or exposed outside the ground or partially exposed outside the ground, the heat gaining device (101) and the heat releasing device (201) communicating through the vertical pipeline structure (401) to pass the heat exchange fluid (104) so that the heat releasing device (201) releases the thermal energy to an external gaseous or liquid fluid in an omni-directional manner or in a selected direction, the heat exchange fluid (104) then passing through the downwardly extending pipeline structure (301) to the fluid inlet/outlet port (3011) of the outwardly-expanded arc-shaped fluid chamber (108) installed at the bottom of the heat gaining device (101), after which the heat exchange fluid (104) passes the fluid inlet/outlet port (1011) at the bottom of the heat gaining device (101), and returns to the fluid inlet/outlet port (4012) of the pipeline structure (401) through the fluid inlet/outlet port (1012) at the top of the heat gaining device (101) to enter the pipeline structure (401) and complete the closed-type flowpath which allows the heat exchange fluid (104) to flow in a closed and circulative manner, an auxiliary fluid pump (107) and an auxiliary heating/cooling device (115) being optionally installed according to actual needs.

The above-described applied structures and installation means for the closed-loop temperature equalization system having a heat releasing device structured by multiple flowpaths serve as examples. The present invention can be adopted and applied under various environmental conditions based on the illustrated embodiments and related art, which can be easily understood by skilled people in the arts.

The invention claimed is:

1. A closed-loop temperature equalization system, comprising:
   a heat gaining device (101) having at least one flowpath for a heat exchange fluid (104), the heat gaining device (101) being installed within a natural thermal energy storage body (100) and arranged to transfer heat between the natural heat storage body (100) and the heat exchange fluid (104);
   a heat releasing device (201) having at least two flowpaths for the heat exchange fluid (104), the heat releasing device (201) being arranged to transfer heat between the heat exchange fluid (104) in the heat releasing device (201) and a temperature differentiation body (103) that is outside the natural thermal energy storage body (100);
   a first pipeline structure (301) connected between a first fluid inlet/outlet port (1011) of the heat gaining device (101) and a second fluid inlet/outlet port (2012) of the heat releasing device (201) for carrying the heat exchange fluid (104) between the heat gaining device (101) and the heat releasing device (201); and
   a second pipeline structure (401) connected between a second fluid inlet/outlet port (1012) of the heat gaining device (101) and a first fluid inlet/outlet port (2011) of the heat releasing device (201) for carrying the heat exchange fluid (104) between the heat releasing device (201) and the heat gaining device (101),
   an operation port (111) adjacent the first fluid inlet/outlet port (2011) of the heat releasing device (201) at an upper end of a top corner of the closed-loop flowpath for filling and removing the heat exchange fluid, and a sealing plug (110) for closing the operation port (111),
   wherein the first fluid inlet/outlet port (1011) of the heat gaining device (101) is at a lower position than the second fluid inlet/outlet port (1012) of the heat gaining device (101) to facilitate flow of the heat exchange fluid (104) from the heat gaining device (101) into the second pipeline structure (401) and flow of the heat exchange fluid (104) from the first fluid piping (301) into the heat gaining device (101) as a result of an effect in which warmer fluid ascends and colder fluid descends,
   wherein the second fluid inlet/outlet port (2012) of the heat releasing device (201) is at a lower position than the first fluid inlet/outlet port (2011) of the heat releasing device (201) to facilitate or at least not interfere with flow of the heat exchange fluid (104) into the heat releasing device (201) from the second pipeline structure (401) and flow of the heat exchange fluid (104) into the first fluid piping (301) from the heat gaining device (101) as a result of an effect in which warmer fluid ascends and colder fluid descends,
   wherein the first pipeline structure (301) and the second pipeline structure (401) each includes at least one turning portion at which the respective first pipeline structure (301) and second pipeline structure (401) changes direction, and the at least one turning portion of the first and second pipeline structures (301,401) each includes an outwardly-expanding arc-shaped fluid chamber (108) for temporarily storing a portion of the heat exchange fluid (104) and moderating a flow-speed of the heat exchange fluid (104) through the respective first and second pipeline structures (301,401),
   wherein the heat exchange fluid (104) at the sides of the heat gaining device (101) and heat releasing device (102) where the outward-expanding arc-shaped fluid chambers (108) are respectively installed have a higher heat capacity as a result of the larger volume of the fluid chambers (108) and therefore generate a smaller temperature difference with respect to the heat exchange fluid (104) in the heat gaining and heat releasing devices (101,102) than the heat exchange fluid (104) on the other sides where the outward-expanding arc-shaped fluid chambers (108) are not installed, thereby forming temperature differentiation at the two sides of the heat gaining device (101) and the two sides of the heat releasing device (102) to facilitate flow of the heat exchange fluid (104) circulation of the heat exchange fluid (104) through the first and second pipeline structures (301, 401).

2. The closed-loop temperature equalization system as claimed in claim 1, further comprising an operation port (111) situated at an upper end of a top corner of the closed-loop flowpath in the outward-expanding arc-shaped fluid chamber (108) of the pipeline structure (401) for filling and removing the heat exchange fluid and providing an interface for observation and maintenance, and a sealing plug (110) for closing the operation port (111).

3. The closed-loop temperature equalization system as claimed in claim 2, further comprising an auxiliary fluid heating and cooling device (115) situated in the interior or exterior of the pipeline structure (401).

4. The closed-loop temperature equalization system as claimed in claim 3, wherein the auxiliary fluid heating and cooling device (115) is supplied with electric power by a power wire (116) for selectively assisting convective circulation by heating or cooling the heat exchange fluid (104), the auxiliary fluid heating and cooling device (115) having at least one of the following configurations:
   a. the auxiliary fluid heating and cooling device (115) is fixedly installed inside a flowpath segment extending from the heat gaining device (101) to the second pipeline structure (401);
   b. the auxiliary fluid heating and cooling device (115) surrounds or is partially installed in said flowpath segment, said flowpath segment being made of a heat conductive material;
   c. the auxiliary fluid heating and cooling device (115) is inserted into said flowpath segment through a top cover (112) of the corresponding arc-shaped fluid chamber (108), an operation port (111) in the top cover (112), or an operation port (111) in the corresponding arc-shaped fluid chamber (108);
   d. the auxiliary fluid heating and cooling device (115) is installed at a bottom of a sealing plug that closes the operation port (111).

5. The closed-loop temperature equalization system as claimed in claim 2, further comprising an auxiliary fluid pump (107) situated in the pipeline structure (401).

6. The closed-loop temperature equalization system as claimed in claim 5, wherein the auxiliary fluid pump (107) has a non-operating mode in which the heat exchange fluid (104) circulates exclusively due to a cold descending/hot ascending effect, a normal-direction operating mode in which the auxiliary fluid pump (107) is actively controlled to pump the heat exchange fluid (104) in a same direction as the circulation direction of the heat exchange fluid (104) due to the cold descending/hot ascending effect, and a reverse-direction operating mode in which the auxiliary fluid pump (107) is actively controlled to pump the heat exchange fluid (104) in a direction opposite to said circulation direction.

7. The closed-loop temperature equalization system as claimed in claim 1, wherein the heat gaining device (101), first pipeline structure (301), heat releasing device (201), and second pipeline structure (401) are integral or separate components having shapes that provide a smooth transition between the components to facilitate fluid flow.

8. The closed-loop temperature equalization system as claimed in claim 1, wherein the natural thermal energy storage body (100) is one of a stratum, ground, lake, pool, river, desert, iceberg, and ocean.

9. The closed-loop temperature equalization system as claimed in claim 1, wherein the first pipeline structures (301) is made of a heat insulating material or covered by a heat insulation member (109), and includes at least one first fluid inlet/outlet port (3011) connected to the at least one first fluid inlet/outlet port (1011) of the heat gaining device (101) and at least one second fluid inlet/outlet port (3012) connected to the at least one second fluid inlet/outlet port (2012) of the heat releasing device (201).

10. The A closed-loop temperature equalization system as claimed in claim 1, wherein the second pipeline structure (401) has at least one of the following configurations:
   a. the second pipeline structure (401) is configured by a material having good heat conductivity;
   b. the second pipeline structure (401) is configured by a material having good heat conductivity with at least an exterior section of the second pipeline structure (401) closest in temperature to the temperature of the natural heat storage body (100) being covered by a heat insulation member (109); and
   c. the second pipeline structure (401) is configured by a material having good heat conductivity with a first end having at least one first fluid inlet/outlet port (4012) connected to the first fluid inlet/outlet port (1012) of the heat gaining device (101) and a second end having at least one second fluid inlet/outlet port (4011) connected to the second fluid inlet/outlet port (2011) of the heat releasing device (201).

11. The closed-loop temperature equalization system as claimed in claim 1, wherein the outward-expanding arc-shaped fluid chamber (108) in the second pipeline structure (401) is formed by a top cover (112) mounted on a hinge (113) and sealed by a sealing ring (114) to enable maintenance access to the closed-loop temperature equalization system, and further including an operation port (111) in the top cover (112) to enable observation and the addition or removal of fluid from the closed-loop temperature equalization system, the operation port (111) being sealed by a sealing plug (110).

12. The closed-loop temperature equalization system as claimed in claim 1, further comprising at least one of an auxiliary fluid pump (107) and an auxiliary heating/cooling device (115) and at least one of a heat exchange fluid temperature detecting device (TS201) and an environment temperature detecting device (TS202), said at least one of the auxiliary fluid pump (107) and auxiliary heating/cooling device (115) being controlled by an electric power control unit (ECU200) in response to internal settings and feedback signals received through a signal transmission wire (120) from the at least one of the heat exchange fluid temperature detecting device (TS201) and environment temperature detecting device (TS202).

13. The closed-loop temperature equalization system as claimed in claim 1, wherein the heat gaining device (101) and the heat releasing device (201) each includes at least one pipe-shaped structure made of a material having high heat conductivity and having a respective cross section (A-A and B-B) with one of a round shape, a rectangular shape, and a "w"-shape.

14. The closed-loop temperature equalization system as claimed in claim 13, wherein the heat gaining device (101) further includes thermally conductive fin sheets extending into the natural thermal energy storage body (100).

15. The closed-loop temperature equalization system as claimed in claim 1, wherein the heat gaining device (101) and the heat releasing device (201) each includes at least one of a hollow structure, a structure formed with staggered semi-partitioned flowpaths, and a structure formed with partitioned flowpaths.

16. A The closed-loop temperature equalization system as claimed in claim 1, wherein the first and second pipeline structures (301,401) each includes a pipe-shaped segment having a cross section (C-C,D-D) with one of a round shape and a rectangular shape.

17. The closed-loop temperature equalization system as claimed in claim 1, wherein the heat gaining device (101) and the heat releasing device (201) is arranged in one of the following configurations:
   a. the heat gaining device (101) is buried in the natural heat storage body (100) and the heat releasing device (201) is disposed in water;
   b. the heating gaining device (101) is buried in the natural heat storage body (100), and the heat releasing device (201) is installed adjacent a shore of a body of water;
   c. the heat gaining device (101) is buried in the natural heat storage body (100) and the heat releasing device (201) is partially embedded in the shore;
   d. the heat gaining device (101) is buried in the natural heat storage body (100) and the heat releasing device (201) is embedded in the shore;
   e. the heat gaining device (101) is buried in the natural heat storage body (100) and the heat releasing device (201) is exposed at a top of the natural heat storage body (100);
   f. the heat gaining device (101) is disposed at an incline and buried in the natural heat storage body (100) and the heat releasing device (201) extends horizontally and is disposed in the ground, partially disposed in the ground, or disposed above the ground;
   g. the heat gaining device (101) is vertically disposed and buried in the natural heat storage body (100) and the heat releasing device (201) extends horizontally and is disposed in the ground, partially disposed in the ground, or disposed above the ground, said first pipeline structure having an L-shape; and
   h. the heat gaining device (101) is vertically disposed and buried in the natural heat storage body (100) and the heat releasing device (201) extends horizontally and is disposed in the ground, partially disposed in the ground, or disposed above the ground.

* * * * *